United States Patent [19]
VanDoren et al.

[11] Patent Number: 6,122,714
[45] Date of Patent: Sep. 19, 2000

[54] ORDER SUPPORTING MECHANISMS FOR USE IN A SWITCH-BASED MULTI-PROCESSOR SYSTEM

[75] Inventors: Stephen R. VanDoren, Northborough, Mass.; Simon C. Steely, Hudson, N.H.; Madhumitra Sharma, Shrewsbury; David M. Fenwick, Acton, both of Mass.

[73] Assignee: Compaq Computer Corp., Houston, Tex.

[21] Appl. No.: 08/957,298

[22] Filed: Oct. 24, 1997

[51] Int. Cl.[7] ..................................................... G06F 12/16
[52] U.S. Cl. ........................ 711/150; 711/149; 711/151; 711/121; 711/141; 710/131
[58] Field of Search ................................... 711/121, 117, 711/118, 141, 142, 143, 144, 145, 146, 150, 149, 151; 710/131

[56] References Cited

U.S. PATENT DOCUMENTS

| | | | |
|---|---|---|---|
| 5,303,362 | 4/1994 | Butts, Jr. et al. | 711/121 |
| 5,313,609 | 5/1994 | Baylor et al. | 711/121 |
| 5,361,342 | 11/1994 | Tone | 711/121 |
| 5,490,261 | 2/1996 | Bean et al. | 711/121 |
| 5,530,933 | 6/1996 | Frink et al. | 711/141 |
| 5,551,005 | 8/1996 | Sarangdhar et al. | 711/145 |
| 5,579,504 | 11/1996 | Callander et al. | 711/144 |
| 5,584,004 | 12/1996 | Aimoto et al. | 711/5 |
| 5,608,893 | 3/1997 | Slingwine et al. | 711/141 |
| 5,737,757 | 4/1998 | Hassoun et al. | 711/145 |
| 5,905,998 | 5/1999 | Ebrahim et al. | 711/144 |

*Primary Examiner*—Hiep T. Nguyen
*Attorney, Agent, or Firm*—Cesari and McKenna, LLP

[57] ABSTRACT

An architecture and coherency protocol for use in a large SMP computer system includes a hierarchical switch structure which allows for a number of multi-processor nodes to be coupled to the switch to operate at an optimum performance. Within each multi-processor node, a simultaneous buffering system is provided that allows all of the processors of the multi-processor node to operate at peak performance. A memory is shared among the nodes, with a portion of the memory resident at each of the multi-processor nodes. Each of the multi-processor nodes includes a number of elements for maintaining memory coherency, including a victim cache, a directory and a transaction tracking table. The victim cache allows for selective updates of victim data destined for memory stored at a remote multi-processing node, thereby improving the overall performance of memory. Memory performance is additionally improved by including, at each memory, a delayed write buffer which is used in conjunction with the directory to identify victims that are to be written to memory. An arb bus coupled to the output of the directory of each node provides a central ordering point for all messages that are transferred through the SMP. The messages comprise a number of transactions, and each transaction is assigned to a number of different virtual channels, depending upon the processing stage of the message. The use of virtual channels thus helps to maintain data coherency by providing a straightforward method for maintaining system order. Using the virtual channels and the directory structure, cache coherency problems that would previously result in deadlock may be avoided.

26 Claims, 43 Drawing Sheets

TRANSACTION TRACKING TABLE (TTT) 122 (FIG. 6)

| ADDRESS | COMMAND | COMMANDER ID | STATUS BITS 158 | | | | FETCH | LOOP CONSIG |
|---------|---------|--------------|------|------|------|------|-------|-------------|
| 152 | 154 | 156 | FILL HER | FILL MARKER HERE | SHADOW | ACK/ NACK HERE | | |
| | | | 158a | 158d | 158b | 158c | | |
| | | | | | | | | |
| | | | | | | | | |
| | | | | | | | | |
| | | | | | | | | |

FIG. 10

| 300 | 305 | 320 | | 300a | 305a | 320a |
|---|---|---|---|---|---|---|
| READ BLOCK | INVALID | | | CLEAN-TO-DIRTY | INVALID | |
| | CLEAN | | | | CLEAN | INVALIDATE |
| | DIRTY | FORWARDED READ | | | DIRTY | N/A |
| | DIRTY-SHARED | FORWARDED READ | | | DIRTY-SHARED | INVALIDATE |
| READ BLOCK MODIFY | INVALID | | | SHARED-TO-DIRTY | INVALID | |
| | CLEAN | INVALIDATE | | | CLEAN | INVALIDATE |
| | DIRTY | FORWARDED READ MOD | | | DIRTY | N/A |
| | DIRTY-SHARED | FORWARDED READ MOD | | | DIRTY-SHARED | N/A |
| FETCH | INVALID | | | STC CHANGE-TO-DIRTY | INVALID | |
| | CLEAN | | | | CLEAN | INVALIDATE |
| | DIRTY | FORWARDED READ | | | DIRTY | N/A |
| | DIRTY-SHARED | FORWARDED READ | | | DIRTY-SHARED | INVALIDATE |
| READ BLOCK VICTIM | INVALID | | | INVAL-TO-DIRTY | INVALID | |
| | CLEAN | | | | CLEAN | INVALIDATE |
| | DIRTY | FORWARDED READ | | | DIRTY | INVALIDATE |
| | DIRTY-SHARED | FORWARDED READ | | | DIRTY-SHARED | INVALIDATE |
| READ BLOCK MODIFY VICTIM | INVALID | | | FULL-BLOCK WRITE | INVALID | |
| | CLEAN | INVALIDATE | | | CLEAN | INVALIDATE |
| | DIRTY | FORWARDED READ MOD | | | DIRTY | INVALIDATE |
| | DIRTY-SHARED | FORWARDED READ MOD | | | DIRTY-SHARED | INVALIDATE |
| FETCH BLOCK VICTIM | INVALID | | | | | |
| | CLEAN | | | | | |
| | DIRTY | FORWARDED READ | | | | |
| | DIRTY-SHARED | FORWARDED READ | | | | |
| VICTIM | ANY STATE | | | | | |
| CLEAN VICTIM | ANY STATE | | | | | |

FIG. 19

| ADDRESS | COMMAND | COMMANDER ID | STATUS BITS | | | | |
|---|---|---|---|---|---|---|---|
| | | | FILL HERE | FILL MARKER HERE | SHADOW | ACK/NACK HERE | FETCH LOOP CONSIG |
| X | RdMod | P1 | | | | | |

FIG. 32

| ADDRESS | COMMAND | COMMANDER ID | STATUS BITS | | | | |
|---|---|---|---|---|---|---|---|
| | | | FILL HERE | FILL MARKER HERE | SHADOW | ACK/ NACK HERE | FETCH | LOOP CONSIG |
| X | FRd | P1 | | | | | | |
| X | INVAL | P2 | | | X | | | |

ORDER SUPPORTING MECHANISMS FOR USE IN A SWITCH-BASED MULTI-PROCESSOR SYSTEM

FIELD OF THE INVENTION

This invention relates in general to the field of computer architecture and more specifically to distributed shared-memory multi-processing systems.

BACKGROUND OF THE INVENTION

As it is known in the art, symmetric multi-processing computers allow for high performance application processing. Typical symmetric multi-processing computer systems include a number of processors coupled together by a bus. One characteristic of a symmetric multi-processing system is that memory space is shared among all of the processors. One or more operating systems are stored in memory and control the distribution of processes or threads among the various processors.

By allowing many different processors to execute different processes or threads simultaneously, the execution speed of a given application may be greatly increased. In theory the performance of a system could be improved by simply increasing the number of processors in the multi-processing system. In reality, the continued addition of processors past a certain saturation point serves merely to increase communication bottlenecks and thereby limit the overall performance of the system.

For example, referring now to FIG. 1A, a typical prior art multi-processor system 2 including eight processors coupled together via a common interconnect bus is shown. During operation, each of the processors 3a–3h communicate with the other processors and with a shared memory 4 via a shared interconnect bus 5. The symmetric multi-processing arrangement of FIG. 1A has been adequate for multi-processors built to date. However, with the advent of faster microprocessors, a common shared interconnect is not capable of sufficiently exercising the fill performance potential of the coupled microprocessors. Because the only communication link between the processors and memory is the shared bus, the bus may rapidly become saturated with requests from the processors, thereby increasing delays as each processor attempts to gain access to the system bus. Therefore, although the processors may be able to operate at enhanced speeds, the limiting factor in terms of performance is the available bandwidth of the system bus.

Communication bandwidth is a key factor in the performance of SMP systems. Since bandwidth may not be uniform between pairs or subsets of nodes in the SMP system, the industry uses a "bisection bandwidth" measurement for determining the communication bandwidth of an SMP system. Bisection bandwidth is determined in the following manner. All possible ways of partitioning the system into two portions of equal compute power (equal number of processors) are ascertained. For each partition, the sustainable bandwidth between the two partitions is determined. The minimum of all of the sustainable bandwidths is the bisection bandwidth of the interconnect. The minimum bandwidth between the two partitions indicates the communication bandwidth sustainable by the multiprocessor system in the presence of worst-case communication patterns. Thus, a large bisection bandwidth is desirable.

Several interconnection architectures or "topologies" have been used in the prior art to overcome bus saturation problems. These topologies include meshes, touri, hypercubes and enhanced hypercubes.

As an example, a mesh interconnect is shown as system 7 in FIG. 1B. The major advantage of the mesh network is its simplicity and ease of wiring. Each node is connected to a small number of other neighboring nodes. However, the mesh interconnect has three significant drawbacks. First, messages must on average traverse a large number of nodes to get to their destination, and as a result the communication latency is high. Second, the bisection bandwidth does not scale as well for a mesh topology as it does for other topologies. Finally, because each of the messages may traverse different paths within the mesh, there are no natural ordering points within an SMP system, and therefore the cache coherence protocols required to implement the mesh topology are often quite complex.

The torus, hypercube, and enhanced hypercube topologies are all topologies wherein the nodes are interconnected in various complex arrangements, for example in a torus arrangement or a cube arrangement. The torus, hypercube and enhanced hypercube interconnects are more complex than the mesh interconnect, but offer better latency and bandwidth than the mesh interconnect. However, like the mesh interconnect, the torus, hypercube and enhanced hypercube topologies do not provide natural ordering points, and thus a complex cache coherence protocol must be implemented for each of those systems.

In shared-memory multiprocessor systems, processors typically employ private caches to store data determined likely to be accessed in the future. Since processors may read data from their private cache and may update data in the private cache without writing it back to memory, a mechanism is needed to ensure that the private chaches of each of the processors are kept consistent, or coherent. The mechanism that is used to ensure coherency of data in the SMP system is referred to as the cache coherence protocol.

Besides the topology, bandwidth, and latency of the physical interconnect the efficiency of the cache coherence protocol is a key factor in system performance. Cache coherency protocols may introduce latencies, bottlenecks, inefficiencies or complexity in several ways.

The latency of load and store operations is often directly affected by the protocol of the design. For example, in some protocols, a store operation is not considered complete until all invalidate messages have made it to their target processors and acknowledgment messages have made it all the way back to the original processor. The latency of stores here is much higher than a protocol wherein the original processor does not have to wait for the Invalidates to make it to their destination. Further, the acknowledgments consume a significant fraction of the system bandwidth.

Bottlenecks are often introduced due to high occupancy of controllers. "Occupancy" is a term of art; it indicates the amount of time a controller is unavailable after it receives a request. In some protocols, when a directly controller receives a request corresponding to a memory location, it becomes unavailable for other requests to the same memory location until certain acknowledgments corresponding to the former command arrive at the directory. If the controller receives conflicting requests at a higher than average rate, it becomes a bottleneck.

The design of the cache coherence protocol also affects hardware complexity. For instance, some protocols introduce deadlock and fairness problems, which are then addressed with additional mechanisms. This results in added hardware complexity.

It is desirable to provide a symmetric multiprocessing system that minimizes the latency of operations, provides large communication bandwidth, provides low controller occupancy, and can scale to a large number of processors.

SUMMARY OF THE INVENTION

The present invention is advantageously employed in a symmetric multi-processing system where multiple multi-processor nodes including at least one processor and a portion of a shared memory are coupled together via a switch. In each of the multi-processor nodes a transaction tracking table (TTT) is maintained. The TTT may reside in a global port of the node, connecting the node to the switch, or alternatively may reside at each of the at least one processors of the multi-processing node.

The TTT is used to determine and enforce an order of requests that are issued from and received by the multi-processing node. According to one aspect of the invention, the TTT is used to determine the order of requests that are returned to the multi-processing node in the following manner. Each of the requests are sub-divided into a number of transactions, with each of the transactions being carried on a different virtual channel. At least one of the channels is ordered, but return data on the other channels may be received out of order. In order to maintain coherency, it is desirable that transactions issued to a common address are handled in order. According to one aspect of the invention, a marker packet is issued on the ordered channel to the TTT to indicate to the data associated with an address is still being processed. With such an arrangement, the TTT may ensure that other requests on the ordered channel, received subsequent to the marker packet, are either ignored or delayed until the data is received.

Accordingly, according to one aspect of the invention, a computer system comprising a plurality of coupled multi-processor nodes, each of the nodes comprising at least one processor and a portion of a shared memory, includes a tracking mechanism, associated with the plurality of processors in each one of the plurality of multi-processor nodes, for identifying a position of a request to an address of a remote portion of shared memory issued by one of the at least one processors in the one of the plurality of multi-processor nodes relative to a plurality of other requests issued to the address by the at least one processor in the plurality of coupled multi-processor nodes.

According to further aspect of the invention, a method for maintaining order between a plurality of requests issued to a common address in a multi-processor computer system is provided. The multi-processor computer system includes a plurality of multi-processor nodes coupled via a switch with each of the multi-processor nodes comprising at least one processor and a portion of a shared memory. The method includes the step of maintaining a list of addresses of requests that are forwarded from each of the multi-processor nodes to the switch in order to identify a relative order of requests to the respective addresses in a portion of shared memory of a remote multi-processor node, wherein an address is maintained in the list until the request associated with the address is satisfied.

BRIEF DESCRIPTION OF THE DRAWINGS

The above-mentioned and other features of the invention will now become more apparent by reference to the following description taken in connection with the accompanying drawings in which:

FIG. 10 illustrates a Transaction Tracking Table (TTT) for use in the global port of FIG. 8;

FIG. 19 is a table illustrating the translation of processor instructions to network instructions for use in the SMP of FIGS. 7A or 7B;

FIG. 32 is an entry in the TTT reflecting the status of an instruction during the flow described with regard to FIG. 31;

DESCRIPTION OF THE PREFERRED EMBODIMENT

According to one embodiment of the invention, a hierarchical Symmetric Multi-Processing (SMP) system includes a number of SMP nodes coupled together via a high performance switch. Thus, each of the SMP nodes act as a building block in the SMP system. Below, the components and operation of one SMP node building block is first described, followed by a description of the operation of the SMP system and subsequently a description of a cache coherence protocol that is used to maintain memory coherency in the large SMP system.

SMP NODE BUILDING BLOCK

Figure 1A:
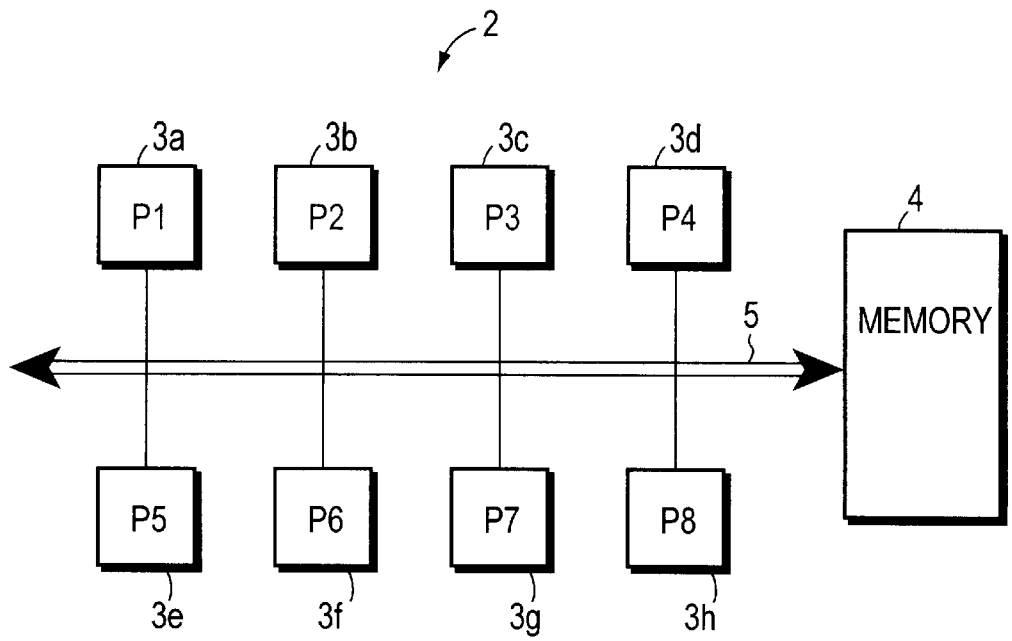
FIGS. 1A–1B are block diagrams of two prior art symmetric multi-processor computer systems.
Figure 1B:
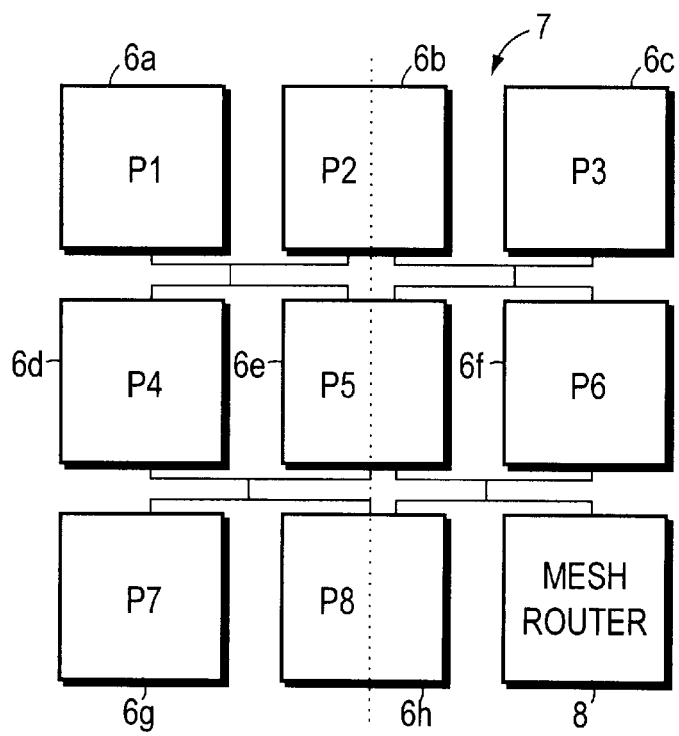
Figure 2:
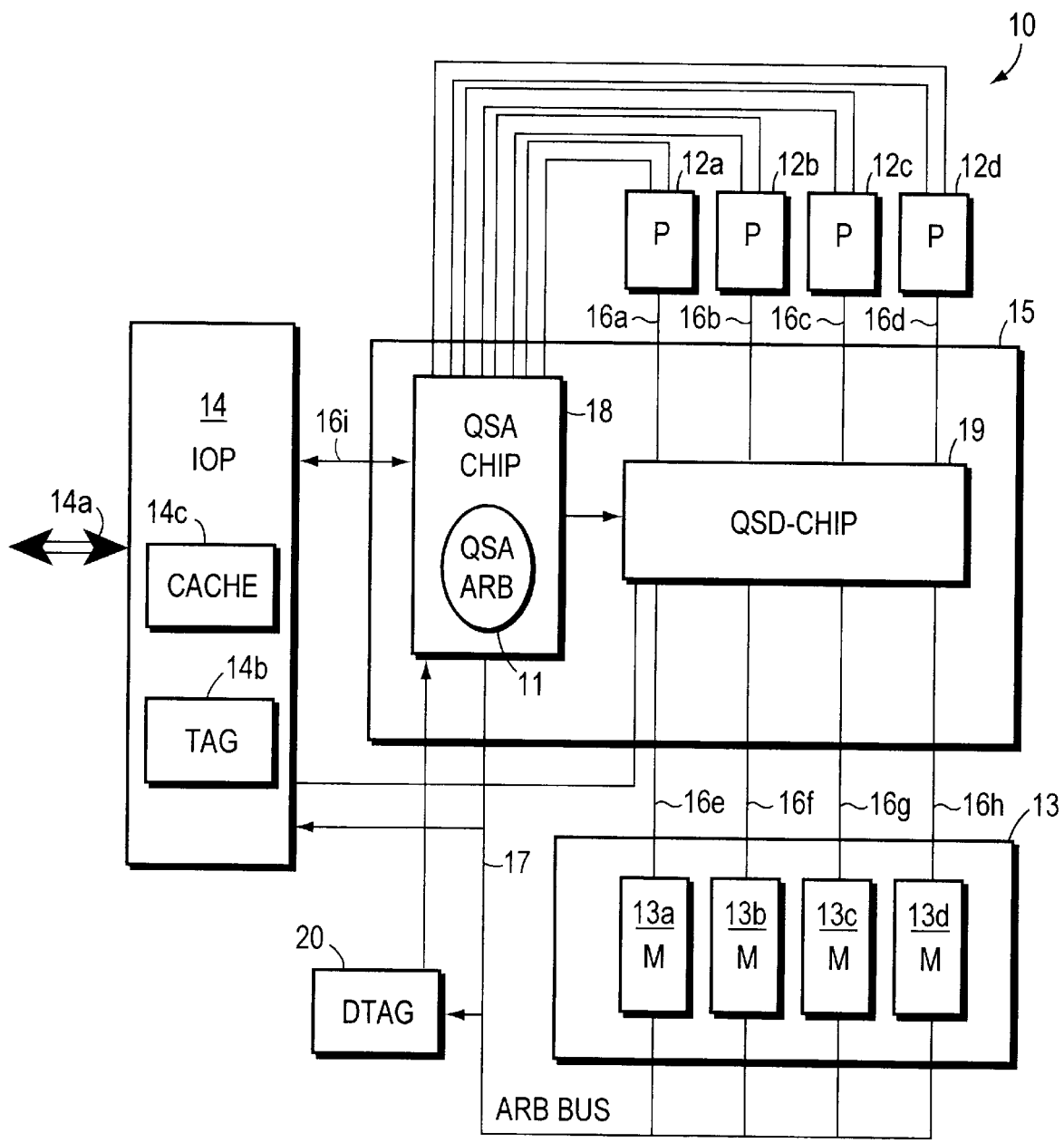
FIG. 2 is a block diagram of one embodiment of a multi-processor computer node of one embodiment of the invention comprising a switch.

Referring now to FIG. 2, a multi-processor node 10 includes four processor modules 12a, 12b, 12c, and 12d. Each processor module comprises a central processing unit (CPU). In a preferred embodiment, Alpha® 21264 processor chips, manufactured by Digital Equipment Corporation® are used, although other types of processor chips capable of supporting the below described coherency protocol may alternatively be used.

Multi-processor node 10 includes a memory 13, which may include a number of memory modules 13a–13d. The memory may provide 32 GBytes of storage capacity, with each of the 4 memory modules storing 8 Gigabytes. Each of the memory modules is apportioned into a number of blocks of memory, where each block may include, for example 64 bytes of data. Data is generally retrieved from memory in blocks.

In addition, multi-processing node 10 includes an I/O processor (IOP) module 14 for controlling transfer of data between external devices (not shown) and the multi-processor node 10 via a coupled I/O bus 14a. In one embodiment of the invention, the I/O bus may operate according to the Peripheral Computer Interconnect (PCI) protocol. The IOP 14 includes an IOP cache 14c and an IOP tag store 14b. The IOP cache 14c provides temporary storage for data from memory 13 that is transferred to external devices on the PCI bus 14a. The IOP tag store 14b is a 64 entry tag store for storing coherency information for data being moved between external devices, processors and memory.

The coherency of data stored in the memory 13 of the multi-processor node is maintained by means of a Duplicate Tag store (DTAG) 20. The DTAG 20 is shared by all of the processors 12a–12d, and is apportioned into 4 banks, where each bank is dedicated to storing status information corresponding to data used by an associated one of the processors.

The DTAG, Memory and IOP are coupled to a logical bus referred to as the Arb bus 17. Memory block requests issued by the processor are routed via the local switch 15 to the Arb bus 17. The DTAG 20 and IOP 14 look up the state of the block in the processors' and IOP's caches and atomically update their state for the memory block. The Arb bus 17 acts as a serialization point for all memory references. The order in which memory request appear on the Arb bus is the order in which processors perceive the results of the requests.

The processor modules 12a–12d, memory modules 13a–13d and IOP module 14 are coupled together via a local, 9 port switch 15. Each of the interfacing modules 12a–12d, 13a–13d and 14 are connected to the local switch by means of a like number of bi-directional, clock forwarded data links 16a–16i. In one embodiment, each of the data links forwards 64 bits of data and 8 bits of error correcting code (ECC) one each edge of a system clock operating at a rate of 150 MHZ. Thus, the data bandwidth of each of the data links 16a–16i is 2.4 Gigabytes/sec.

Local switch 15 includes an Quad Switch Address control chip (QSA chip) 18 and a Quad Switch data slice chip (QSD chip) 19. QSA chip 18 includes an arbiter (QS Arb) 11 for controlling address paths between the processor modules, IOP, and memory. In addition, QSA chip 18 provides control to the QSD chip 19 to control the flow of data through the local switch 15 as described below.

QSD chip 19 provides a switch interconnect for all data paths between the processor modules, memory modules and IOP. Although not shown in FIG. 2, as will be described below, if the multi-processor node 10 were coupled to other multi-processor nodes via a global port, the QSD and OSA would additionally provide a switch interconnect for the global port. Each of the processors may request data from one of the available resources, such as the memory devices 13a–13d, other processors 12a–12d, IOP 14 or alternatively resources in other multi-processor nodes via the global port. Thus, the local switch 15 should be able to accommodate simultaneous input from a variety of resources while maintaining the high bus bandwidth of 2.4 GBytes.

The local switch is able to handle mulitple concurrent transactions. Since each transaction typically uses multiple resources (such as memory banks, datapaths, queues), the control functions of the local switch can be very complex. For instance, a transaction may require a memory bank to be available in stage 0 of the transaction, the datapath from memory bank to processor port be available in stage 1, and the datapath from processor port to processor be available in stage 2. The local switch arbiter (QSA Arb 11 in the QSA 18) arbitrates among requests in such a manner that once a transaction is initiated, resources required by a transaction in each stage are available as required.

More significantly, the arbiter guarantees that all requests and processors get fair access to the resources by ensuring that particular requests do not fail to win arbitration for a long time (potentially indefinitely) while others make progress. For instance, consider a transaction T that requires three resources A, B, and C. Transaction T may not win arbitration until all three resources are guaranteed to be available in the appropriate stages of the transaction. If the artiber bases its decision only on the availability of resources, then it is possible that T may not succeed for a long time while other transactions which consume one of A, B, or C (along with other resources D, E, etc). continue to win arbitration.

Guaranteeing fair arbitration in a switch with a large number of concurrent requests, each using multiple resources to complete, is computationally complex and likely to increase delays in the high speed datapath. In the apparatus disclosed herein, the QSA arb 11 arbitrates for only one resource (the memory bank) before scheduling a particular transaction. A second resource, which is a queue leading up to the processors, does not need to be checked for availability at the time of arbitration by the QSA arb 11 for the first resource. This is because the architecture of the QSD guarantees that datapaths and queue slots leading up to the queue are always available. The fair arbitration for resources may be provided without much complexity in the QSA arb 11.

According to one embodiment of the invention, the QSD is able to simultaneously receive input from all of the sources (processors, memory, IOP and global port) without requiring any upfront arbitration for the buffers leading up to corresponding destinations. All sources of data may then independently forward data to the switch without having to arbitrate for access to the datapath or queue slots in the switch because the QSD includes a number of simultaneous insertion buffers capable of receiving, substantially simultaneously, data from all of the sources. Two embodiments of simultaneous insertion buffers are described below.

SIMULTANEOUS INSERTION BUFFER SWITCH

As described above, the processor 12a–12d, IOP 14 and memory devices 13a–13d in the multi-processing node each serve as resources for handling requests from the processors and IOP in the multi-processing node. Data is transferred between each of the resource elements and the requesting elements in the form of packets. Each packet comprises 512 bits of data and 64 bits of ECC. As described above, each of the data links carries 64 bits of data and 8 bits of ECC on each edge of a 150 MHZ clock. Thus, external to the QSD there are 8 data transfer cycles per packet. Internal to the QSD, however, data is gathered only on one edge of the clock. Thus, for each clocking cycle of logic internal to the QSD, there are potentially 128 bits of data received from the data links. Since each packet comprises 512 bits of data and 64 bits of ECC, internal to the QSD there are 4 data transfer cycles for each packet, with 128 bits of data and 16 bits of ECC being transferred from a processor, IOP or memory device to the QSD each QSD clocking cycle.

Figure 3:
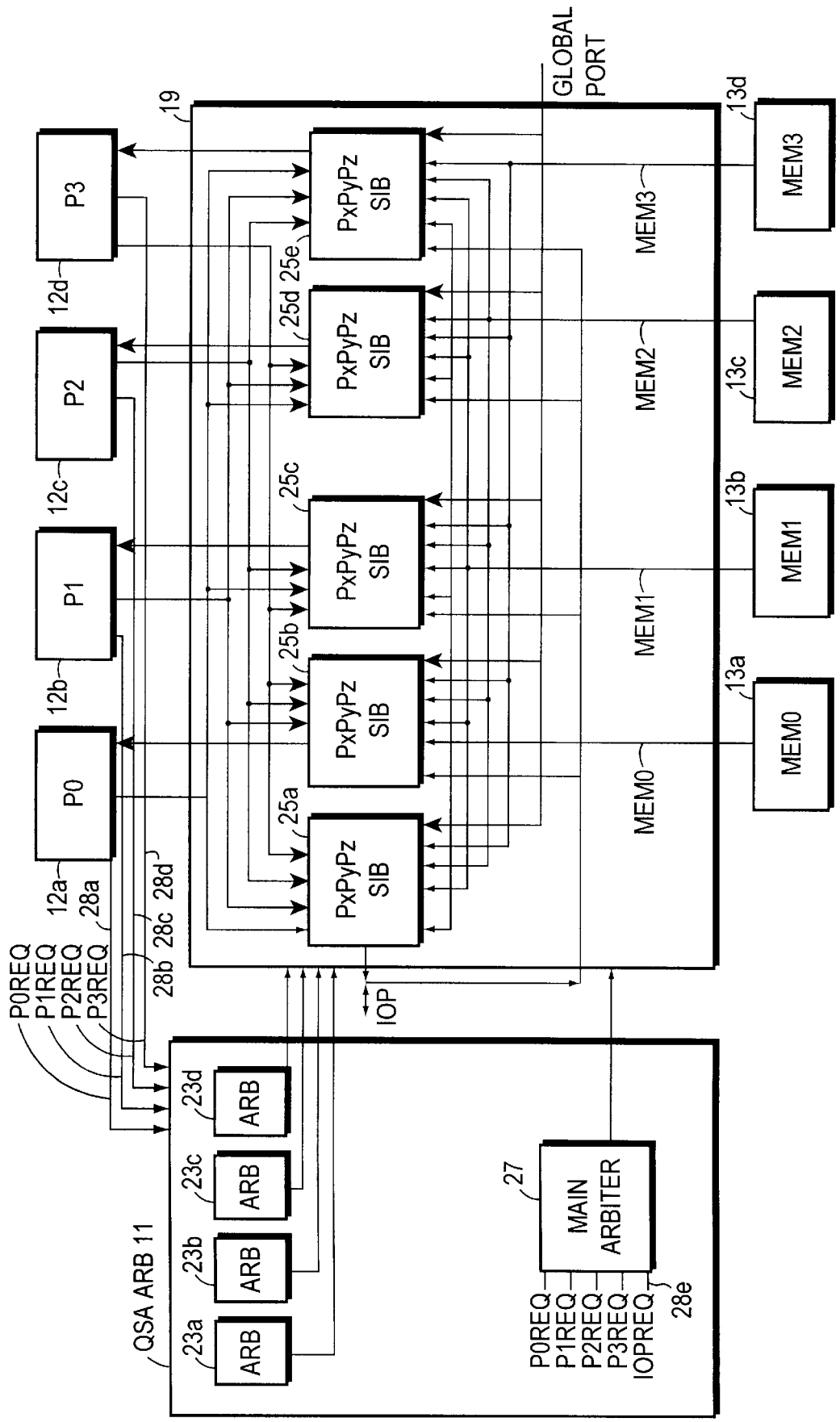
FIG. 3 is a block diagram illustrating the data path of the switch of FIG. 1 comprising a number of Simultaneous Insertion Buffers.

Referring now to FIG. 3, the QSD 19 is shown in more detail to include five Simultaneous Insertion Buffers (SIBs) 25a–25e. Each SIB is dedicated to one of the requestor elements, i.e., processors 12a–12d or the IOP. Each SIB controls the data path for transfer of packets between its associated requestor element and the other resource elements in the node; i.e., processors 12a–12d, memory 13a–13d, IOP 14 and advantageously a global port. The global port acts as an interconnect to other multi-processor nodes and is described in detail below. The SIBs allow for the simultaneous receipt of packets by the requester from any of the resources coupled to the switch without requiring arbitration between the requestors for access to the switch.

As described previously, the QSA Arb 11 is coupled to provide control to the switch 19. Included in QSA Arb 11 is a main arbiter 27. The main arbiter 27 manages the data movement between the resources (the IOP, processors 12a–12d and memory 13a–13d) and the switch 19. Each of the processors 12a–12d and IOP 14 issues requests for access to one of the resources on lines 28a–28e that are forwarded to the main arbiter 27. The main arbiter in turn forwards these requests to the associated resources when each resource is able to receive a request. Once the resource has received the request, no arbitration for the switch 19 is required because each of the SIBs are capable of receiving input from all of the inputs substantially simultaneously, i.e., within the same data cycle.

Also included in the QSA Arb 11 is a number of individual arbiters 23a–23d. Each of the arbiters 23a–23d is used to manage a datapath between an associated one of the processors 12a–12d and their corresponding SIB 25b–25e, respectively. A similar arbitrer (not shown) is included in the IOP 14 for managing the datapath between IOP 14 and SIB 25a. As each processor is able to receive data from their associated SIB, the associated arbiter forwards the data on the coupled datapath.

Accordingly, by using simultaneous insertion buffers within the switch 19, the arbitration pathway between a requester and a resource may be broken up into two distinct sections; a first arbitration section where the main arbiter 27 arbitrates for a resource in response to a request from a processor independent of the availability of the requesting processor to receive data from the coupled resource, and a second arbitration section where the arbiter associated with the processor arbitrates for access to the processor for forwarding data from the switch. With such an arrangement, because the arbitration is segregated it can be ensured that fair access to each of the coupled resources is provided.

Figure 4A:
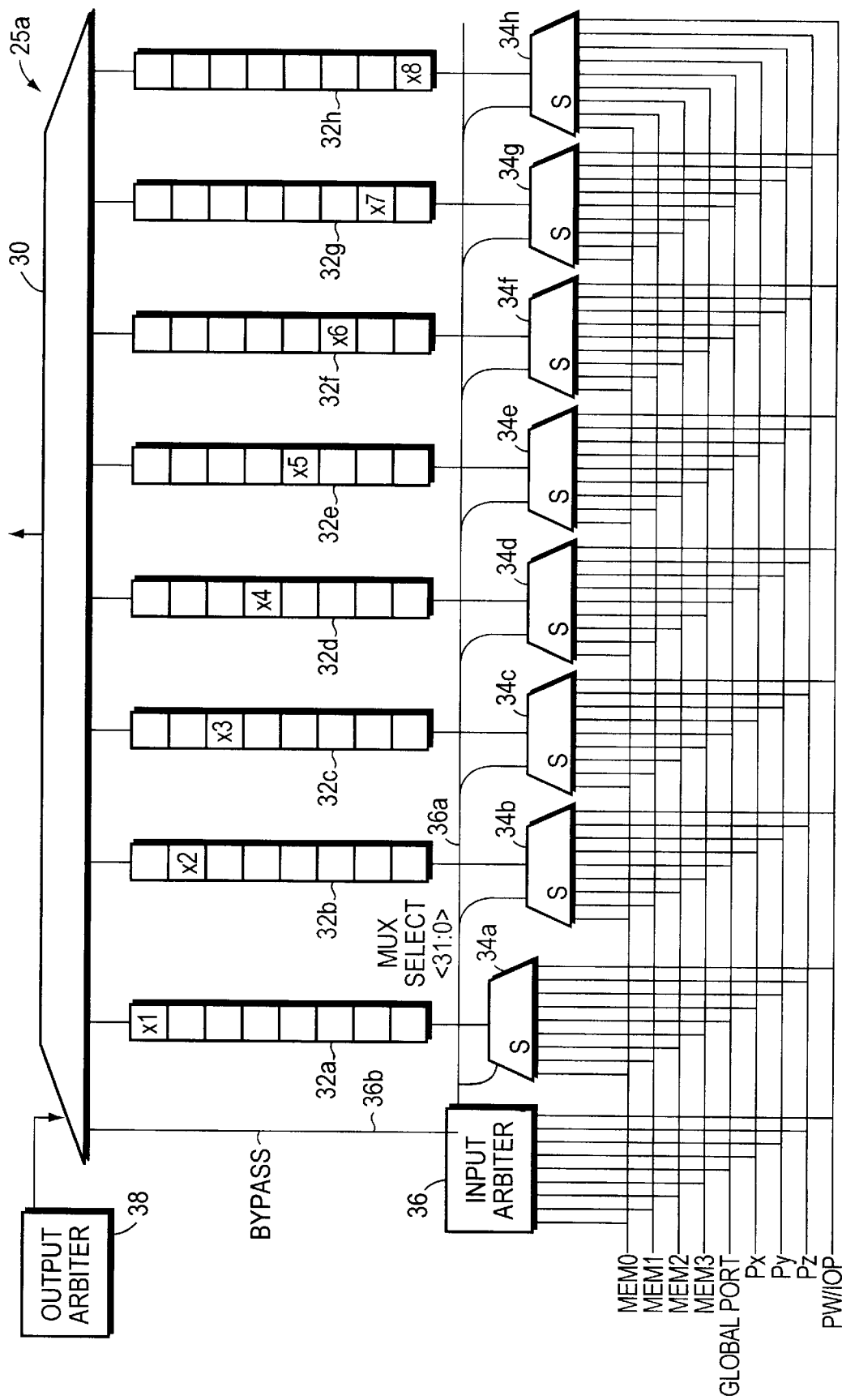
FIG. 4A is a block diagram of one embodiment of one of the Simultaneous Insertion Buffers of FIG. 3.

Referring now to FIG. 4A, a more detailed diagram of one embodiment of the SIB 25a is shown to include an input arbiter 36 coupled to provide mux select signals <31:0> on line 36a to eight coupled multiplexers 34a–34h, where four of the mux select signals are forwarded to each of the eight multiplexers to select one of nine inputs at each multiplexer. All of the SIBs 25a–25d are similarly architected, and thus only one is described in detail. As described above, there are potentially ten resources coupled to the SIB. One of the ten resources is a requestor device that receives output from the SIB, while the other nine resources provide input to the SIB. Therefore, each of the multiplexers 34a–34h receives input from nine resources coupled to the SIB. The inputs from three of the coupled processors are received on lines Px, Py, and Pz. Another input, from either the fourth processor (when the SIB is associated with the IOP device) or from the IOP device (when the SIB is associated with one of the processors) is received on line PW/IOP. The inputs from memory banks 13a–13d are received on lines mem0, mem1, mem2 and mem3, respectively, and input from the global port is received on line global port.

Each output from each of the multiplexers 34a–34h is coupled to one of eight banks of a buffer 32. Each bank has eight entries, with each entry storing 128 bits of data and 16 bits of ECC. Thus, each packet of data that is received by the SIB is written to four different banks in the same row of the buffer 32. As described below, the input arbiter 36 maintains status bits for indicating the banks of the buffer that are available for storing data. Thus, each cycle that 128 bits of packet data are received from one or more resources, the input arbiter 36 selects one of the possible nine resource inputs at each multiplexer 34a–34h for forwarding the cycle of packet data to the associated bank 32a–32h depending upon the availability status of the banks. The input arbiter also provides bypass data on line 36b to a multiplexer 30. When the status bits in the input arbiter indicate that all of the banks 32a–32h are empty, one of the nine resource inputs may be bypassed directly to the associated requestor via the input arbiter 36.

Each of the banks 32a–32h are coupled to multiplexer 30. Multiplexer 30 is controlled by an output arbiter 38. When the requester associated with the SIB 25a is ready to receive data from the SIB, and a portion of a packet has been written into an entry in the SIB, the output arbiter forwards one of the eight entries from the banks 32a–32h to the requestor. Alternatively, the output arbiter forwards the bypass data on line 36b to the requester if none of the banks have data pending transfer and data is available on line 36b from the input arbiter.

During operation, when the first 128 bits of packet data are received at the SIB, one of the eight banks is selected for storing the first 128 bits of packet data. According to one embodiment of the invention, during each of the next three cycles that 128 bits of packet data are received, the bank adjacent to the bank that was used to perform the previous write is selected for writing the next 128 of packet data. For example, if bank 32a were selected as an available bank for writing a first cycle of packet data from source mem0, the second cycle of packet data would be written to bank 32b, the third to bank 32c, and the fourth to bank 32d. The selection of which bank to use for writing the subsequent cycles of packet data is thus performed on a rotating basis, starting at a bank selected by the input arbiter and continuing at an adjacent bank for each successive packet write. As a result, the received packet is spread across four banks in a common row of the buffer 32.

Because eight banks are provided, and because, in one embodiment of the invention, the maximum number of resource reads that may be outstanding at any one requester is eight, it can be ensured that at least one bank will be available to every resource for every write cycle. Therefore, if, at a given instant in time, all eight outstanding read responses were received by the switch, banks 32a–32h could each be used to accommodate the first packet data cycle of the write, with the selection of banks rotating for the next three write cycles.

In one embodiment of the invention, each buffer in a SIB operates under the First-In, First-Out (FIFO) protocol. Because two portions of packets may be received simultaneously, an order is selected for them to be 'read' into the switch. Since logic in the requester that arbitrates for the resource does not communicate with the SIB and does not communicate with other requesters for arbitrating for the resource, a standard rule is followed to ensure data integrity. For example, a rule such as 'data from a lower number input resource is always written to the switch before data from a higher number input resource' may be followed, where the resources are assigned a fixed priority number.

As mentioned above, in the embodiment of the SIB shown in FIG. 4A, the use of eight banks has been described because eight corresponds to the number of outstanding memory requests that a requestor can have at any given instant of time. If, however, the design constraints require that fewer banks be provided, the design could easily be modified by one of skill in the art to allow for multiple chunks of data to be written to different locations in a common bank simultaneously using interleaving or a similar technique. Therefore, the present invention is not limited to the particular embodiment illustrated in FIG. 4A.

Figure 4B:
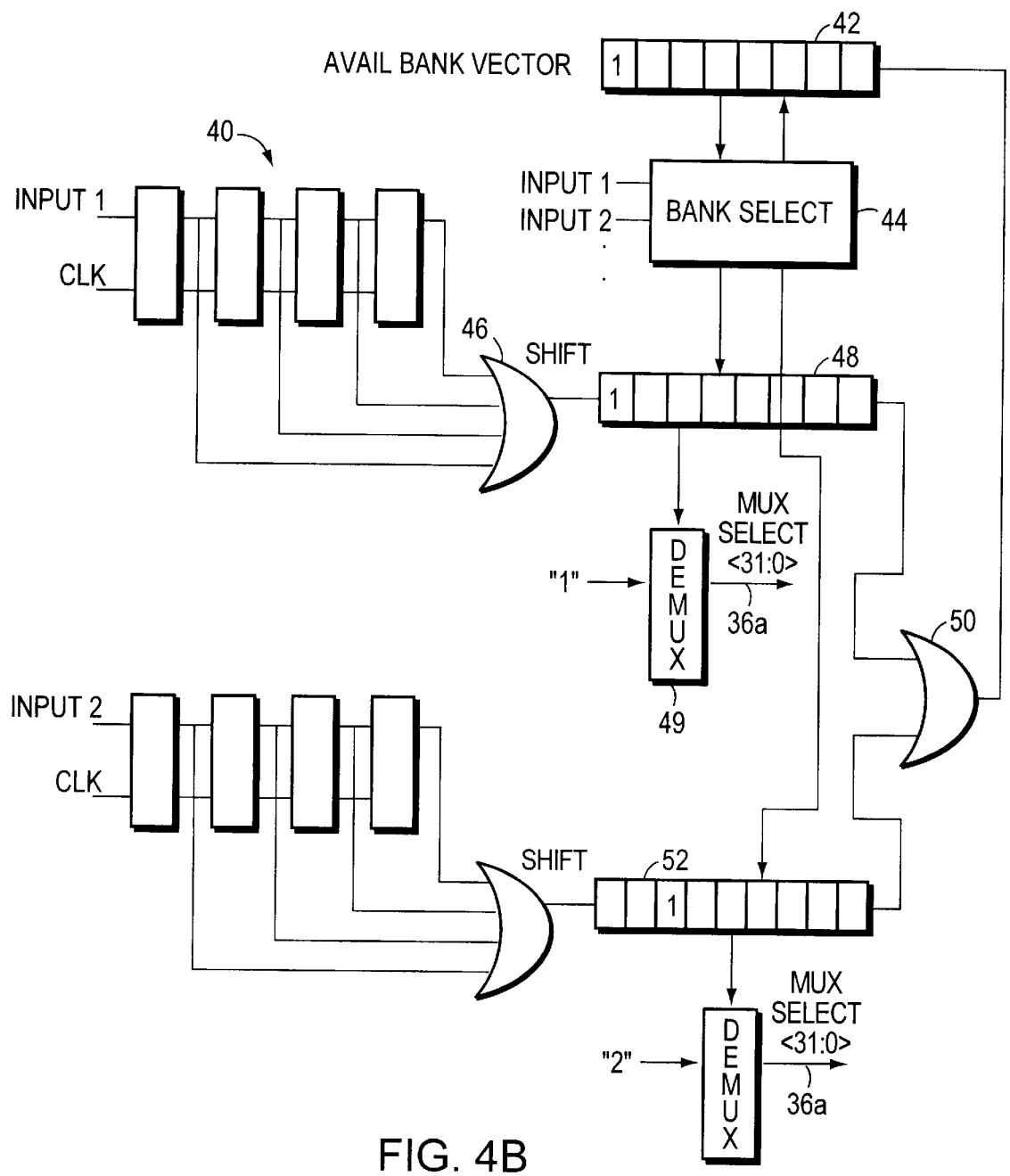
FIG. 4B is a block diagram of one implementation of logic for controlling one of the Simultaneous Input Buffers of FIG. 4.

As described above, during operation the input arbiter maintains status information regarding the availability of entries in the bank to select an appropriate bank for writing data from a resource. An example embodiment of an input arbiter 36 for controlling the inputs to the SIB is shown in FIG. 4B. In FIG. 4B, although nine input resources were described above, for clarity purposes, logic for controlling the writing of only two resource inputs is shown. When input packet data is received on lines 35, an indication signal, such as 'input1', is forwarded to a latch chain 40, which comprises 4 latches, flip flops, or similar state devices. The latch chain 40 is used as a counter mechanism. For purposes of this example, assume that the packet data is received in four successive data transfer cycles. During the four data transfer cycles, the input1 signal propagates through the latch chain. Coupled to the latch chain is an OR gate 46. As the input1 value propagates through the latch chain 40, the output of the OR gate 46 is asserted.

The output of the OR gate 46 provides a shift signal to a shift register 48. The shift register comprises 8 bit locations; one for each of the banks of the SIB. The shift register 48 is loaded, upon the initial receipt of the input1 signal sample, with a bit vector from bank select logic 44. The bit vector received from bank select logic 44 has only one bit set, with the relative location of the bit within the vector indicating the bank at which the write of the packet data is to be initiated.

Bank select logic 44 thus controls the write destination of the first cycle of packet data. The bank select logic 44 receives, as input, an available vector 42, with the relative locations of bits in the available vector indicating the associated buffers that are not able to receive write data.

When the bank select logic provides a bit to the shift register 48, the value of the shift register 48 is forwarded to a de-multiplexer 49. The de-multiplexer 49 also receives as input a numerical representation of the input of the multiplexers 34a–34h to which the input1 source is connected. For example, the de-multiplexer 49 receives a '1' input value, indicating that the input1 resource data would be forwarded through multiplexer 34a using a multiplexer select value of '1'. Depending upon the location of the bit in the shift register, indicating the selected bank, the '1' value is propagated to the appropriate location of the Mux SELECT <31:0> signal 36a. Each de-multiplexer for each input resource drives all of the Mux SELECT signals, with their outputs being ORed before the signals drive the multiplexers 34a–34h.

After writing the bank entry, the contents of the shift register are ORed together by OR gate 50, and stored as the AVAILABLE BANK VECTOR 42. This is used, during the next cycle, for determining by the bank select logic 44 which banks are available for incoming writes.

Each cycle that the shift signal on line 46a is asserted results in the bit of the shift register 48 being shifted right. As the bit shifts right, the select value in the mux select signal<31:0> is also shifted right, causing the input1 source to be forwarded to the next adjacent bank for the next write operation.

Thus, by using a SIB within the local QSD switch, a straightforward and efficient switching mechanism is provided that is capable of ensuring that multiple, simultaneously received inputs reach their destination requesters. With such an arrangement, once a source has arbitrated for access to a resource, all the arbitration that needs to be performed by the source has completed. The source may rely on the fact that the resource is always going to be able to obtain access to the switch buffer 32. Allowing the source arbiters to operate independently of each other for managing a resource provides a mechanism that ensures fair arbitration with minimal complexity. In addition, because the SIB is capable of storing data for the maximum number of outstanding reads of the requester, even if the data is received simultaneously from all of the resources there is no need for arbitration among the resources for the buffer 32, and the overall complexity of the resource logic is reduced.

Figure 5:
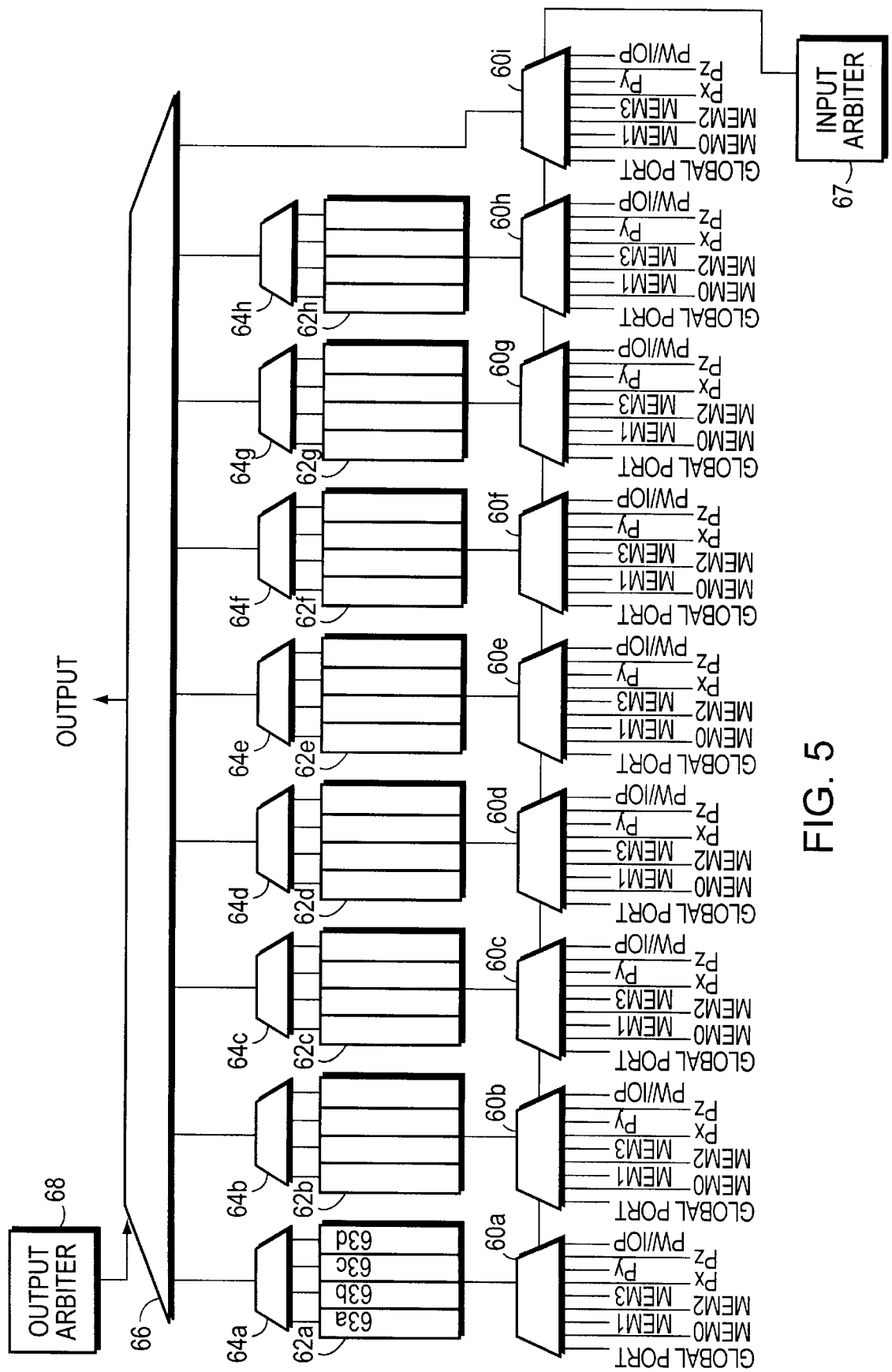
FIG. 5 is a block diagram of a second embodiment of one of the Simultaneous Insertion Buffers of FIG. 3.

Referring now to FIG. 5, a second embodiment of a Simultaneous Insertion Buffer (SIB) 61 that may be coupled to either a processor or IOP device (any requester device that includes a cache) as shown in FIG. 3. The SIB 61 includes nine multiplexers 60a–60i, eight of which are coupled to a respective one of eight buffers 62a–62h. The ninth multiplexer 60i is used to provide a bypass path as described below. The multiplexers 60a–60i each receive nine inputs including four inputs from the coupled memory devices mem0–mem3, one input from the global port, and three inputs from the coupled processors on lines Px, Py and Pz, and one input from either the IOP (if the device associated with the SIB is a processor) or from another processor (if the device associated with the SIB is the IOP) on line PW/IOP.

Each of the buffers 62a–62h include four 128 bit entries. Consequently, each of the input buffers stores one 512 bit packet of information that is received in four 128 bit portions in successive cycles at the SIB. Coupled to each of the buffers is a four to one multiplexer 64a–64h respectively. The multiplexers 64a–64h are used to select one of the four entries of the associated buffers for forwarding through a multiplexer 66 to the output of the SIB.

As described above with regard to FIG. 4A, eight buffers are included because in one embodiment of the invention each requester may have at most eight outstanding read references to different resources at any given instant in time. Thus, although eight buffers have been shown in FIG. 5 it is not a limit of the invention. Rather the number of buffers selected depends upon buffering characteristics of the associated processor or IOP device.

During operation, as input is received from each of the coupled resources, the input arbiter 67 selects one of the input lines at each of the multiplexers for forwarding the packet of data to a free buffer. The same buffer is selected for the duration of a packet write from a given resource such that all portions of a packet are maintained in a single buffer. Once at least one portion of the packet has been written to the buffer, it may be provided to the multiplexer 66 for forwarding to the associated requestor when the requestor is ready. Alternatively, if there is no packet data in any of the buffers, a bypass path may be used by forwarding packet data directly through multiplexer 60i to the output via the multiplexer 66.

Because eight buffers are provided, the SIB device 61 is able to receive data from each of the coupled resources substantially simultaneously (i.e., in the same data cycle). By using a SIB in the QSD, as in the previous embodiment, no arbitration is required between the requesters for access to the SIB. As a result, the availability of the of the local switch is guaranteed when the resource is ready to use it. In addition, an arbitration scheme is provided that is inherently fair, because no request to a resource is blocked by other requests to other resources as a result of arbitrating for the switch. Accordingly, a fair and relatively simple structure is provided that allows for maximum bus bandwidth to be maintained while minimizing arbitration complexity.

Thus, the multi-processor node 10 has been provided that makes optimum use of processing resources by implementing a local switch that uses a simultaneous insertion buffer to support a high bus bandwidth. In addition, because an order of references is serialized at the arb bus 13, a central ordering point is provided that facilitates maintenance of coherency of the memory of the multi-processor 10. While the possibility exists for increasing the processing power by increasing the number of processor modules coupled to the local switch, the four processors/local switch arrangement of FIG. 2 provides a system having high performance with low latency and low cost.

LARGE SYMMETRIC MULTI-PROCESSOR SYSTEM

The number of processors that may be included in a monolithic multi-processor node is limited by two factors. First, the number of processor that can be coupled together via a local switch is limited by the number of pins available on chips constituting the local switch. Second, the data bandwidth supported by a single, monolithic, switch is limited. Hence, increasing the number of coupled processors beyond some point does not yield any performance gains.

According to one embodiment of the invention, a large symmetric multi-processor may be provided by interconnecting a plurality of the multi-processing nodes via a hierarchical switch. For example, eight of the multi-processor nodes may be coupled via the hierarchical switch to provide a symmetric multi-processing (SMP) system including thirty-two processor modules, eight IOP devices, and 256 Gigabytes of memory. For purposes of this specification, a SMP that includes at least two multi-processor nodes will be referred to as a large SMP. As described in more detail below, by coupling a small number of processors using a local switch at a SMP node, and then coupling a number of nodes using a hierarchical switch into a large SMP, a scalable high performance system can be realized.

In order to couple the multi-processor node to a hierarchical switched network, the multi-processor is augmented to include a global port interface. For example, referring now to FIG. 6, a modified multi-processor node 100 is shown. Similar to the multi-processor node of FIG. 2, a local switch 110 couples four processor modules, four memory modules and an IOP module. Like elements in FIGS. 2 and 6 have the same reference numerals. The local switch 110 of the multi-processor node 100 is a 10 port switch, including 9 ports 116a–116i constructed similarly to ports 16a–16i of FIG. 2. An additional port 116j provides a full-duplex, clock forwarded data link to a global port 120 via global link 132.

The global port couples a multiprocessor node to the hierarchical switch thus realizing a large SMP. For example, referring now to FIG. 7A, in one embodiment of the invention a large SMP system 150 is shown to include eight nodes 100a–100h coupled together via an 8×8 hierarchical switch 155. Each of the nodes 100a–100h is substantially identical to the node 100 shown in FIG. 6.

Each of the nodes 100a–100h is coupled to the hierarchical switch 155 by a respective full-duplex clock forwarded data link 170a–170h. In one embodiment, the data links 170a–170h are operated at a clock speed of 150 Mhz, and thus support 2.4 GBytes/sec of data bandwidth for transferring data to and from switch 155. This provides the switch with a maximum of 38.4 GBytes/sec of raw interconnect data bandwidth, and 19.2 GBytes/sec of bisection data bandwidth.

The large SMP system is a distributed shared memory system, wherein each of the multi-processing nodes 100a–100h includes an addressable portion of either the overall system memory or a sub-divided portion of physical memory. In one embodiment of the invention, there are $2^{43}$ physical address locations in the overall system memory. One embodiment of the SMP multi-processing system 100 supports 2 address formats, referred to as "Large Format" and "Small Format." Large format maps the 43 bit physical address upon which the processors in each node operate directly into a 43 bit physical address for use in the multi-processor system. Using large format addressing, bits <38:36> of the physical memory address may be used to as a node identification number. Address bits 38:36 directly decode the home node of a memory space address, while the inverse of address bits 38:36 decode the home node of an I/O space address, where 'home' refers to the physical multi-processor node on which the memory and I/O devices associated with the memory space or I/O space reside.

Small format addressing mode assumes that no more than 4 nodes exist in the multi-processing system. Small format allows the processors in each node to operate in a 36-bit physically addressed system. In small format, bits 34:33 of the physical address identify the home node number of data or an I/O device.

However, even though the CPU operates using a 36-bit physical address, the multi-processor system consistently uses the 43 bit physical addresses for specifying data location, where bits 37:36 of the physical address identify the home node number of data or an I/O device. Accordingly, some translation is performed between the small format address issued by the CPU and that which is transmitted over the data lines 13a–13h to the hierarchical switch 155.

The illustrated arrangement of the multi-processing system 150 is capable of providing high bandwidth cache-coherent shared memory between 32 processors. Another embodiment of a large SMP according to one embodiment of the invention is provided in FIG. 7B, where two multi-processor nodes 100a and 100b are coupled together without the use of a hierarchical switch. Rather, the two multi-processor nodes are coupled directly by coupling together their global port outputs.

Figure 7A:
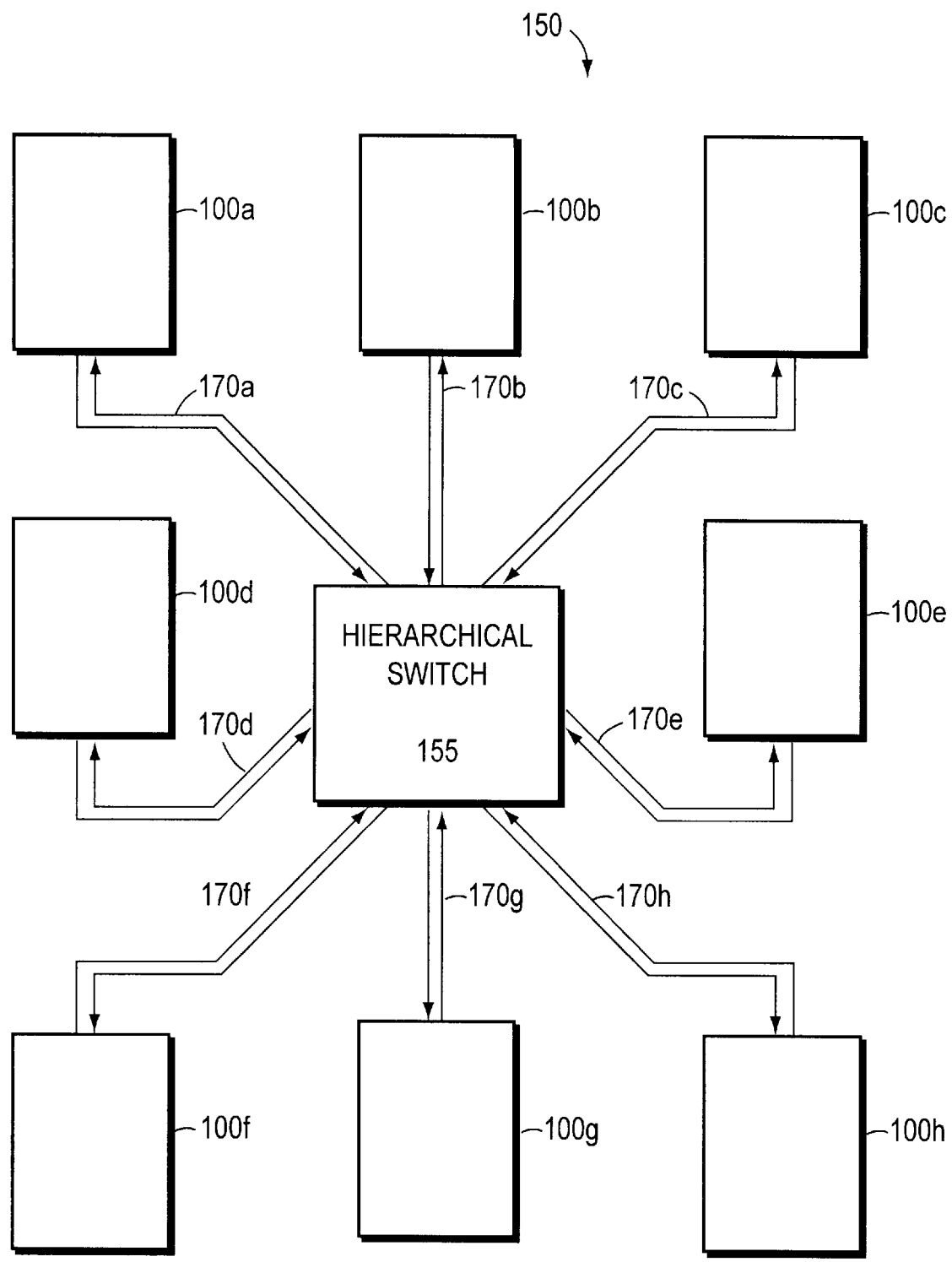
FIG. 7A is one embodiment of an SMP system implemented using multiple nodes similar to the multi-processor node of FIG. 6.
Figure 7B:
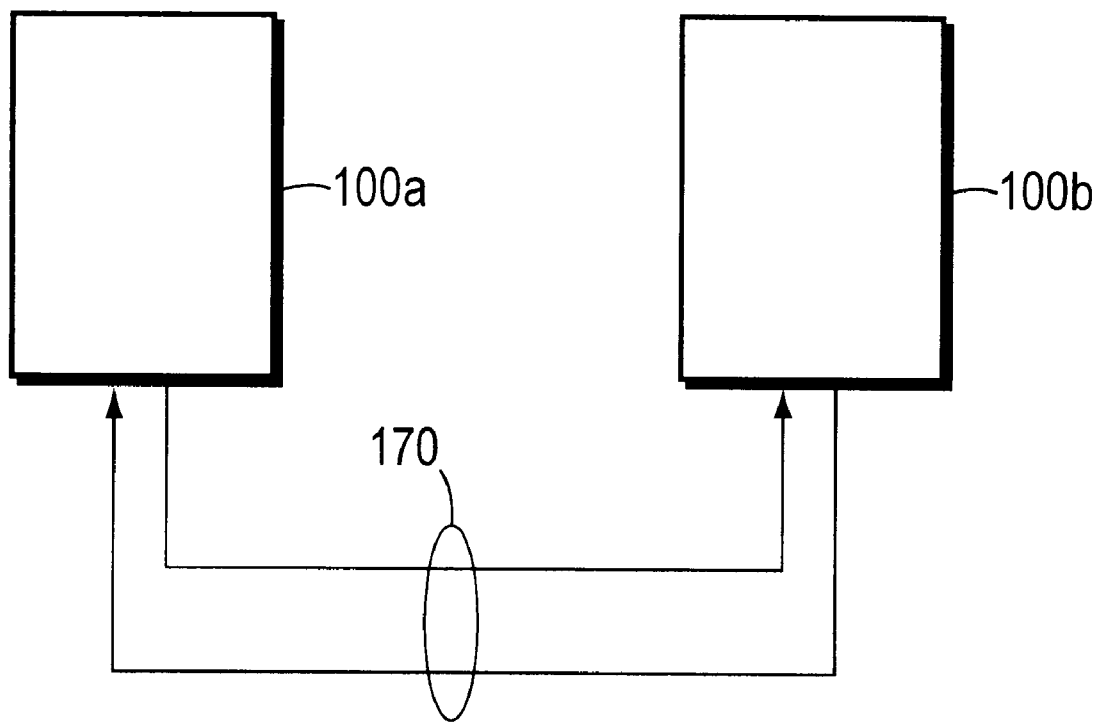
FIG. 7B is another embodiment of an SMP system implemented using multiple nodes similar to the multi-processor node of FIG. 6.

Regardless of whether the two node embodiment of FIG. 7B or the multi-node embodiment of FIG. 7A is used, the result is a multi-processor system with large addressing space and processing power.

In both embodiments, system memory address space and I/O address space are physically distributed in segments among all the nodes 100a–100h. Each node in the system includes a portion of the main memory which is accessed using the upper three bits of the memory space physical address. Thus each memory or I/O address maps to one and only one memory location or I/O device in only one of the nodes. The upper three address bits consequently provide a node number for identifying the 'home' node the node to which the memory or I/O address maps to.

Each multi-processor node may access portions of the shared memory stored at their home node, or at other multi-processing nodes. When a processor accesses (loads or stores to) a shared memory block for which the home node is the processor's own node, the reference is referred to as a "local" memory reference. When the reference is to a block for which the home node is a node other than the processor's own node, the reference is referred to as a "remote" or "global" memory reference. Because the latency of a local memory access differs from that of a remote memory accesses, the SMP system is said to have a Non Uniform Memory Access (NUMA) architecture. Further, since the system provides coherent caches, the system is called a cache-coherent NUMA architecture.

The cache coherent NUMA architecture disclosed herein includes several aspects that contribute to its high performance and low complexity. One aspect of the design is its adherence to and exploitation of order among messages. By guaranteeing that messages flow through the system in accordance with certain ordering properties, latencies of operations can be significantly reduced. For instance, store operations do not require that Invalidate messages be delivered to their ultimate destination processors before the store is considered complete; instead, a store is considered complete as soon as Invalidate messages have been posted to certain ordered queues leading to the destination processors.

In addition, by guaranteeing that certain orders are maintained, the design eliminates the need for acknowledgment or completion messages. Messages are guaranteed to reach their destinations in the order they are enqueued to certain queues. Hence, the need to return an acknowledgment when the message reaches its destination is eliminated. This enhances the bandwidth of the system.

Additionally, event orderings and message orderings are used to achieve "hot potato" operation. By exploiting the order on certain queues, controllers such as the Directory or DTAG controller are able to retire requests in a single visit. It is not necessary to negatively acknowledge and retry a request due to conflicts with other requests. As a consequence of the "hot potato" operation, fairness and starvation problems are eliminated.

The second aspect employed in the design is virtual channels. Virtual channels are a scheme for categorizing messages into "channels", wherein channels may share physical resources (and hence are "virtual") but each channel is flow-controlled independently of the others. Virtual channels are used to eliminating deadlock in the cache coherence protocol by eliminating flow-dependence and resource-dependence cycles among messages in the system. This is in contrast to cache coherence protocols in prior art NUMA multiprocessors, which employ mechanisms to detect deadlock and then resolve the deadlock situation by negatively acknowledging selected messages and retrying corresponding commands.

A brief description of the use of channels is provided below, although a more detailed description will be provided later herein. As mentioned above, messages are routed within the large SMP system using logical datapaths called "channels". The following channels are included in one embodiment of the invention: a Q0 channel for carrying transactions from a requesting processor to the Arb bus on the home node corresponding to the address of the transactions, a Q1 channel, for carrying transactions from the home Arb bus to one or more processors and IOP, and a Q2 channel, for carrying data fill transactions from an owner processor to the requesting processor. A Q0Vic channel may be provided for carrying Victim transactions from a processor to memory for writing modified data. In addition, the Q0Vic channel may be used to carry Q0 transactions that must remain behind Victim transactions. Finally, a QIO channel is provided to carry IO-space transactions from a processor to an IOP.

The channels constitute a hierarchy as shown below:

(lowest) QIO>Q0Vic→Q0→Q1→Q2(highest),

As will be described later herein, in order to avoid deadlock, messages in any channel should never be blocked due to messages in a lower channel. More detail regarding the design and implementation of mechanisms that provide and employ the ordering properties and virtual channels is provided later herein.

Thus, as shown in FIGS. 7A and 7B, a large SMP system may be provided by coupling together any number of the SMP nodes of FIG. 2. The operation of a large SMP system such as that shown in FIGS. 7A and 7B is provided below and described in three portions. First, the hardware components that may be included in the large SMP are described. Then a cache coherence protocol that provides for coherent data sharing between processors in the SMP is described. In addition, the implementation and use of virtual channels is described, including support mechanisms that are provided for virtual channels in the hierarchical switch.

HARDWARE COMPONENTS OF THE LARGE SMP

Several elements are provided in each of the multi-processing nodes for implementing coherent data sharing using channels. Referring back to FIG. 6, these elements include the directory 140, the DTAG 20, the IOP tag 14b, the global port 120 and a directory 140. In addition, a hierarchy of serialization points allows for an order of references to be maintained to facilitate cache coherency protocol. Each of the elements will now be described in more detail below.

The Global Port:

The global port 120 allows for the multi-processor node 100 to be coupled directly to one or more similarly constructed multi-processing nodes via an hierarchical switch link 170. Because each node 100 operates as a symmetric multi-processing system, as more nodes are added into the system the available addressing space and processing power is increased.

Figure 8:
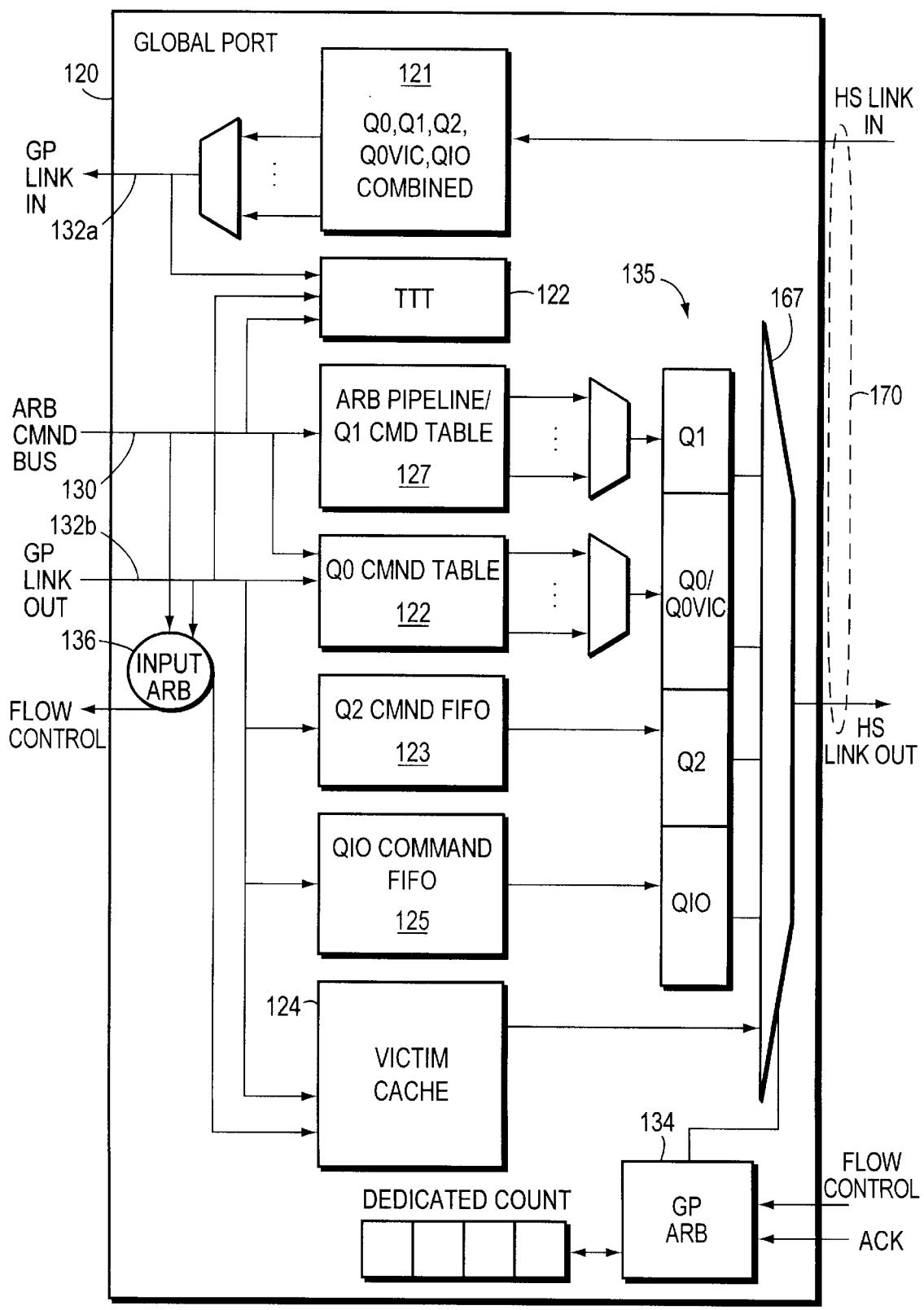
FIG. 8 is a block diagram of a global port of FIG. 6.

Referring now to FIG. 8, an expanded block diagram of global port 120 is shown. The global port includes a transaction tracking table (TTT) 122, a victim cache 124, packet queues 127, 122, 123 and 125 for storing packets being forwarded from the multi-processor node to the hierarchical switch, and a packet queue 121 for storing packets being received from the hierarchical switch. The global port 120 communicates with the other logic in the node (in particular the QSA chip) via Arb bus 130 and two dedicated ports on the local switch; i.e., GP Link In 132b and GP link out 132a.

The TTT keeps track of outstanding transactions at the multi-processor node; i.e., those transactions that have been issued from the node over the global port and are awaiting responses from other multi-processor nodes or from the hierarchical switch. Each time a command is sent to the global port, an entry is created in the TTT. When corresponding responses have been received at the node, the TTT entry is cleared. The TTT consists of two parts: the Q0 TTT and the Q1 TTT, where Q0 and Q1 refer to packets traveling on the Q0 and Q1 channels as described above. The particulars of how an entry is allocated to the TTT, and when it is retired are described in further detail below.

The global port 120 also includes the victim cache 124. The victim cache 124 stores victimized data received from each of the processors of the multi-processor node and destined for memory on another multi-processor node. Victimized data is data that was stored at a cache location in the processor and modified by that processor. When new data is received at the processor that needs to be stored at the cache location storing the modified data, the modified data is said to be victimized, and is referred to as victim data.

The victim cache 124 provides temporary storage of victim data from victim data directed from a processor to a memory on a remote multi-processor node. When there is the opportunity for transmitting victim data over the global port to another node, a multiplexer 167 is switched to provide data from the victim cache 124 onto the output portion of bus 170. Providing a victim cache at the global port allows for the processors to empty their respective victim data buffers without having the individual processors wait out the memory write latency of the global system. Rather, victim writes may be controlled by the global port such that writes are performed whenever there is an available data cycle. There are some control issues surrounding the appropriateness of releasing data from the Victim cache, but these are described below.

DTAG and IOP Tag:

The DTAG and IOP tag are also included in the small SMP system, but are described below in more detail. The DTAG 20 stores status information for each of the blocks of data stored in caches of the processors of the multi-processor node. Similarly, the IO Tag 14a stores status information for each of the blocks of data stored in the IOP. While the directory provides coarse information identifying which of the multi-processing nodes stores copies of the data, the DTAG and IO tag may be used to provide a more precise indication as to which of the processors within a multi-processing node stores copies of the data. Therefore, the DTAG and IO tag are used to determine, once a reference has reached a multi-processor node, which processors in the node should be targeted.

Figure 6:
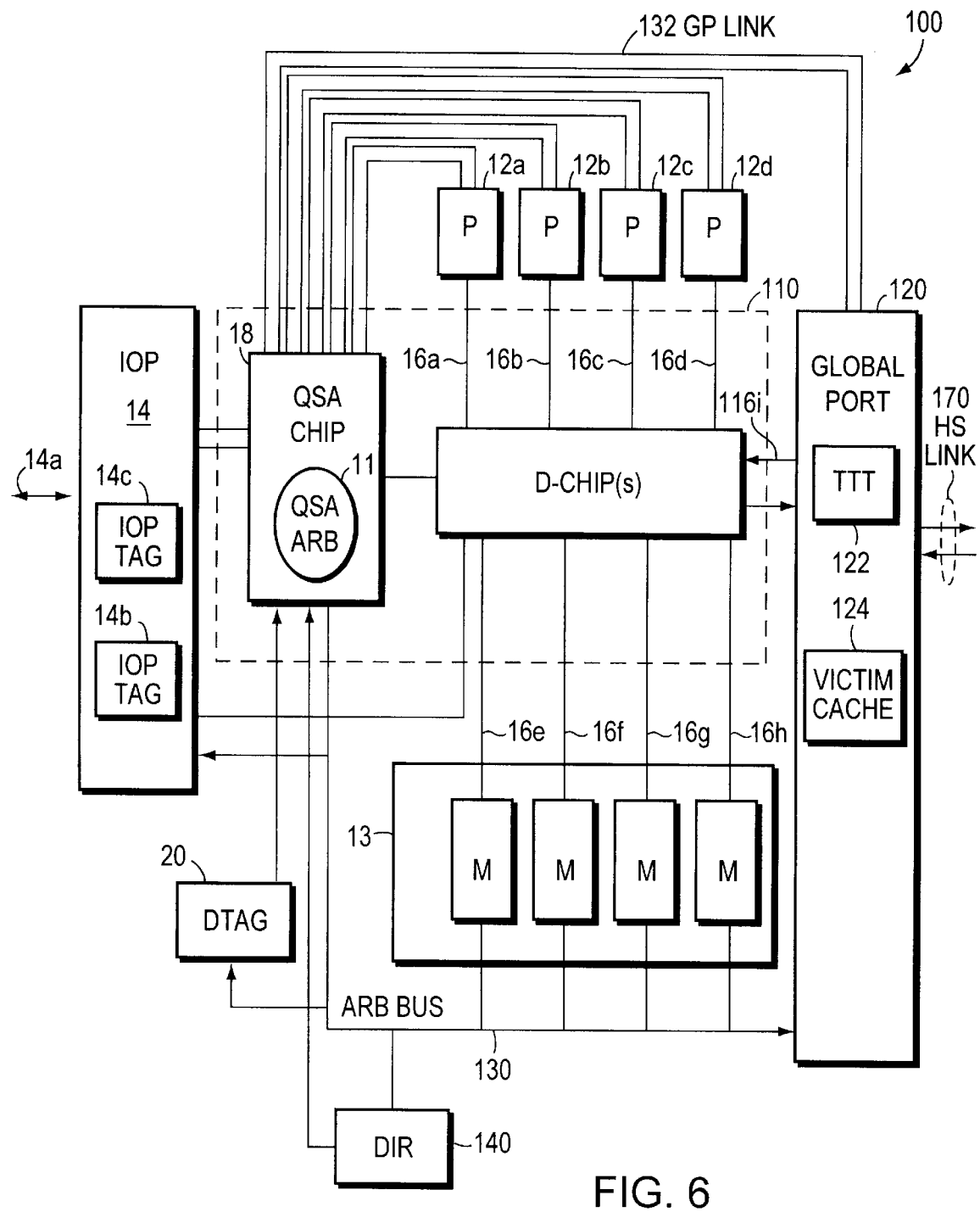
FIG. 6 is a block diagram of the multi-processor computer node of FIG. 2, augmented for connection into a larger network of similar nodes.

As shown in FIG. 6, the DTAG 20 and the IOP tag 14b are coupled to the Arb bus 130 for monitoring addresses that reference the memory region coupled to the QSA chip 18. The DTAG is apportioned into 4 segments corresponding to the four processors 12a–12d. Each of the processors includes a cache (not shown) for temporary storage of a subset of data from the memory 13. Associated with each cache is a tag store, for storing the upper address bits (tags) of blocks of memory stored in the cache of each processor. Each segment of the DTAG 20 maintains data that indicates the state of the associated processor's cache tags. Storing a copy of the tags at the DTAG 20, external to the processing units, enables the system to filter commands received on the Arb bus and to forward only those probe (read) and invalidate commands that are associated with the data in the processor's cache to the respective processor. The IOP tag 14a stores the upper address bits of each of the blocks of data stored in the IOP cache 14c. The IOP tag store is similar to the tag stores maintained in each of the processors 12a–12d.

Each entry in the DTAG 20 and the IOP tag 14a includes a number of status bits. DTAG status bits indicate one of the four following states: Invalid, Clean, Dirty_Not_Probed, Dirty_Probed. The status bits of an entry in the IOP tag indicate one of the two following states: Valid and Dirty. A Valid bit indicates that the data stored in the corresponding entry of the associated cache matches the data stored in memory. A Dirty bit indicates that the data stored in the corresponding entry of the associated cache has been modified by the associated processor and does not match the data stored in memory.

The DTAG 20 and IOP tag 14b are accessed each time a command appears on the Arb bus of a multiprocessor node

100. If a status of Invalid is returned in response to the DTAG access for processor one, then processor one on the node does not store a valid copy of the data associated with the memory address. If a status of Valid is returned from an access to the IOP tag 14*a*, then the IOP cache 14*c* stores a valid copy of the data. If a status of Clean is returned in response to a DTAG access for processor one, this indicates that processor one has an unmodified copy of the data corresponding to the memory address but no attempts have been made by any other processor to read that data. If a status of Dirty_Not_Probed is returned in response to a DTAG, this indicates that the processors one has a modified copy of the data corresponding to the memory address, and that at least one processor has attempted to read the data since the processor last modified the data.

Directory Operation:

In general, the directory is used to provide ownership information for each block of memory at the associated multi-processing node (the home node), where a block of memory is generally the smallest amount of data that is transferred between memory and a processor in the SMP system. For example, in one embodiment of the invention, a block is analogous to the size of a packet; i.e., 512 bits (64 bytes) of data. In addition, the directory indicates which multi-processing nodes store copies of the block of memory data. Thus, for read type commands, the directory identifies the location of the most recent version of the data. For victim type commands, where a modified block of data is written back to memory, the directory is examined to determine whether the modified block of data is current and should be written to memory. Therefore the directory is the first access point for any reference to a block of memory at the associated multi-processor node, whether the reference is issued by a processor at a remote multi-processor node or a local multi-processor node.

The directory stores one 14 bit entry for each 64 byte block of data (also referred to hereinafter as a cache line) of memory 13 at the corresponding node 100. Like the memory 13, the directory is physically distributed across the nodes in the system, such that if a memory address resides on node N, the corresponding directory entry also resides on node N.

Figure 9:
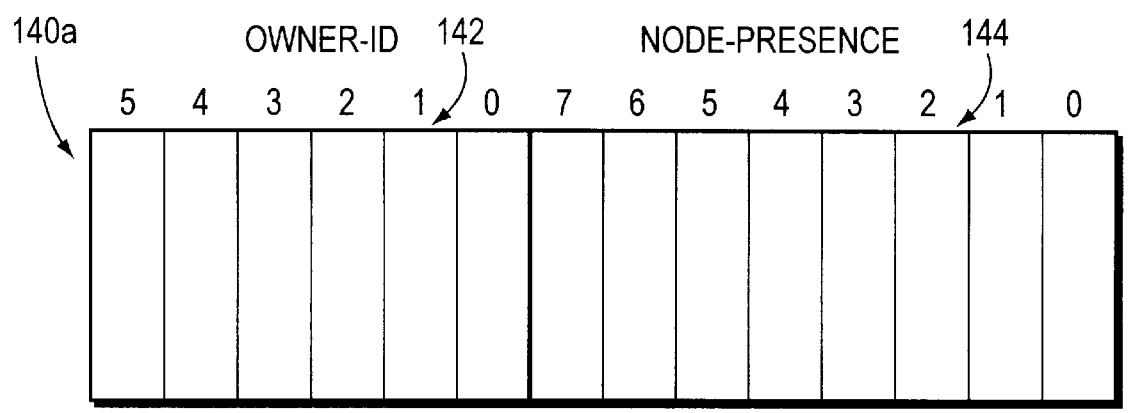
FIG. 9 illustrates an entry in a directory of the multi-processor node of FIG. 6.

Referring now to FIG. 9, one embodiment of a directory entry 140*a* is shown to include an owner ID field 142 and a node presence field 144. The owner ID field comprises six bits of owner information for each 64 byte block. The owner ID specifies the current owner of the block, where the current owner is either one of the 32 processors in the system, one of the eight I/O processors in the system, or memory. The eight bits of node presence information indicate which of the eight nodes in the system have acquired a current version of the cache line. The node presence bit is a coarse vector, where one bit represents the cumulative state of four processors at the same node. In the case of shared data, more than one node presence bit may be set if more than one node has at least one processor storing the information.

On occasion, certain pieces of state information may be obtained from either the DTAG or the directory. In such cases, the state information from the DTAG is preferable used since it is retrieved much faster. For example, if the owner processor of a memory address is located at the home node for the address, the DTAG may be used to supply the owner ID.

For information or references that are not serviced by the DTAG for performance reasons, the directory 140 is the focal point for all coherence decisions, and as such performs a number of functions. The directory identifies the owner of a block of memory data. The owner may either be a processor or memory. The owner information from the directory is used by read type commands (e.g., Read, Read-Modify) to determine the source of the most recent version of the data block. The owner information is also used for determining whether victimized data should be written back to memory as will be described in more detail below.

In addition to identifying the owner of data for all read type commands, the directory is used to resolve Clean-to-Dirty and Shared-to-Dirty commands from the processor. A Clean-to-Dirty command is issued by a processor when it wants to modify a cache line currently in Clean state in its cache. A Shared-to-Dirty commands is issued when it wants to modify a cache line in Dirty-Shared state. The commands are routed to the home Arb bus, wherein the Directory determines whether the processor has an up-to-date version of the cache line. If so, the command succeeds and the processor is allowed to modify the cache line. Otherwise, the command fails and the processor must first acquire a up-to-date version of the cache line. These store type operations use the node presence information in the directory to determine success or failure.

As mentioned above, the presence bits of the directory identify the multi-processing node with copies of each data block when store type commands are issued. Store commands indicate that the contents of the cache line are going to be updated. By examining the presence bits 144 of the associated directory entry, when a store command is received at the directory 140, the nodes with their presence bit are used to identify those multi-processing nodes with copes of the cache line at that node so that the cache lines at each of the nodes can be invalidated.

Accordingly, the directory and the DTAG operate in conjunction to provide status information for each of the data block in the memory of the local multi-processor and each of the data blocks stored in the caches of local processors. The directory at the home node provides coarse information about the status of copies of a cache block. Then, Invalidate commands go to those nodes identified by the directory, where the DTAG is accessed to further refine the copy information. Thus, the DTAG at those nodes indicates which processors at the respective nodes store copies of the line in their cache.

The TTT:

The TTT is used to keep track of transactions outstanding from a multi-processor node; i.e., references awaiting responses from another multi-processing node or the hierarchical switch. Information on outstanding transactions is used by the cache coherence protocol in the processing of subsequent commands to related memory addresses.

Referring now to FIG. 10, one embodiment of the TTT 122 is shown to include an address field 152, a command field 154, a commander ID field 156, and a number of status bits 158 including bits 158*a*–158*c*. The address field 152 stores the address of the cache line for a transaction that is currently in flight, while the command field stores the command associated with the cache line for the transaction currently in flight. The commander ID field 156 stores the processor number of the processor that initiated the command stored in the command field. The status bits 158 reflect the status of the command as it is in flight. Alternatively, the status bits 158 may be used to reflect various properties of the command that is in flight.

For example, a Fill status bit 158*a* is updated when a Fill data response is received in response to a Read-type command. A Shadow status bit 158*b* is set if the command that is issued over the global port is a Shadow-type command (described in more detail below). The ACK status bit 158*c* is set if a message expecting an acknowledge type response has received the response. If the response arrives, the bit is cleared. Note that not all of the status bits that may be included in the TTT have been shown. Rather, those status bits that will have relevance to later description have been included. In addition it is envisioned that other status bits may alternatively be provided as deemed necessary to maintain memory coherency, and thus the present invention should not be limited to any particular assignment of bits in the TTT.

Thus the directory, DTAG, IOP tag and TTT each are used to maintain coherency of cache lines in the SMP system (hereinafter referred to as cache coherency). Each of these components interfaces with the global port to provide coherent communication between the multi-processor nodes coupled to the hierarchical switch 155.

Serialization Points:

In addition to the above elements, data sharing coherency is maintained by providing a serialization point at each multi-processor node. In one embodiment of the invention, the serialization point at each multi-processing node is the arb bus 130. All Q0 references, whether issued by a local processor or a remote processor, are forwarded to the directory 140 and DTAG 20 on the arb bus 130 by the QSA. Once the references have accessed the directory and/or the DTAG, resulting Q1 channel commands are output in a strict order on the Arb bus, where the order is the serialization order of the references. By providing a serialization point in each of the multi-processing nodes, the data sharing coherency protocol that is implemented in the SMP is greatly simplified.

In addition to providing a serialization point in each of the multi-processor nodes, the hierarchical switch 155 provides a second serialization point in the SMP system. As will be described in more detail below, the hierarchical switch conforms to certain ordering rules that ensure that the coherency introduced at the first serialization point is maintained in the large SMP system.

Global Port/Hierarchical Switch Interface

Figure 11:
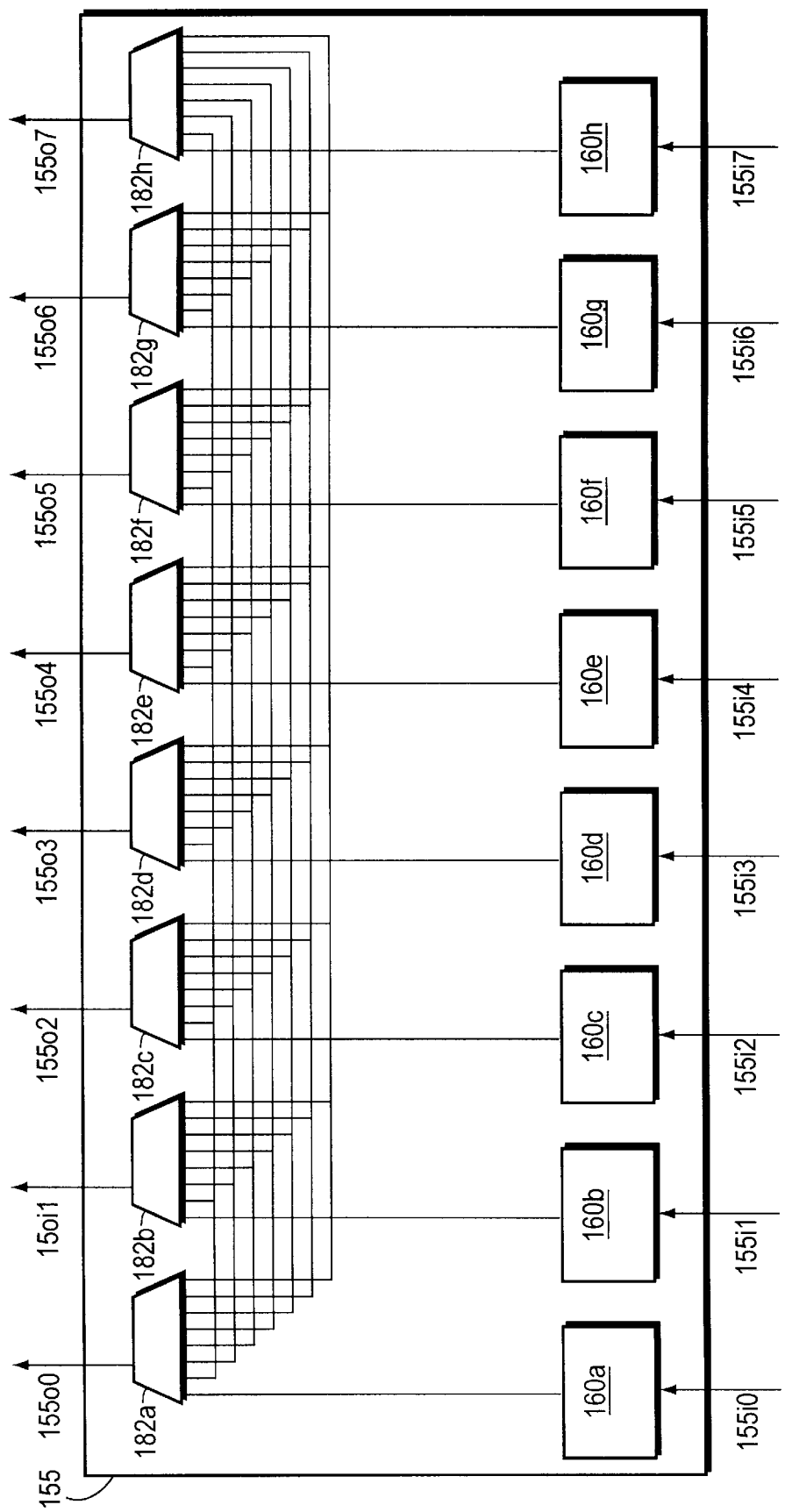
FIG. 11 is a block diagram of a hierarchical switch for coupling the multiple nodes in FIG. 7A.

Referring now to FIG. 11, a block diagram of the hierarchical switch 155 is shown including eight input ports 155*i*0–155*i*7 and eight output ports 155*o*0–155*o*7. Input ports 155*i*0–155*i*7 of the hierarchical switch 155 receive packets from the global ports of each of the coupled multi-processing nodes. Output ports 155*o*0–155*o*7 of the hierarchical switch forward packets to the global ports of each of the coupled multi-processing nodes.

In one embodiment of the invention, associated with each input port is a buffer 160*a*–160*h* for buffering received packets. Although the embodiment of FIG. 11 illustrates one buffer for each input, buffers may alternatively be shared among any number of input ports. As mentioned above, each of the packets may be associated with any one of five channels. In one embodiment of the invention, as will be described below, portions of each input buffer 160*a*–160*h* are dedicated for storing packets of certain channels. Accordingly, flow control from the global ports to the hierarchical switch 155 is performed on a channel basis. By controlling the flow of data into the switch on a channel basis, and by dedicating portions of the input buffers to selected ones of the channels, the switch provides for dead-lock free communication between multi-processor nodes in the SMP system.

In addition to providing dead-lock free a communication, the hierarchical switch 155 additionally is designed to support ordering constraints of the SMP system in order to ensure memory coherency. Ordering constraints are imposed by controlling the order of packets that are forwarded out of the switch 155 to the global ports of the associated multi-processor nodes. Packets from any of the input buffers 160*a*–160*h* may be forwarded to any of the output ports via multiplexers 182*a*–182*h*. As will be described in more detail below, in addition, the switch 155 is capable of multi-casting packets. Accordingly, packets from one input buffer may be forwarded to any number of output ports. By enforcing order at the global port outputs, the serialization order obtained at each of the multi-processor nodes may be maintained to provide an overall coherent data sharing mechanism in the SMP system.

Dead-lock Avoidance in the Hierarchical Switch:

As mentioned above, each one of the eight nodes of FIG. 7A forwards data to the hierarchical switch, and it may occur that all of the nodes are forwarding data simultaneously. The packets are apportioned into a number of different channel types (Q0, Q0Vic, Q1, Q2 and QIO) that are forwarded on different virtual channels, where a virtual channel is essentially a datapath dedicated to packets of a specific type that may share a common interconnect with other channels, but is buffered independently on either end of the interconnect. Because there is only one datapath between the global port of each of the nodes and the hierarchical switch, all of the packets from different virtual channels are written to the hierarchical switch using the one datapath.

Since each of the eight nodes 100*a*–100*h* is capable of sending data to the hierarchical switch, some form of control is necessary to properly ensure that all messages are received by the switch and forwarded out of the switch in an appropriate order. In addition, it is one object of the invention to ensure that higher order packet types are not blocked by lower order packet types in order to guarantee that deadlock does not occur in the symmetric multi-processing system. In one embodiment of the invention, the order of packets, from highest order to lowest order is Q2, Q1, Q0, Q0Vic and QIO.

According to one aspect of the invention, a scheme for flow-controlling packets arriving at the input ports of the switch is provided that ensures that the deadlock-avoidance rule above is always satisfied. Further, the buffers available in the switch must be utilized optimally and maximum bandwidth must be maintained.

According to one embodiment of the invention, a control apparatus for controlling the writing of data to the hierarchical switch is implemented by providing, for each of the types of packets, dedicated slots in a buffer of the hierarchical switch. The buffer also includes a number of generic slots that may be used for storing packets of any type. By providing dedicated buffer slots at the hierarchical switch, deadlock can be avoided by guaranteeing that higher order packet types always have a path available through the switch. In addition, by monitoring the number of generic slots and dedicated slots available, and by monitoring the number of the different types of packets that are stored in the buffer, a straightforward flow control scheme may be implemented to preclude nodes from writing to the buffer of the hierarchical switch when the buffer reaches capacity.

Figure 12A:
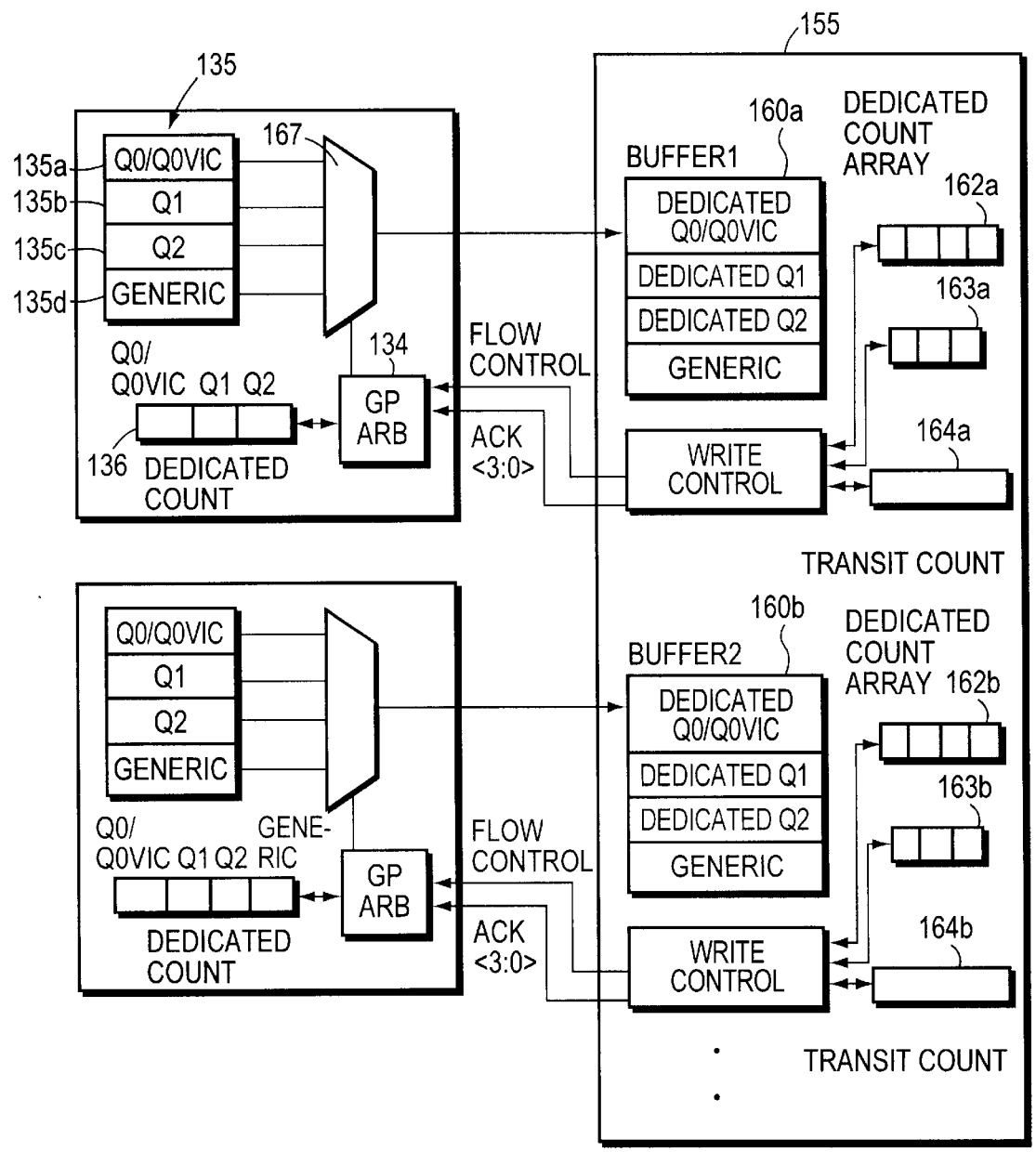
FIG. 12A is a block diagram of one embodiment of interconnect logic for the hierarchical switch that eliminates deadlock.

Referring now to FIG. 12A, an example of control logic for use in controlling the writing, by multiple source nodes, of a common destination buffer is provided. In the block diagram of FIG. 12A, by way of example, the global ports 120*a* and 120*b* of two different nodes has been shown.

In FIG. 12A, portions of the global ports 120*a* and 120*b* of nodes 100*a* and 100*b*, respectively, are shown in more detail to include a buffer 135 including entries 135*a*–135*b* for respectively storing Q0/Q0Vic, Q1, Q2 and generic type packets (either Q0, Q0Vic, Q1, Q2 or QIO packets) for transfer to the hierarchical switch 155. A multiplexer 167a, is coupled to the buffer 135 to select one of the packet types for forwarding over the link to the hierarchical switch using a select signal from the GP arbiter 134.

In addition, each global port includes a dedicated count register 136. The dedicated count register stores a count, for each Q0/Q0Vic, Q1 and Q2 channel type of packet, of the number of packets of that channel type that are currently pending at the hierarchical switch 155. The count is incremented when the packet of the respective channel type is transferred to the hierarchical switch, and decremented when the packet is transferred out of the hierarchical switch.

In one embodiment of the invention, the hierarchical switch 155 includes one buffer for each of the eight input sources. In FIG. 12A, only two buffers 160a and 160b, corresponding to the two global ports 120a and 120b have been shown. In one embodiment of the invention, there are at least (m−1)×n dedicated slots in each of the buffers 160a and 160b, where m corresponds to the number of virtual channels types that have dedicated entries in the buffer n corresponds to the number of nodes that are sharing a buffer. In the embodiment of FIG. 12A, each of the buffers includes eight entries. Five of the entries are generic entries, and may store any type of packet that is forwarded from the global port 135. Each of the remaining three entries are dedicated to storing a specific type of packet, with one entry being dedicated to storing Q0/Q0Vic packets, one entry being dedicated to storing Q1 type packets and one entry being dedicated to storing Q2 type packets.

Although the dedicated entries have been shown as residing in a fixed location in the buffers 160a and 160b, in reality, any of the locations of the buffer may be the dedicated buffer location; i.e., there is always one dedicated entry in the buffer for each specific type of packet, regardless of the location of the entry.

The hierarchical switch additionally includes, for each buffer 160a and 160b, a dedicated counter 162a and 162b, and a flag register 163a and 163b, respectively. In the embodiment of FIG. 12A, the dedicated counter 162a includes four entries, three entries for storing the number of Q0/Q0 Vic, Q1 and Q2 packets that are currently stored in the buffer 160a, and one entry for storing a count of the number of used generic entries in the buffer. The flag register comprises three bits, with each bit corresponding to one of the Q0/Q0 Vic, Q1 and Q2 types of packets, and indicating whether associated dedicated counter is zero (i.e., whether the dedicated entry for that type of packet has been used). Thus, the values in the flag register are either a one, indicating that at least one packet of that type is stored in the buffer, or zero, indicating that no packets of that type are stored in the buffer.

In addition, the hierarchical switch 155 includes, for each buffer 160a and 160b, a transit count 164a and 164b, respectively. The transit count maintains, for each source, the number of outstanding packets of any type that may be in transit during a given data cycle.

The number of packets that may be in transit during any given data cycle is directly related to the flow control latency between the hierarchical switch and the global port. A flow control signal is forwarded from the hierarchical switch to the global port to signal the global port to stop sending data to the hierarchical switch. The flow control latency (L) is measured as the number of data transfer cycles that accrue between the assertion of a flow control signal by the hierarchical switch and the stop of data transmission by the global port.

The hierarchical switch also includes write control logic 166a and 166b for controlling the writing of the respective buffers 168a and 168b. The write control logic controls the flow of data into the associated buffer by asserting the Flow Control signal on line 168a and the Acknowledgment (ACK) signals<3:0> on lines 168b. The Flow Control and ACK signals are sent each data transfer cycle. As mentioned above, the Flow Control signal is used to stop transmission of packet data by the coupled global port. The ACK signals<3:0> on lines 168b include one bit for each of the dedicated types of packets, and are used to signal the coupled global port that a packet of that type has been released from the associated buffer. The ACK signals are thus used by the global count to increment the values in the dedicated counter 136.

The write control logic asserts flow control when it is determined that the total of the available generic entries in the buffer and are not sufficient to accommodate all of the possible packets that may be in transit to the hierarchical switch. The number of available generic slots can be determined by the below Equation I:

Generic_count=Buffer Size−# of used Generic entries in buffer−# unasserted Flags   Equation I Once the number of available generic entries has been determined, the flow control signal is asserted if Equation II is true:

Generic_Count>=Transit count*Number of nodes using the buffer.   Equation II

Accordingly, the write control logic 166 monitors the number of generic and dedicated slots in use, the transit count and the total buffer size to determine when to assert a Flow Control signal.

The assertion of the Flow Control signal does not stop all transmission by a global port of a source node. The global port may always transfer dedicated packet data to the hierarchical switch if the dedicated slot corresponding to that dedicated packet type is available in the buffer of the hierarchical switch. Thus, if the values of any of the dedicated counts in the dedicated counter are equal to a zero, the global port may always transfer packet data of the corresponding dedicated packet type. accordingly, providing dedicated entries in the buffer effectively guarantees that the progress of packets of one type through the hierarchical switch does not depend on the progress of any other packets through the switch.

The use of the dedicated and generic slots in the buffers 160a and 160b allows a minimum number of slots to be reserved for each packet type. By keeping track of the number of packets in transit, flow control may be achieved in a finely-grained manner. Both buffer utilization and bus bandwidth are maximized. For example, when only X generic slots are available, flow control may be deserted for one cycle and then reasserted in the next cycle. As a result, up to X more messages may be received within the time period.

Figure 12B:
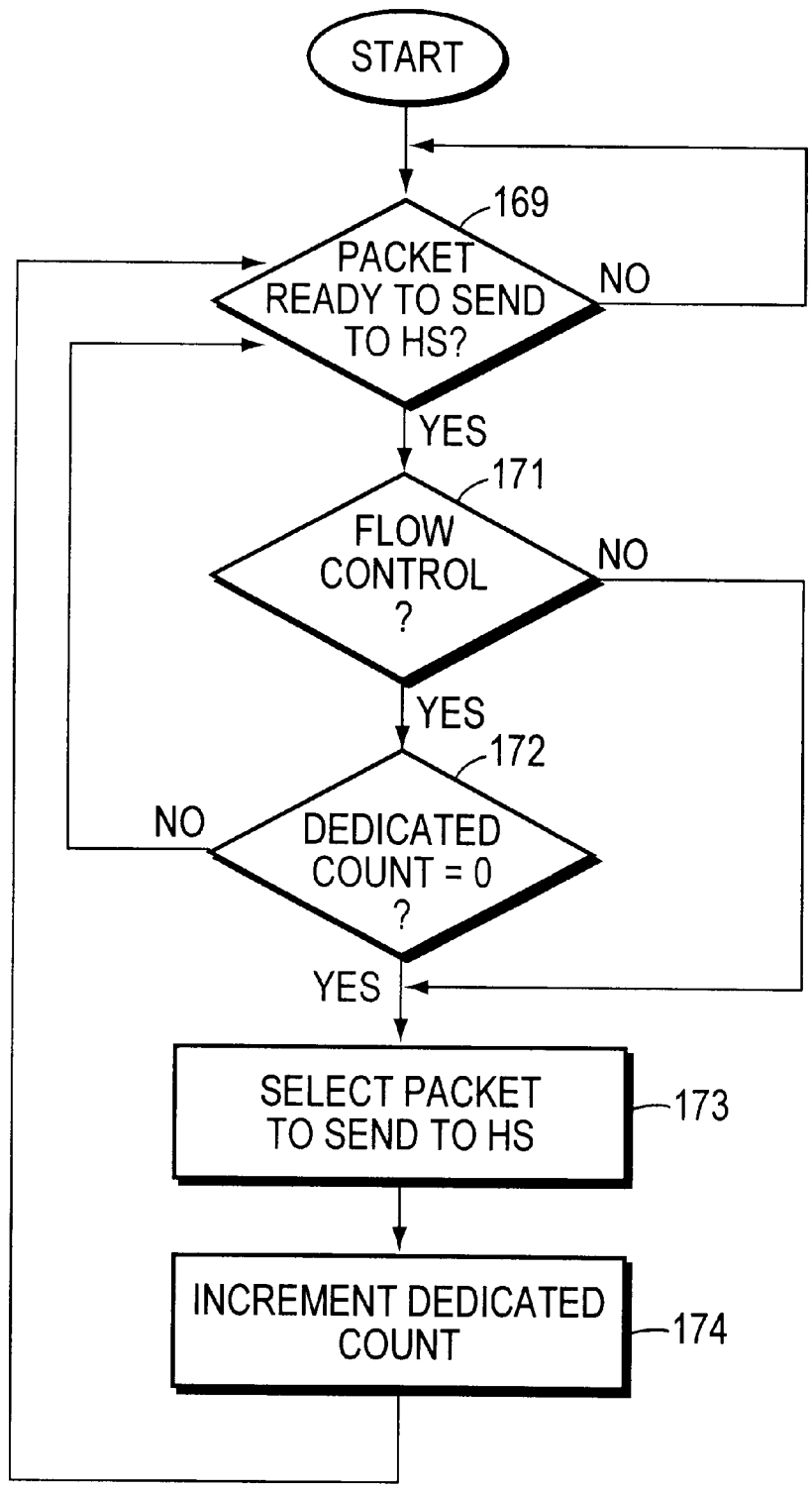
FIG. 12B is a flow diagram of the operation of the interconnect logic of FIG. 12A.

Referring now to FIG. 12B, a flow diagram is shown outlining a method used by the global port for forwarding data to the hierarchical switch. The process is described with reference to one type of packet, although it is equally applicable to packets of other types. At step 169, it is determined at the GS arbiter 134 whether or not there is a packet in one of the buffers 135a–135d to forward to the hierarchical switch 155. If a packet is available, at step 171 the state of the Flow Control signal is evaluated by the arbiter 134. If the Flow Control signal is asserted, at step 172 the dedicated count for the specific type of packet that is to be sent by the hierarchical switch is examined to determine whether or not it is equal to zero. If the dedicated count is not equal to zero, then the dedicated entry in the buffer for that type of packet is already in use and the process returns to step 170 where it loops between steps 169, 171, and 172 until the dedicated count for that packet type is equal to zero or until the flow control signal is deasserted. If it is determined at step 172 that the dedicated count is equal to zero, then at step 173 the GP arbiter 134 asserts the appropriate select signal to the multiplexer 167 in order to forward the desired packet to the hierarchical switch 155. At step 174, the dedicated count corresponding to the selected type of packet is incremented at the dedicated count registers 134 in the global port and at the dedicated count register 162*a* in the hierarchical switch 155, and the associated flag in the flag register 163*a* is asserted.

As described above, the flag register 163*a* is used together with the generic count and the transit count to determine the status of the Flow Control signal for the next data cycle. Referring now FIG. 13, one embodiment of a process for controlling the assertion of the Flow Control signal by the hierarchical switch is shown. At step 175, the flag register 163*a* is examined to count the number of dedicated count entries that is equal to zero. As mentioned above, the number of zeros indicates the number of potential dedicated packets that may be forwarded by each of the nodes coupled to the buffer even after Flow Control is asserted. Accordingly, if none of the dedicated slots for any of the nodes were used in the example of FIG. 11, then all of the entries of the flag register would be equal to zero, thus indicating that there are 3 buffer locations that should be reserved for the dedicated packets.

After the values in the flag register 163*a* have been examined, at step 176 the total available generic slots are determined using above equation I. Next, at step 177 the transit count for each node is determined. As mentioned above, the transit count indicates the number of messages that may be in transit between the global port and the hierarchical switch for any given data cycle. The worst case count transit count is equal to the flow control latency L times the number of nodes using the buffer N. However, according to one embodiment of the invention, the determination of the transit count takes into consideration whether or not the Flow Control signal was asserted for previous cycles. As noted, if the Flow Control signal was asserted in a previous cycle, no packets are in transit between the global port and the hierarchical switch. For example, if Flow control has been zero for the previous J periods, up to J×N messages can be in transit. However, if the flow control signal has been zero for J×1 of the previous data cycles, only (J−1)×N messages are in transit.

Thus, one embodiment of the invention intelligently determines the number of packets in transit by examining the total latency between the source (global port) and destination (hierarchical switch), and also by examining the interaction between the source and destination in previous data cycles. After the transit count for each node has been determined, at step 178 a determination is made as to whether there are enough available generic entries in the buffer to accommodate the outstanding dedicated packets and the packets in transit using the above Equation II. If the total number of available generic packets is less than the number of packets in transit times the number of nodes sharing the buffer, then at step 178 the Flow Control signal is asserted to the global port 120*a* to preclude the forwarding of data to the hierarchical switch 155. However, if the total count indicates that the number of potentially received packets may be accommodated by the buffer 160*a*, the Flow Control signal is not asserted and the process then returns to step 175 for the next data cycle.

Accordingly, by keeping track of the number of messages that are in transit and the number of previous cycles in which the flow control signal was asserted, flow control may be fine-tuned to ensure that the use of the data link coupling the global port to the hierarchical switch is maximized.

Figure 13:
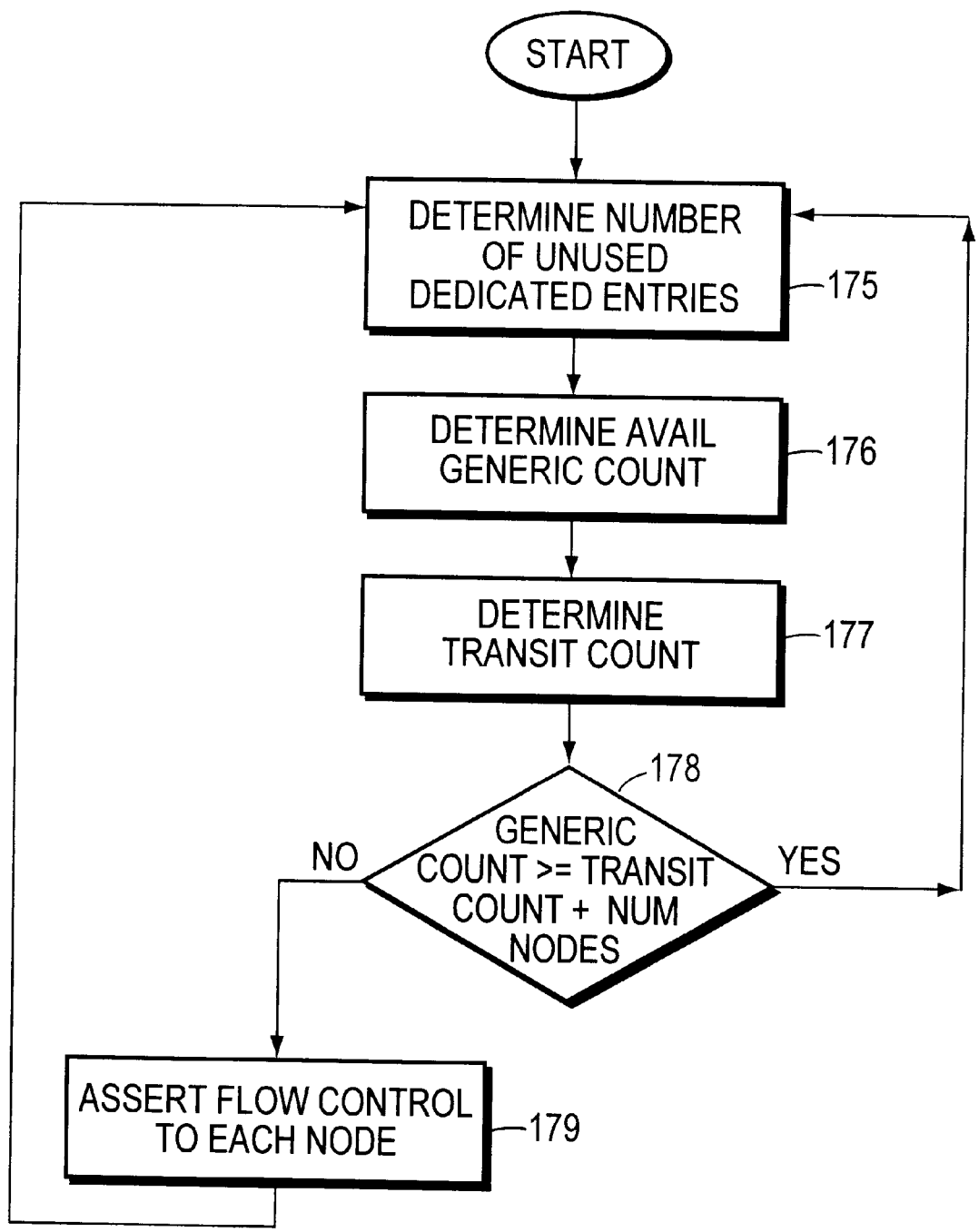
FIG. 13 is a flow diagram of the method used in the interconnect logic of FIG. 12A to assert flow control to stop data being transmitted from one of the multi-processing nodes.

Although the buffer write control logic and methods described in FIGS. 11–13 have been described with regard to the transmission of data from the nodes to the hierarchical switch, it should be noted that the present invention is not limited to such a construct. Rather, one embodiment of the invention may be used in any environment where there are multiple sources feeding a common receiver and deadlock needs to be avoided.

Mechanisms in the Hierarchical Switch to Support Channel Ordering Constraints:

Reading data from the hierarchical switch essentially involves forwarding data from an input buffer to a number of output sources such that both ordering of the packets and the data dependencies between the packets are maintained. As mentioned above, packets are delivered on a variety of channels. Associated with the packets on different channels are certain ordering constraints or dependencies. In one embodiment of the invention, one ordering constraint is that all packets on the Q1 channel be maintained in order. Another packet ordering dependency is that packets traveling on higher priority channels should not be blocked by packets traveling on lower priority channels, where the priority of channels, from highest to lowest, is Q2, Q1, Q0, Q0Vic and QIO. The maintenance of order is achieved throughout the SMP using various techniques described below. At the hierarchical switch, three basic guidelines are followed to ensure that data dependencies and Q1 channel ordering are satisfied. The guidelines are presented below:

Guideline 1: If multiple Q1 packets received on a given hierarchical switch input port are targeted to a common output port, the Q1 packets appear in the same order at the output port as they appeared at the input port.

Guideline 2: When Q1 packets from multiple input ports at the hierarchical switch are multi-casting to common output ports, the Q1 packets appear in the same order at all of the output ports that they target.

Guideline 3: When ordered lists of Q1 packets from multiple input ports of the hierarchical switch target multiple output ports, the Q1 packets appear at the output ports in a manner consistent with a single, common ordering of all incoming Q1 packets. Each output port may transmit some or all of the packets in the common ordered list.

Figure 14:
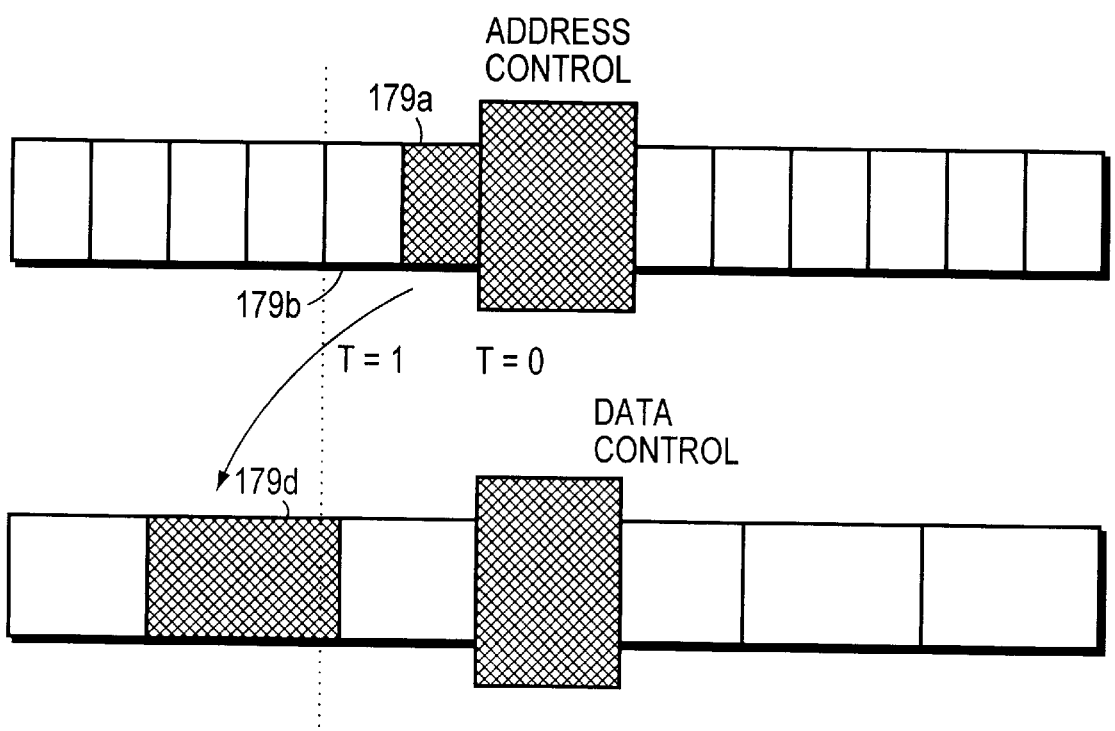
FIG. 14 is a timing diagram illustrating the transfer of address and data packets on the busses to and from the hierarchical switch.

In addition to maintaining overall system order for coherency purposes, it is also desirable to order the packets that are output from the switch such that the performance of the address and data busses is fully realized. For example, referring now to FIG. 14, a timing diagram illustrating the utilization of the address and data bus structure of the HS link 170 is shown.

The HS link 170 is coupled to each of the multi-processor nodes 100 by two pairs of uni-directional address and data busses. The data bus carries 512 bit data packets, and the address bus carries 80 bit address packets. The transmission of a data packet takes twice the number of cycles as the transmission of the address packet. Some commands, such as a write command, include both an address and a data packet. For example, in FIG. 14, address packet 179*a* corresponds to data packet 179*d*. If every command included both an address and a data packet, every other address slot on the address bus would be idle. However, many commands, such as a read command, include only address packets, and do not require a slot on the data bus for transferring data packets. Accordingly, in order to enhance the overall system performance, it is desirable to have a switch that selects packets to forward out of the bus in such an order that both the data portion and the address portion are 'packed', i.e., there is an address and data in every possible time slot of the address and data portions of the HS link. When the address and data are 'packed' on the HS link, the HS link is optimally utilized.

A variety of embodiments are provided for implementing a hierarchical switch capable of simultaneously receiving data from multiple sources via multiple input ports and forwarding data to multiple destinations via multiple output ports while satisfying data dependencies, maintaining system order and maximizing the data transfer rate. The various embodiments are described with reference to FIGS. 15–18.

Figure 15:
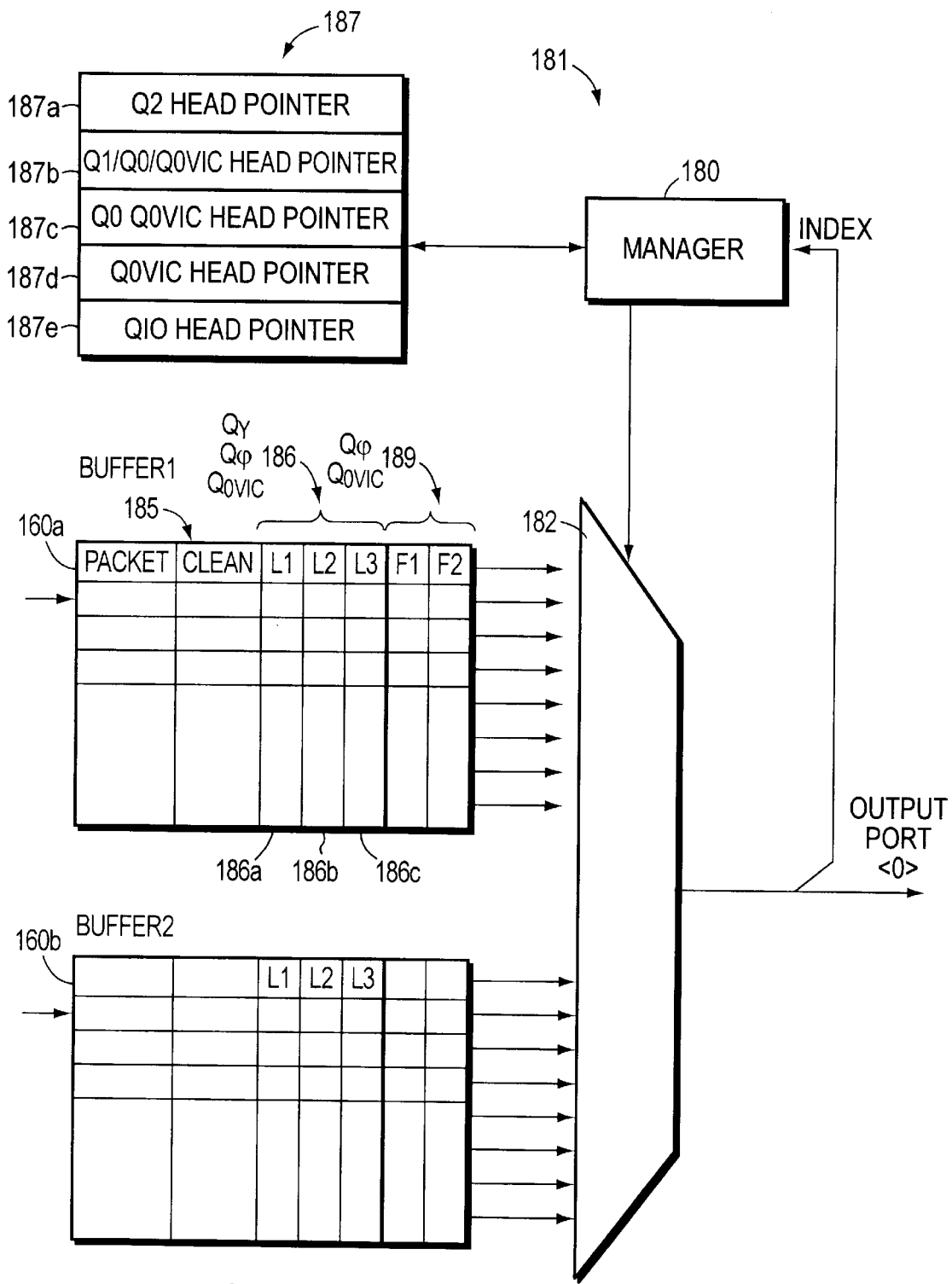
FIG. 15 is a block diagram of one embodiment of buffer logic for maintaining order at the hierarchical switch.

Referring now to FIG. 15, one embodiment of a switch capable 181 of implementing the above ordering constraints is shown. As described FIG. 11, the switch 155 includes a plurality of buffers 160*a*–16*h*. Each of the input buffers is a one write port/eight read port buffer and is coupled to receive packets from one of eight respective inputs. The switch also includes eight output ports, although the logic for only one output port, output port<0> is shown. The logic for the remaining output ports is similar and, for purposes of clarity, is not described in detail herein.

In one embodiment of the invention, each entry of each buffer includes a channel field 185, identifying the channel of a packet stored in the entry of the buffer. In addition each entry includes a series of link indices 186. Each link index is an index to one of the entries in the input buffers 160*a*–160*h*. The link indices are used to provide a link list addressing structure to access successive packets on the same channel from the buffer 160*a* in accordance with packet ordering constraints. There are three linked indices L1, L2 and L3 included with each entry, where each link index identifies a location of the entry in one of up to three ordered lists.

Each entry also includes dependency flags 189. The dependency flags are used to mark dependencies between channels. Dependency flag F1 is set if the packet at the corresponding entry is a packet traveling on either a Q1, QIO or Q0Vic channel. Dependency flag F2 is set if the packet at the corresponding entry is a packet traveling on either a Q0 or Q0Vic channel. The dependency flags help to maintain an order of processing of packets in the following manner.

Conceptually, the received packets are apportioned into five ordered queues including a Q2 channel queue, a combination Q1/QIO/Q0Vic channel queue, a combination Q0/Q0Vic channel queue, a Q0Vic channel queue and a QIO queue. Thus, a packet may be included in more than one queue. The head pointers include one pointer 187*a*–187*e* for each of the queues. The head points are used to provide an index into the buffers 160*a*–160*h* identifying the next packet in the buffer corresponding to that queue. The head pointers 187 thus include a Q2 head pointer 187*a*, a Q1/QIO/Q0Vic head pointer 187*b*, a Q0/Q0Vic head pointer 187*c*, a Q0Vic head pointer 187*d* and a QIO head pointer 187*e*. When a packet is first written into the input buffer, it is placed in one or more of the ordered queues. When it is placed in more than one ordered queue, one or more of the dependency flags 189 are asserted. The channel type and dependency flags are examined to select an appropriate entry in the buffer to output such that channel dependencies are satisfied.

Each of the entries of each of the eight input buffers 160*a*–160*h* are forwarded to multiplexer 182. Multiplexer 182 selects one of the packets from one of the input buffers in response to a select signal from the manager 180. The manager 180 selects entries from the 64 possible read ports of the input buffers 160*a*–160*h* as outputs for the associated output port. The manager 180 selects packets such that a total system order and channel dependencies are satisfied.

As a packet is received at one of the input buffers 160*a*–160*h*, the channel type is written to the channel field of the entry and any associated flags for that entry are asserted in flag field 189. As mentioned above, for each entry in the input buffer there are three link indices, each of which corresponds to one of three ordered queues. In one embodiment of the invention, the multiple link indices are used for multi-casting the packet to three different output ports. When a packet that is to be multi-cast is stored in the input buffer, it is placed on more than one of the linked lists, where the linked lists each correspond to different output ports. As a result, output managers associated with different output ports may each access the same input buffer entry using different linked list indices.

As mentioned above, the link index values are buffer index values for addressing the next packet of the corresponding type in the buffers 160*a*–160*h*. Accordingly, the link index value is not written until a subsequent packet of the corresponding type is written into the buffer. When the subsequent packet is written to the buffer, the address of the subsequent packet is written to the linked index of the previous packet, thereby providing an index to the next packet of that channel type. Because each of the entries includes three possible link index fields, in addition to writing the address in the previous entry, a two bit field (not shown) is stored with the address to enable the entry to identify the appropriate one of the three link indices for constructing the ordered list.

The manager 180 selects one of the packets in the buffers 160*a*–160*h* for forwarding to the output port in the following manner. As mentioned above, the head pointers 187*a*–187*e* store the buffer index corresponding to the top of each of the queues. When processing packets for a given channel, the manager selects the entry indicated by the corresponding head pointer. If one or more of the flags 189 are set, and packets in that queue associated with higher priority channels have not been processed, the packet may not be processed until all previous packets of having higher priority in the queue have been processed.

For example, if the output manager is processing Q0 type packets, it examines the entries indicated by the Q1/QIO/Q0Vic and Q0/Q0Vic head pointers. If the packet is a Q0 channel packet, but processing of Q1 packets has not yet been completed, the entry may not be processed. Processing of packets may be indicated by providing, with each of the flags F1 and F2, processing flags (not shown) that indicate that either channel Q1 or Q0 packets have already been processed. Once processing of all packets in the queue having higher priority channels has occurred, (as indicated by the processing flags), then the packet associated with the entry is free for processing.

When an entry is selected for processing, the manager selects the head pointer associated with the queue that the entry is in, as the buffer index. The buffer index is forwarded to multiplexer 182, and the buffer entry is forwarded to the output port. The link indices are forwarded back to the head pointer, and the head list pointer is updated with the buffer index of the next packet in that queue.

Accordingly, the switch embodiment of FIG. 15 uses a linked list data structure, ordered queues and flags for providing packets to an output port such that total system order is maintained. In addition, the linked list data structure that includes multiple link indices provides a straightforward mechanism for multi-casting packets while adhering to multi-cast packet ordering rules.

Figure 16:
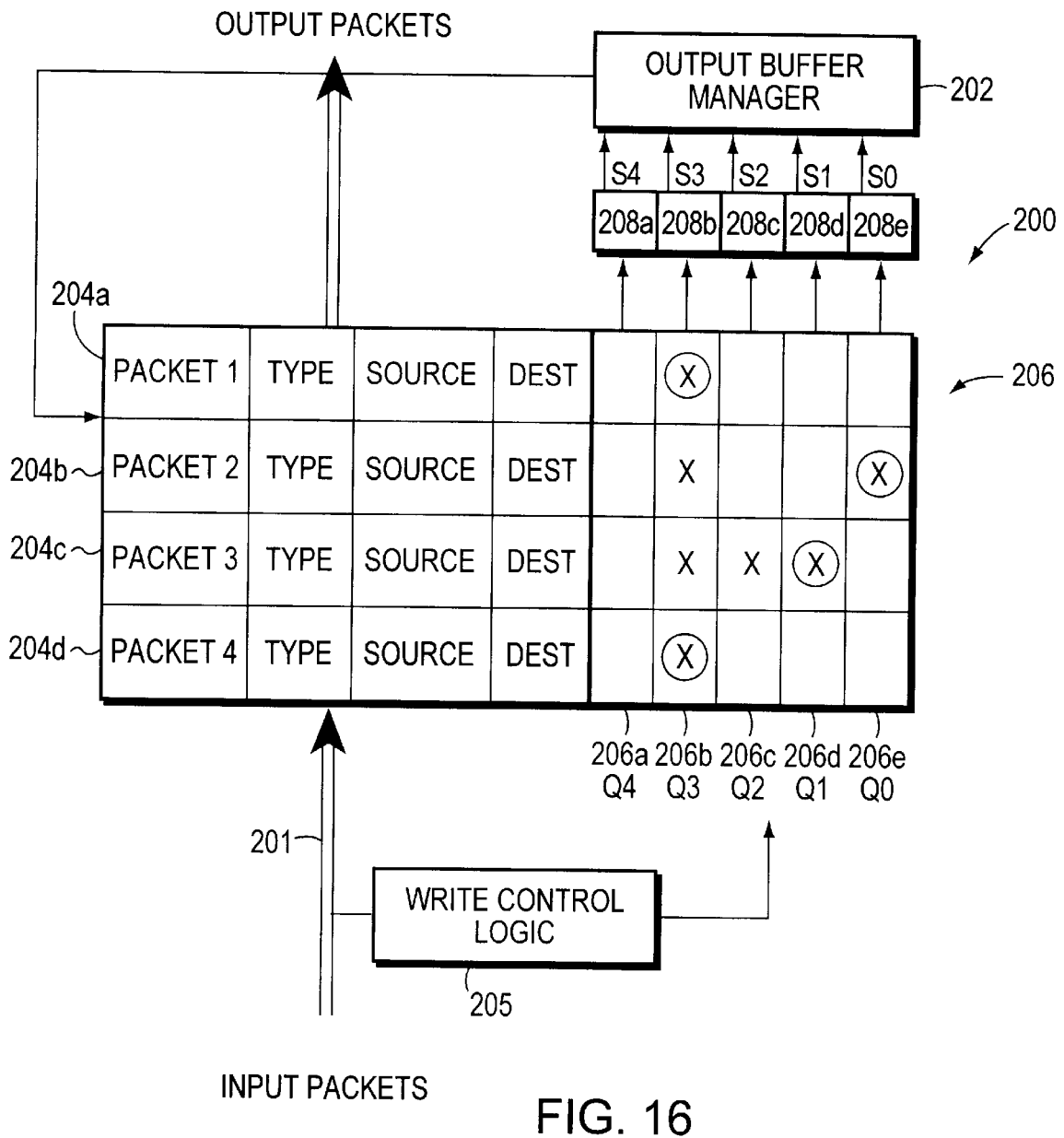
FIG. 16 is a block diagram of another embodiment of buffer logic for maintaining order for the hierarchical switch.

The embodiment of FIG. 15 thus uses flags and ordered queues to ensure that channel ordering is maintained. Referring now to FIG. 16, a second embodiment of a switch capable of providing output data according to predetermined ordering dependencies is shown. In the embodiment of FIG. 16, a buffer 200 is provided for every output port of the switch. The buffer 200 may be coupled to receive inputs from each of the buffers 160a–160h (FIG. 11) on an input packet receipt path 201, where packets from the input buffers are forwarded to the appropriate buffer of the output port depending upon the destination of the packets. In one embodiment of the invention, the buffer is implemented as a collapsing FIFO, although other buffering architectures known to those of skill in the art may alternatively be used.

Figure 16A:
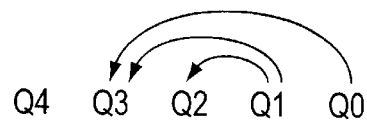

Buffer 200 is shown storing a variety of packets which are to be forwarded out of the switch. The buffer 200, in this description, stores packets transmitted on five different channels: Q0, Q1, Q2, Q3 and Q4. It should be noted that the channels Q0–Q4 are not analogous to the previously described channels Q0, Q1, Q2, Q0VIC and QIO. Rather, they are used merely for the purpose of describing the output operation of the switch. Packets Q0–Q4 thus represent generic packets on different channels, with the channel dependencies being defined according arrows in the flow diagram of FIG. 16A. In the diagram of FIG. 16A, an arrow directed from one channel to another indicates that the packets in the first channel may not be forwarded to an output port while there is a packet in the second channel, received prior to the packet in the first channel, pending processing by the switch. For example, in FIG. 16A, packets in channel Q0 are shown to be dependent upon the processing of packets in channel Q3 and thus it is said that packets in channel Q0 'pushed' packets in channel Q3. The additional dependencies represented by the flow diagram of FIG. 16A indicate that packets in channel Q1 pushed packets in channels Q2 and Q3. Again it should be noted that the dependencies represented by the flow diagram of FIG. 16A do not represent dependencies of the Q0, Q1, Q2, Q0VIC and QIO channels described previously. As will be described later herein, the dependencies of the packets in Q0, Q1, Q2, Q0VIC and QIO channels are complex and thus the generic packets and dependencies have been provided for ease of explanation of the operation of the buffer 200.

As mentioned above, input packets are received at each one of the input buffers 160a–160h of the switch in order and forwarded in order to the output buffers, such as buffer 200 depending upon the destination indicated by the packet. Each packet entry in each output buffer, such as entry 200a, includes a source and destination field, indicating the sending and receiving nodes for the packet, a channel field, indicating the channel on which the packet is transmitted, and a series of bits 206a–206e. The series of bits 206a–206e includes one bit for each channel that forwards packets through the hierarchal switch. For example, in the embodiment of FIG. 16, the series of bits includes one bit each for channel Q0, Q1, Q2, Q3 and Q4.

Write control logic 205, coupled to the input packet receipt path for the output port controls the setting of each of the series of bits according to the channel of the received packet and according to the dependencies between the channels indicated in the flow dependency diagram of FIG. 16A. As described in more detail below, the write control logic may also update the bits by recognizing dependencies, either statically or dynamically. When recognizing dependencies statically, the dependencies defined for the channels are applied without regard to the other packets that are in the buffer. When recognizing dependencies dynamically, the dependencies for the channels are applied by considering the channel and address destinations of the other packets in the buffer 200.

Coupled to each one of the series of bits is a corresponding search engine 208a–208e. Each search engine searches the associated column of bits to select an entry in the buffer 200 having the corresponding bit of the column set. The selected entry is indicated, for each column (or channel) by a series of signals S4–S0 to an output buffer manager 202. Using the select signals received by each of the search engines in conjunction with the known data dependencies between the channels, the output buffer manager selects one of the packets from the output buffer 200 to provide at that global port output.

During operation, as a packet is received on the input packet receipt path 201, the channel of the packet is evaluated by the write control logic 205 and the bit in the series of bits 206a–206e corresponding to that channel asserted. In FIG. 15, the bit that is set to indicate the type of packet is indicated by a '$\overline{x}$' and is referred to as a channel identifier flag. Accordingly, in FIG. 16, packet1 is a Q3 type packet. According to the embodiment of FIG. 15, in addition to asserting the bit indicating the channel of the entry, a bit is additionally asserted for each of the channels that the packet on that channel pushes. Each of these bits is referred to as a dependency flag, and are indicated by an 'x' in FIG. 16. Therefore, for packet2, which is a Q0 channel packet, the bit associated with the Q3 channel packet is additionally asserted since, as indicated in the flow diagram of FIG. 16A, Q0 packets push Q3 packets.

As packets are stored in the buffer 200 and their associated series of bits 206a–206e are asserted, each of the search engines 208a–208e associated with each column of bits selects the first entry in the buffer having a bit set. Therefore, the select value for search engine 208a would point to packet2, the select value for search engine 208b would point to packet3, and so on.

The S0–S4 signals are forwarded to the manager 202. The manager 202 selects one of the packets in response to the assertion of the select signals by the search engines and addition to the dependencies existing in the system. For example, according to one embodiment of the invention, a packet such as packet2, which is on channel Q0, is not forwarded out of the switch unless the search engine for channel Q0 (208a) as well as the search engine for channel Q3 (208d) are both selecting the same packet. Accordingly, whenever multiple flags are set for a given packet, the manager 202 does not select that packet for output unless the search engines corresponding to the flags that are set both select the given packet.

According to an alternative embodiment of the invention, if the search engine selected an entry because its dependency flag was set, the search engine could clear the dependency flag, and proceed down the buffer to select the next entry with either the dependency flag or identity flag set. With such an arrangement, the processing of packets is improved because the search engines are not stalled pending processing by other channels.

The effect of asserting the multiple flags to identify the dependencies helps to maintain an overall system order of packets as they propagate through the switch. For example, in FIG. 16, the relationship between Q0 and Q3 packets is that the Q0 channel packets pushes every previous Q3 channel packet before executing. Thus a Q0 channel packet, received after a Q3 channel packet should not execute before the Q3 packet. Packet1 is a Q3 channel packet, received before the packet2 Q0 channel packet. By setting the bit 206d for packet2, it can be assured that the packet2 Q0 packet will not be issued over the output port before the packet1 Q3 packet, since the manager 208 will not select the Q0 packet until both the S3 and S0 select signal to packet2. The S3 value will not point to packet2 until packet1 has been processed. As a result, by asserting bits for each packet pushed by a packet on a given channel, the channel is effectively blocked until the packets that are pushed by the given channel are processed. As a result, the overall system order is maintained.

As mentioned above, the buffer control logic of FIG. 16 may be operated to recognize either static or dynamic dependencies. Static dependencies are those dependencies as indicated by the flow diagram of FIG. 16A. Dynamic dependencies are recognized by evaluating the contents of the buffer to determine whether a static dependency actually exists between two packets in the buffer. The static dependencies are used to provide ordering rules to ensure that memory data does not lose coherency in the SMP. However, data coherency is only affected if the packets access the same block of memory data. Therefore, dynamic dependencies examine the contents of the buffer on a finer granularity by examining the destination addresses of the packets already in the buffer to determine whether or not a dependency actually exists between two packets of differing channels.

One advantage of dynamically recognizing the dependencies between packets in the buffer 200 is that it reduces the amount of time required to process the packets in the buffer. For example, using the above description of the packet1 and packet2 operation, if the Q0 packet2 and the Q3 packet1 do not map to the same address, then there is no problem with allowing the Q0 packet to be processed before the Q3 packet. The delay time incurred in waiting for the processing of the previous Q3 packet is eliminated, thereby improving the overall performance of the SMP system.

Figure 17:
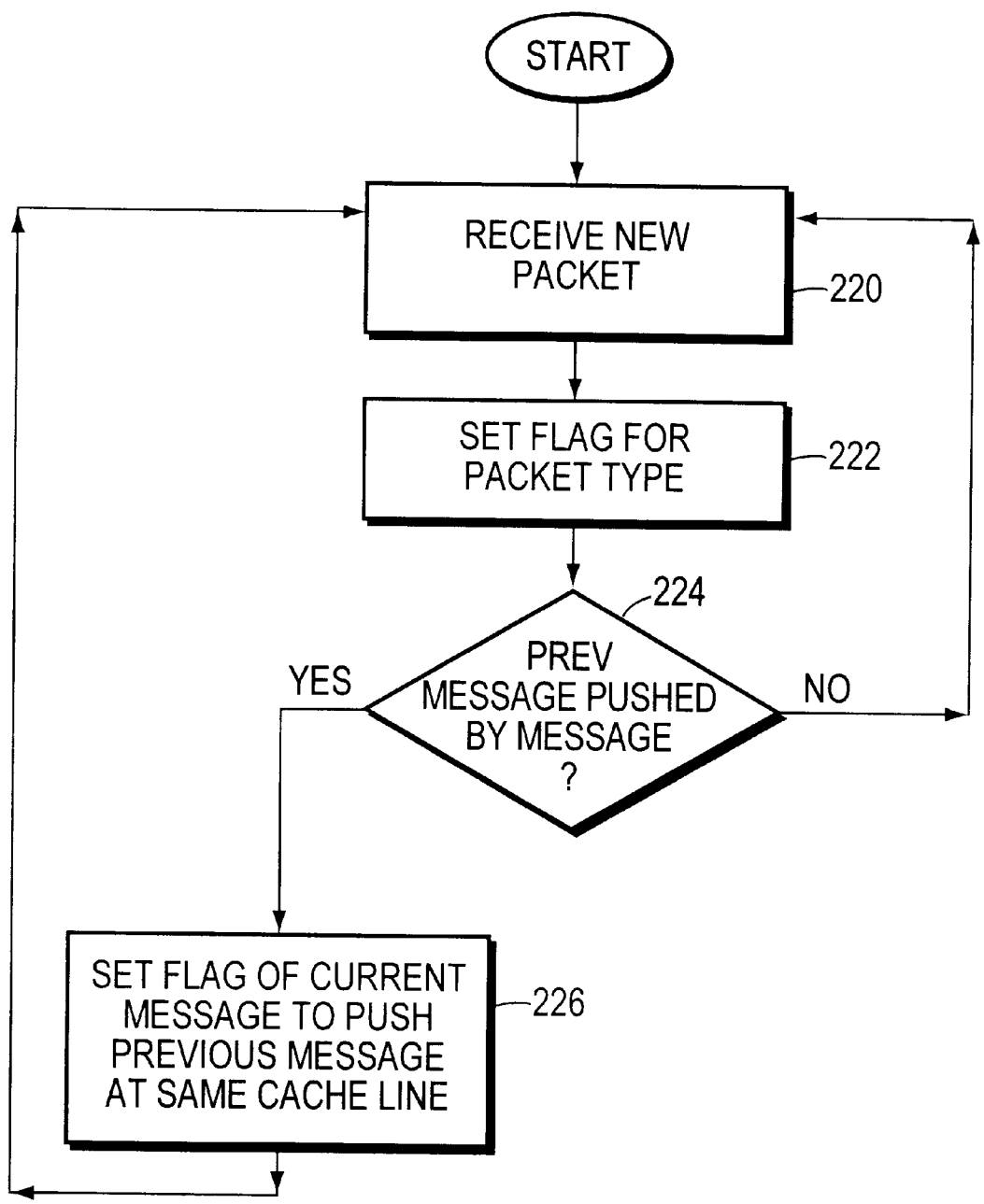
FIG. 17 is a flow diagram illustrating one method of operating the buffer logic of FIG. 16.

For example, referring now to FIG. 17, a flow diagram illustrating the operation of the selection of a packet to process by recognizing dynamic dependencies is shown. At step 220, a packet is received at the buffer 200. At step 222, the bit for the channel of the packet is set in the series of bits 206 by write control logic 205. At step 224, the previous packets stored in the buffer 200 are examined to determine whether any packets on the channel that the packet pushes are at the same block of memory. If they are at the same block of memory, then at step 226 the bits corresponding to the packets on that channel that the packet pushes and reside in the same memory block are asserted. Accordingly, using the example of FIG. 16 for packet2, the bit for packet type Q3 is only asserted if packet1 is accessing the same block of memory as packet2. Accordingly, by dynamically recognizing dependencies, memory coherency may be maintained while enhancing the overall system performance.

Figure 18:
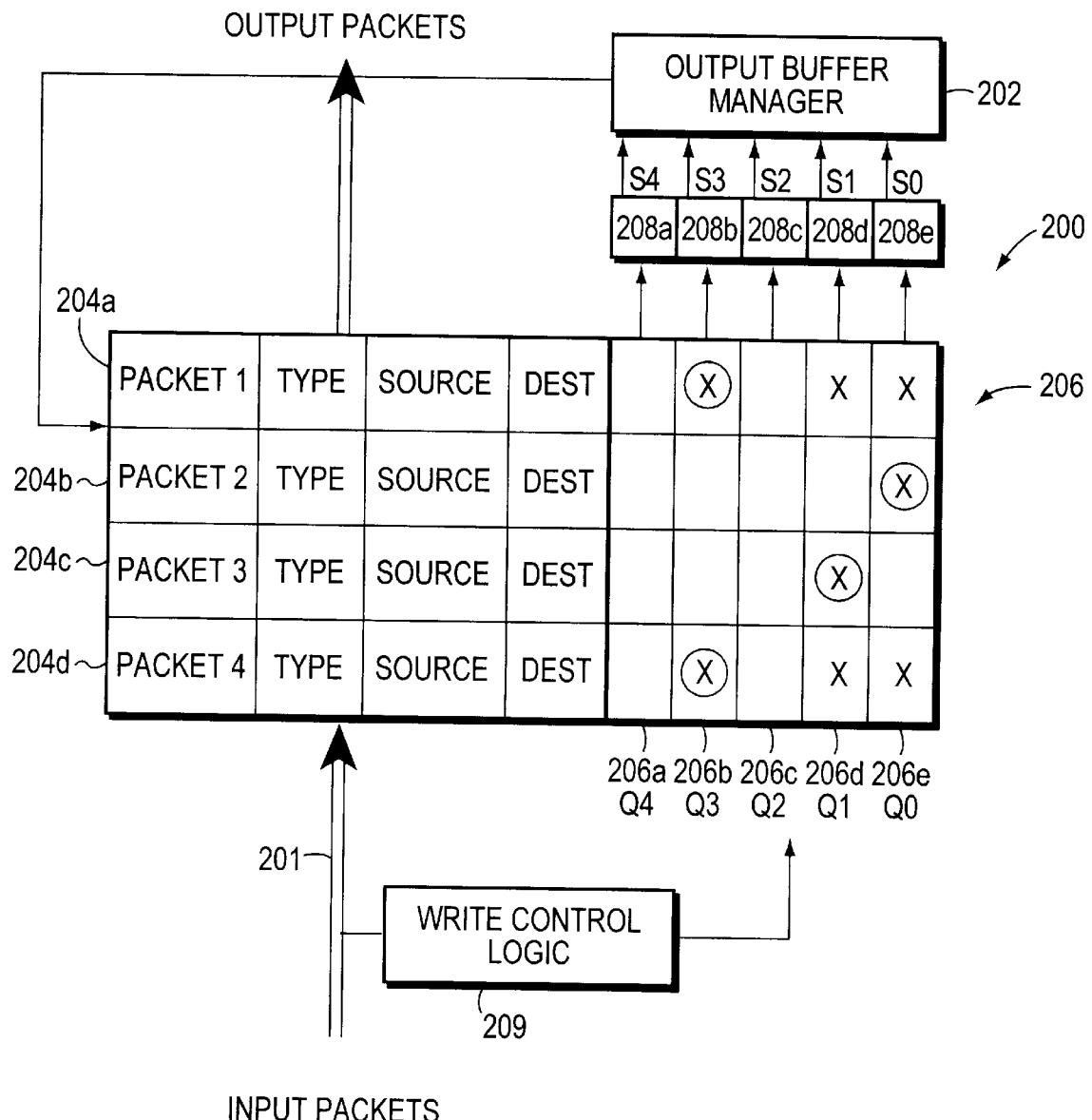
FIG. 18 is a block diagram of another embodiment of buffer logic for maintaining order at the hierarchical switch.

Referring now to FIG. 18, another embodiment of a method for outputting data received from multiple input sources to multiple output sources while maintaining an overall system order is shown. The embodiment of FIG. 18 is shown to include elements similar to those of FIG. 16. However, write control logic 209 of FIG. 18 updates each of the series of bits 206a–206e by analyzing the dependencies of the packets in a different manner. As in FIG. 16, one of the series of bits is set for each packet to indicate that the packet is of the associated channel. However, rather than setting additional bits for all of the packets of channels that the channel pushes, bits are set for the packets in channel that push packets of that channel.

Figure 18A:
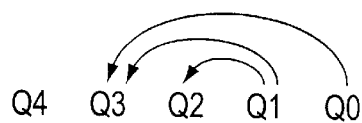

Accordingly, the embodiment of FIG. 18, in addition to setting the channel identify flag, additional bits are set for all channels masked or blocked by that packet. For example, in the example of FIG. 18, packet1 is a Q3 channel packet. Packets on the Q3 channel block the execution of Q1 and Q0 packets until the Q3 packet is executed as indicated in the dependency flow diagram of FIG. 18A. Accordingly, bits 206d, 206b and 206a are set for packet1. Packet2, however, is a Q0 packet that does not block the execution of any other packet. As a result, only the bit 206b is set for packet2.

The switch implementation of FIG. 18 thus provides an alternate method of forwarding data to an output port while maintaining system ordering by statically recognizing dependencies. It should be noted that the buffer implementation of FIG. 18 may not be used to recognize dynamic dependencies, since doing so would require knowledge of the addresses of data before the data is written to buffer 200. All of the static and dynamic methods described, however, may be used in order to insure that the dependencies between packets are satisfied.

Accordingly, three embodiments of a switch capable of simultaneously receiving data from multiple sources via multiple input ports and forwarding data to multiple destinations via multiple output ports while satisfying data dependencies, maintaining system order and maximizing the data transfer rate have been described. In one embodiment, a linked list buffering scheme has been described, where ordering dependencies are accommodated through the use of multiple queues that store flags and where the queues are selected to identify dependencies. In second and third embodiments, an output buffer that receives data in order from an input buffer of the switch includes a series of bits that are used to block packets of certain types in order to ensure that data dependency and coherency constraints are met. In all of the embodiments, ordering dependencies are tracked through the use of ordered queues including flags that are set to mark potential dependency conflicts. By using ordered lists of flags to identify the dependencies, the complexity of operations that are performed by a manager to maintain order and ensure coherency while maximizing bus utilization is simplified.

CACHE COHERENCE PROTOCOL

The cache coherency protocol of one embodiment of the invention is a write-invalidate ownership-based protocol. "Write-Invalidate" implies that when a processor modifies a cache line, it invalidates stale copies in other processors' caches, rather than updating them with the new value. The protocol is termed an "ownership protocol" because there is always an identifiable owner for a cache line, whether it is memory or one of the processors or IOPs in the system. The owner of the cache line is responsible for supplying the up-to-date value of the cache line when requested. A processor/IOP may own a cache line "exclusively" or "shared". If a processor has exclusive ownership of a cache line, it may update it without informing the system. Otherwise it must inform the system and potentially invalidate copies in other processors'/IOP's caches.

Before delving into a detailed description the cache coherency protocol is described, an introduction to the overall communication procedure used in the hierarchical network will be provided.

As described with regard to FIG. 7A, the large SMP system 150 includes a number of nodes coupled together via a switch 155. Each of the processors in each of the nodes generates commands to access data in memory. The commands may be handled entirely within the source node or may be transmitted to other nodes in the system based on the address and type of the request.

Address space is partitioned into memory space and IO space. The processors and IOP use private caches to store data for memory-space addresses alone and IO space data is not cached in private caches. Thus, the cache coherence protocol concerns itself with memory space commands alone.

A key component of any cache coherence protocol is its approach to serialization of loads and stores. A cache coherence protocol must impose an order on all loads and stores to each memory address X. The order is such that all "stores" to X are ordered; there should be a first store, a second store, a third store, and so on.

The i'th store updates the cache line as determined by the (I-1)'st store. Further, associated with each load is a most recent store from which the load gets the value of the cache line. We will henceforth refer to this order as the "load-store serialization order".

It is a property of the protocol described herein that the home Arb bus for an address X is the "serialization point" for all loads and stores to X. That is, the order in which requests to X arrive at the home Arb bus for X is the order in which the corresponding loads and stores are serialized. Most prior art protocols for large SMP systems do not have this property and are consequently less efficient and more complex.

In the small SMP node system shown in FIG. 2, there is one Arb bus. This bus is the serialization point for all memory loads and stores in the small SMP. The DTAG, coupled to the Arb bus, captures all of the state required by the small SMP protocol. In the large SMP system, the DIR at the home Arb bus captures the coarse state for the protocol; the TTTs and DTAGs capture state information at a finer level.

When a request R arrives at the home Arb bus, DIR, DTAG, and TTT state is examined; probe commands to other processors and/or response commands to the source processor may be generated. Further, the state of the DIR, DTAG, and TTT is atomically updated to reflect the "serialization" of the request R. Thus, a request Q with requested address equal to that of R and arriving at home Arb after request R, will appear after R in the load-store serialization order.

Consequently, the home Arb bus is the defined to be the "serialization point" for all requests to a memory address. For each memory address X, stores will appear to have been executed in the order in which the corresponding requests (RdMods or CTDs) arrive at the home Arb bus. Loads to address X will get the version of X corresponding to the store X most recently serialized at the home Arb.

In the following introduction to the cache coherence protocol, the term "system" refers to all components of the large SMP excluding the processors and IOPs. The processors and the system interact with each other by sending "command packets" or simply "commands". Commands may be classified into three types: Requests, Probes, and Responses.

The commands issued by a processor to the system and those issued by the system to the processors are a function of the memory system interface of the given processor. For purposes of describing the operation of the SMP, requests and commands that are issued according to the Alpha® system interface definition from Digital Equipment Corporation will be described, though it should be understood that other types of processors may alternatively be used.

Requests are commands that are issued by a processor when, as a result of executing a load or store operation, it must obtain a copy of data. Requests are also used to gain exclusive ownership to a piece of data from the system. Requests include Read commands, Read/Modify (RdMod) commands, Change-to-Dirty commands. Victim commands, and Evict commands (where a cache line of data is removed from the respective cache).

Probe commands are commands issued by the system to one or more processors requesting data and/or cache Tag status updates. Probe commands include Forwarded Read (FRd) commands, Forwarded Read Modify commands (FRdMod), and Invalidate commands. When a processor P issues a request to the system, the system may have to issue one or more probes to other processors. If P requests a copy of a cache line (with a Read request), the system will send a probe to the owner processor (if any). If P requests exclusive ownership of a cache line (with a CTD request), the system sends Invalidate probes to one or more processors with copies of the cache line. If P requests both, a copy of the cache line as well as exclusive ownership of the cache line (with a RdMod requests) the system sends a FRd command to a processor currently storing a dirty copy of a cache line of data. In response to the FRd command, the dirty copy of the cache line is returned to the system. A Forwarded Read Modify (FRdMod) command is also issued by the system to a processor storing a dirty copy of a cache line. In response to the FRdMod, the dirty cache line is returned to the system and the dirty copy stored in the cache is invalidated. An Invalidate command may be issued by the system to a processor storing a copy of the cache line in its cache when the cache line is to be updated by another processor.

Responses are commands from the system to processors/IOPs which carry the data requested by the processor or an acknowledgment corresponding to a request. For Read and RdMod commands, the response is a Fill or FillMod commands, respectively—each of which carry the data requested. For CTD commands, the response is a CTD-Success or CTD-Failure commands, indicating success or failure of the CTD. For Victim commands, the response is a Victim-Release commands.

Referring now to FIG. 19, a table is provided for illustrating the relation between requests and the state of corresponding cache lines in individual processors. FIG. 19 also illustrates the resulting probe type commands for each of the requests and states of the cache lines. Columns 300 and 300*a* indicate the requests issued by the processor, columns 305 and 305*a* indicate the status of the cache line in other processors in the system, and columns 320 and 320*a* indicate the resulting probe command that is generated by the system.

The table of FIG. 19 assumes that a processor, referred to as Processor A, issues a request to the system. Processor A's command then interacts with one or more other processors, referred to as Processor B. If the cache line addressed by processor A is stored in the cache of Processor B, as determined using DTAG and/or directory information, then the cache state of the processor B will determine if a probe command needs to be issued to Processor B, and what type of probe command should be issued.

Below, the coherence protocol and mechanisms are described in greater detail. Paths taken by command packets, the sources of state information for each command type, and the resulting actions are included. All commands originate from either a processor or an IOP, where the issuing processor of IOP is referred to as the "source processor." The address contained in the request is referred to as the "requested address." The "home node" of the address is the node whose address space maps the requested address. The request is termed "local" if the source processor is one the home node of the requested address: else, it is termed a "global" request. The Arb bus at the home node is termed the "home Arb bus". The "home directory" is the directory corresponding to the requested address. The home directory and memory are thus coupled to the home Arb bus for the requested address.

A memory request emanating from a processor or IOP is first routed to the home Arb bus. The request is routed via the local switch if the request is local: it goes over the hierarchical switch if it is global. In the latter case, it traverses the local switch and the GP Link to get to the GP: then, it goes over the HS Link to the hierarchical switch: then, over the GP and the local switch at the home node to the home Arb bus.

Note that global requests do not first appear on the source node's Arb bus; instead, they are routed directly to the HS via the GP Link. In prior art protocols, a global requests accessed state on the source node before it was sent out to another node. The present invention reduces the average latency of global requests by issuing global requests directly to the HS.

Referring now to FIGS. 20A–20J, example flow diagrams of a number of basic memory transactions are provided.

Figure 20A:
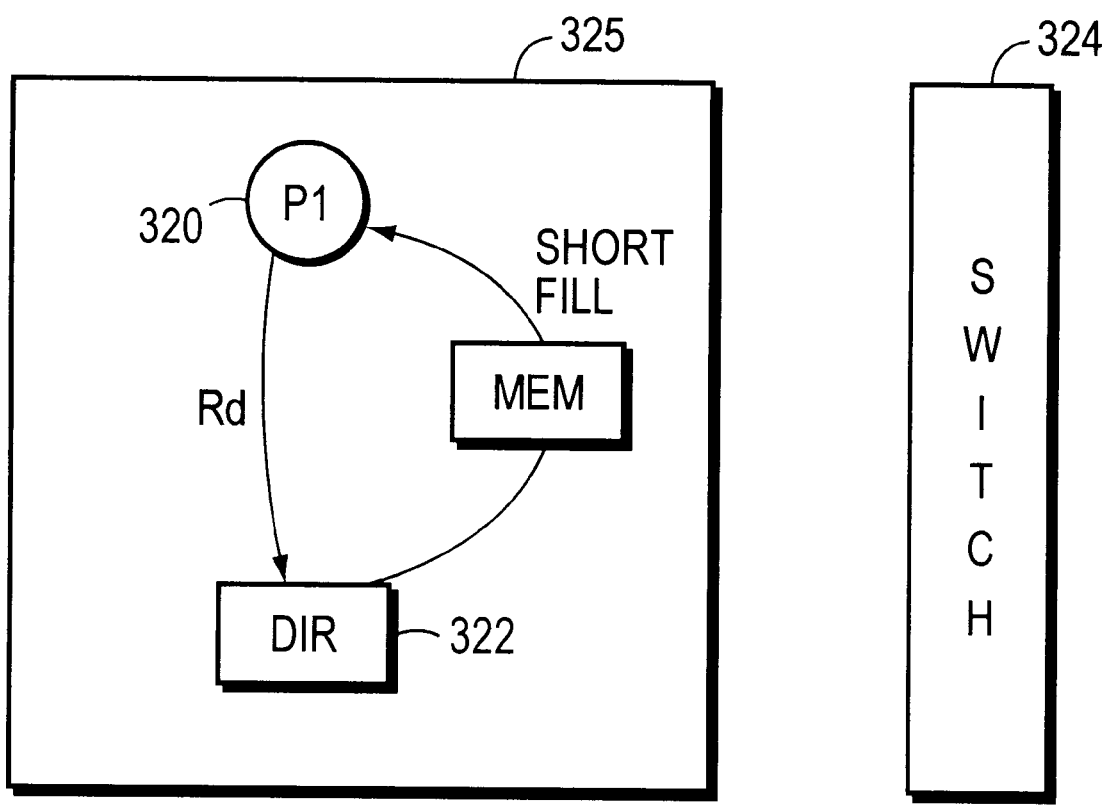
FIGS. 20A–20J illustrate a number of communication flows for transferring packets between nodes in the SMP of FIGS. 7A or 7B.

Local Read:

In FIG. 20A, a request is forwarded to the home arb bus from a source processor 320. The directory 322 determines which processor owns the memory block. If local memory 323 is owner, a short Fill command is issued from the home arb bus to source processor 320.

Figure 20B:
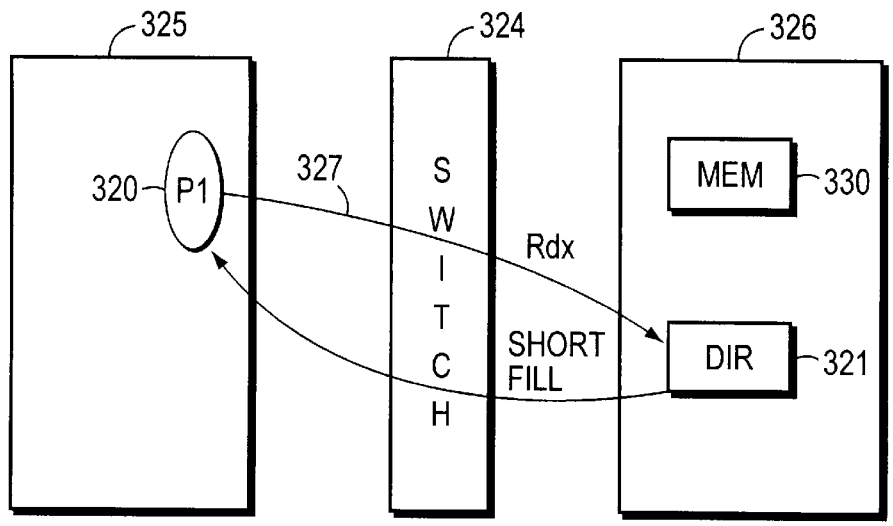

Global Read:

In FIG. 20B, assume processor 320 of node 325 issues a read to a cache line of memory whose 'home' is at node 326. The (global) Read command is routed through the switch 324 to the 'home' Arb bus and directory 321 via the pathway indicated by line 327. If the memory 330 of node 326 is the owner of the cache line, then data is returned from node 326 to node 325 by node 326 issuing a ShortFill Response.

Figure 20C:
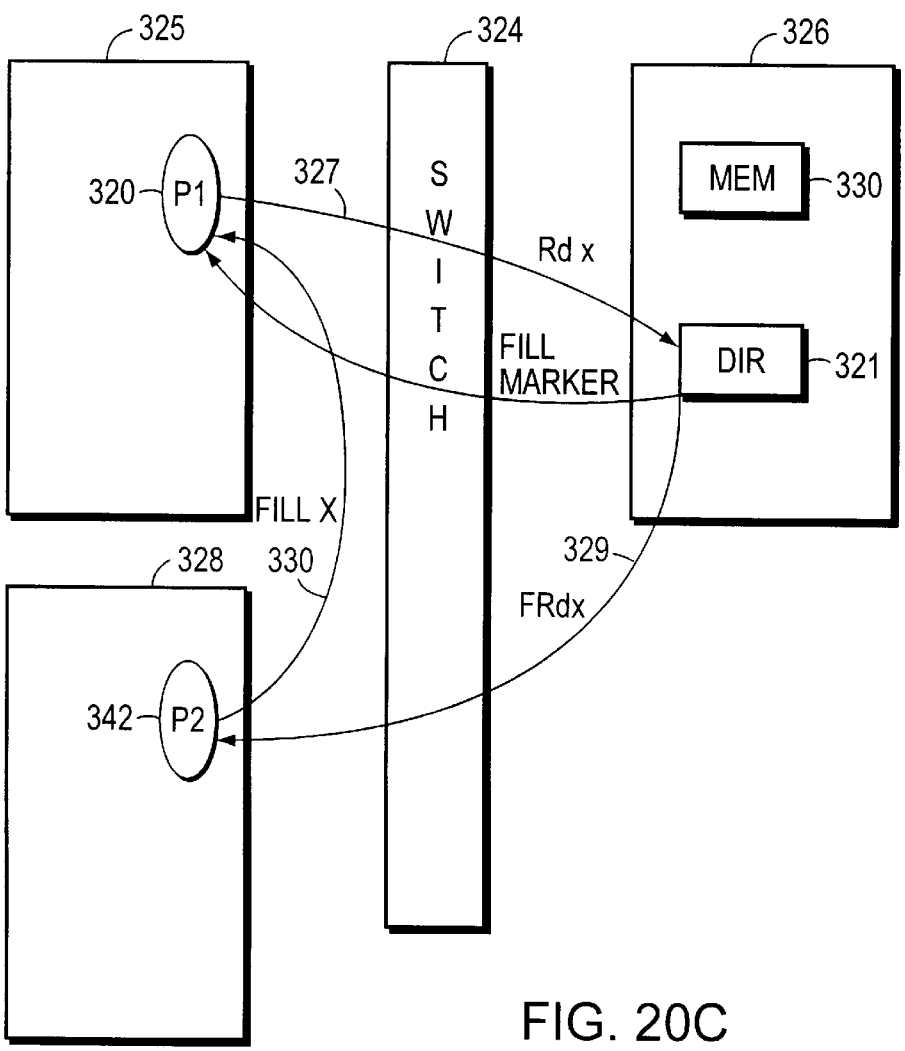

If the cache line is currently owned by another processor/IOP, different steps are taken to obtain the requested cache line. Referring now to FIG. 20C, if processor 320 issues a Read to a cache line of memory whose 'home' is node 326, the Read is again routed to the home Arb bus and Directory 321 via pathway 327. The entry of directory 321, as mentioned above, includes, for each cache line of memory, 14 bits of status information including owner information. The owner information, in this instance, identifies the owner as processor 342 at node 328.

In response to the directory's indication that node 328 owns the required cache line, two events occur. First the 'home' node, node 326, issues a Forwarded Read probe to owner processor 342 as indicated by line 329. At the same time, the home node 326 transmits a Fill Marker response to processor 320 as indicated by line 331. The role of the Fill Marker responses is described in a later section.

In response to the Forwarded Read, processor 342 issues a Fill command to processor 320, where the Fill command includes the cache line in question. This type of response to a Read request is referred to as a Long Fill, because it requires a sequence of three commands for data return. Thus, the Read transactions can be broken into two types; a Short Fill, which is a response from memory, and a Long Fill, which is a response from an owner a processor.

Local RdMod

Figure 20D:
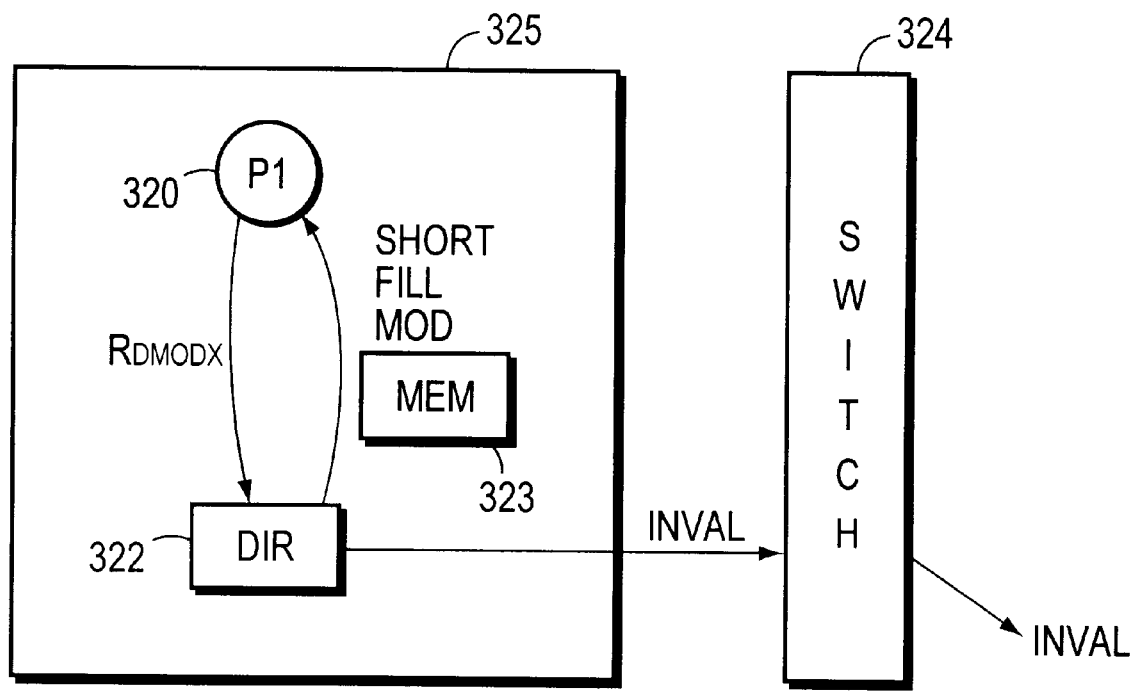

Referring now to FIG. 20D it can be seen that a local Read-Modify transaction operates similarly to a local Read transaction, with the exception that (1) Invalidate probes are sent to all processors that have obtained a copy of the current version of the cache line and (2) and FRMod and FillMods are sent to the owner instead of an Frds and Fills.

In FIG. 20D, the directory at the home node indicates that a local processor or memory owns the block. At the home Arb bus, the directory 322 identifies all external nodes that have obtained the current version of the block. An Invalidate command is sent to the HS 324, with all pertinent nodes identified in a the multi-cast vector. The HS multi-casts Invalidate messages to all nodes identified in the vector. The Invalidate messages go the Arb bus at each of the nodes, where the DTAG further filters them, sending Invalidate probes to only those processors or IOPs that are identified as having a current version of the cache line.

Global RdMod

Figure 20E:
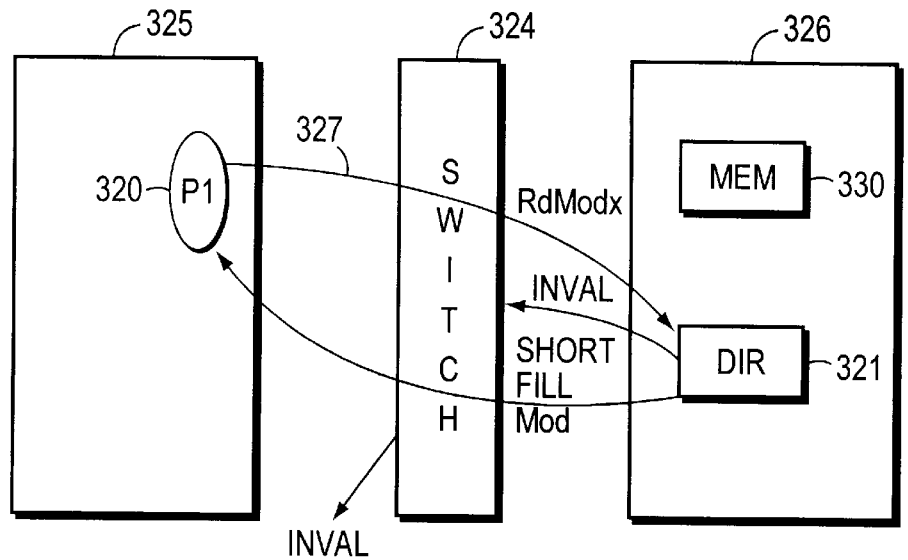
Figure 20F:
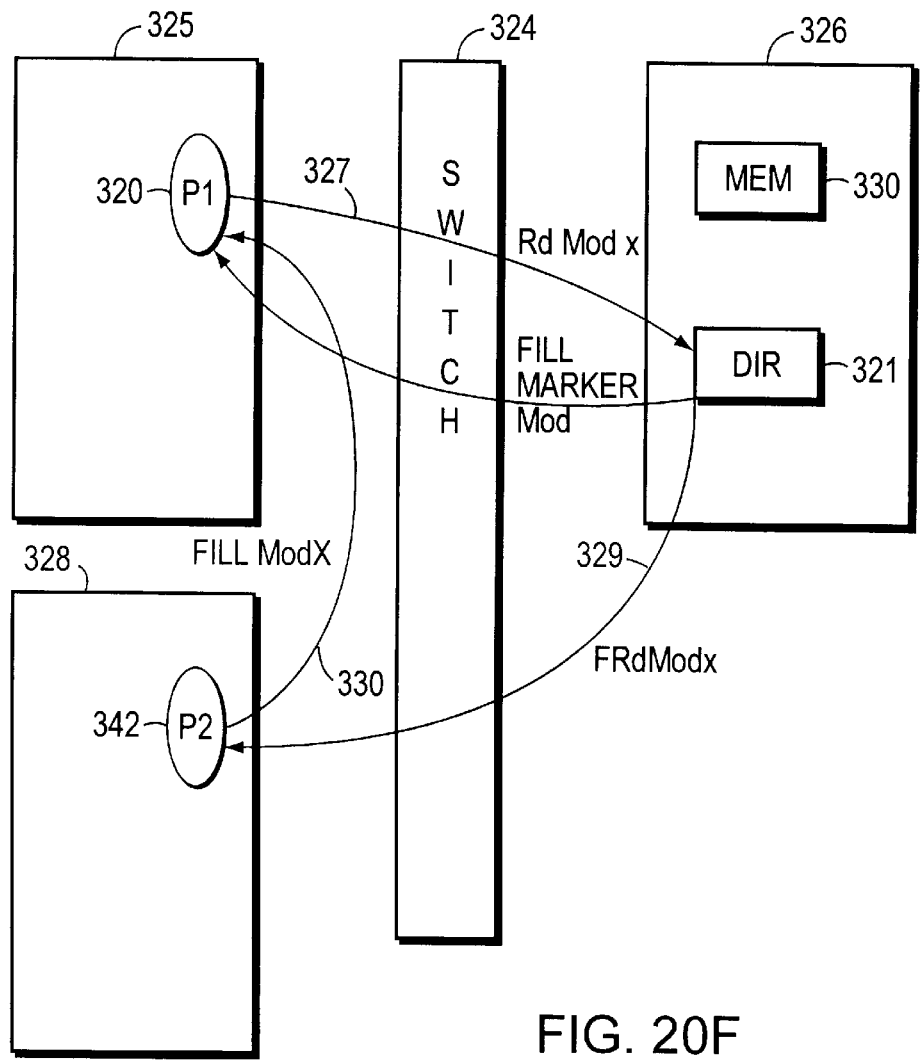

Referring now to FIG. 20E, it can be seen that a Read Modify transaction operates similarly to the Read transactions described with regard to FIGS. 20A and 20B. A Read Modify (RdMod) command is first routed from processor 320 to the home Arb and home directory 321 of the cache line. If the memory at node 326 at the home nodes stores the cache line, then a Short Fill Modify command is forwarded from node 326 to processor 320, including the requested data. The directory 321 is updated as a result of this transaction.

The Read Modify command indicates that processor 320 requires exclusive ownership of the cache line so that it can modify the contents of the cache line. Therefore, in addition to the Short Fill Modify command, node 326 also issues Invalidate commands to all other processors that have obtained a copy of the current version of the cache line. The DIR identifies the nodes on which one or more processors have obtained a copy of the current version of the cache line. The DIR's presence bits contain this information. The DTAG identifies all home node processors that have obtained a copy of the cache line. Invalidates are sent to all nodes having their respective DIR presence bits set. At each of the nodes that receive the Invalidate, the DTAG is accessed to determined which processors currently store a copy of the cache line. Invalidates are sent only to those processors. The IOP tag is used to determined if the IOP has a copy; if so, the IOP receives an Invalidate probe too.

For the case where a processor other than the requesting processor is the owner, the home node generates a Fill Modify Marker, a Forwarded Read Modify and zero or more Invalidates as one command. At the switch, the command is multi-cast to all of the destination nodes. At each destination node, the command is segregated into its components, and the global port of each node determines what action should be taken at the respective node. In the above example, a Forwarded Read Mod is processed by processor 342 and a Fill Modify Marker is processed by processor 320. In addition, Invalidates are performed at the home node, at the node that receives the Fill Modify Marker, and at the node that receives the Forwarded Modify in accordance with their DTAG entries. In response to the Forwarded Read Mod, the dirty data is forwarded from processor 342 to processor 320 via a Long Fill Modify command.

Thus, the Read Modify command may perform either two or three node connections, or 'hops'. In one embodiment of the invention, only Read-type commands (Read and Read Modify) result in 3 hops, where the third hop is a Fill-type command (either Fill or Fill Mod). However, the invention may be easily modified to include other transactions that require 3 or more hops by appropriate allocation of those added commands in the virtual channel queues described below.

CTDs

Figure 20G:
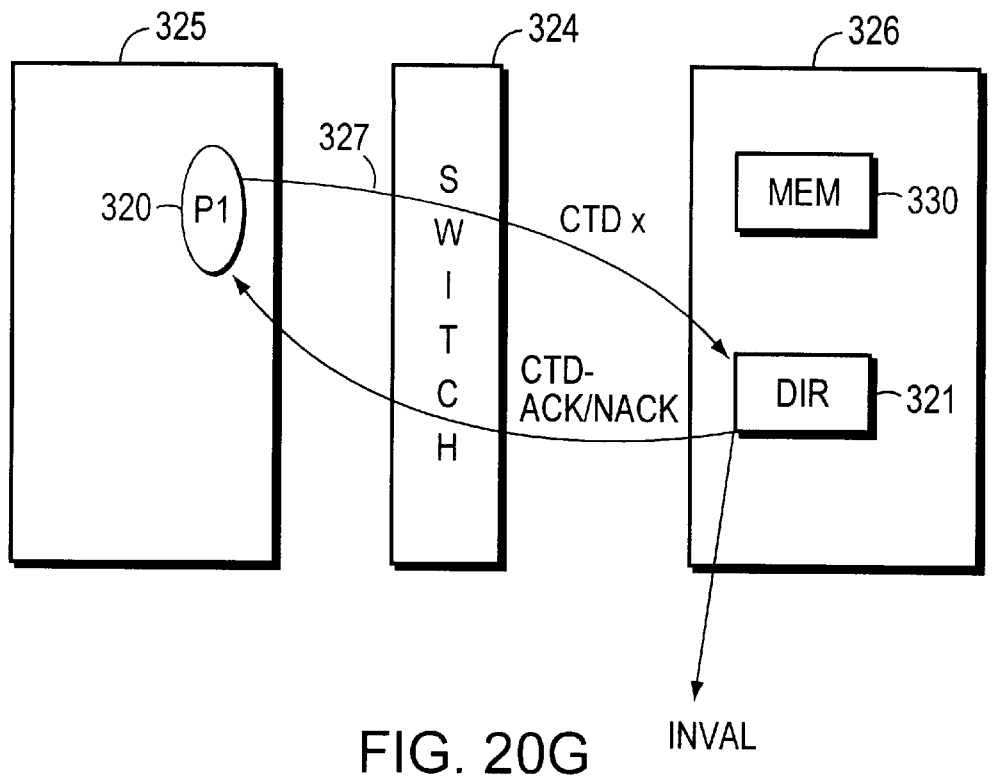
Figure 20H:
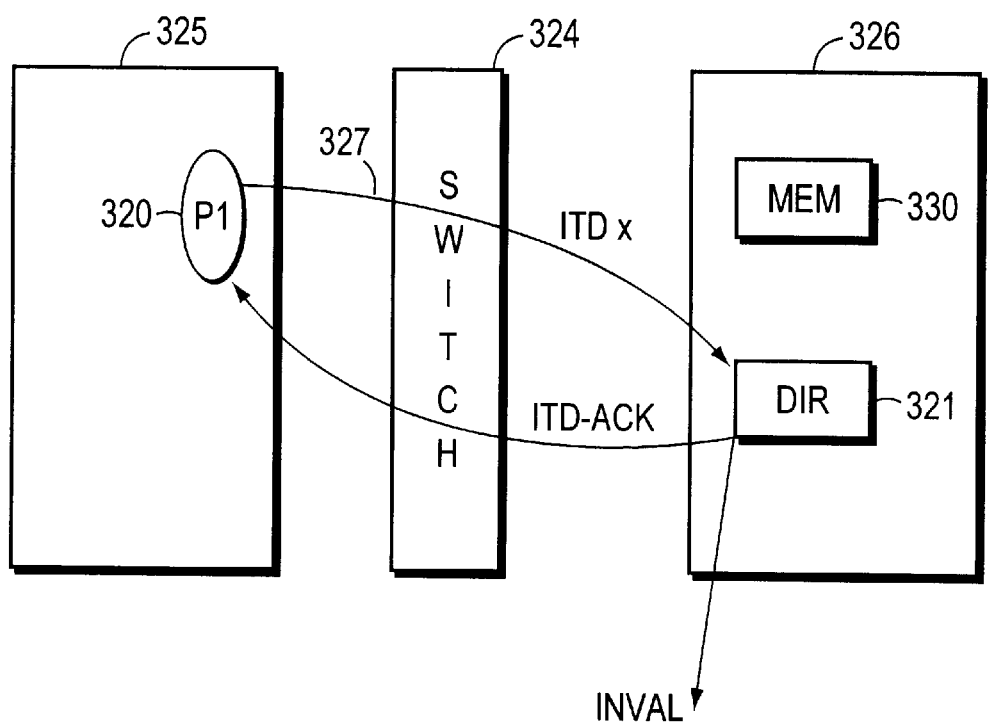

Referring now to FIGS. 20G and 20H, the basic flows for Clean-to-Dirty (CTD) and Invalidate-to-dirty (ITD) are shown. In FIG. 20G, a Clean-to-Dirty is issued from processor 320 to the directory 321 at the home node. Either an Acknowledgment command (ACK) or a No-Acknowledgment command (NACK) are returned to processor 320, depending upon whether the clean cache line that processor 320 wants to update is current or stale. Correspondingly, the CTD is said to succeed or fail. In addition, Invalidates are sent to all of the nodes indicated by the presence bits of directory 321 as having a copy of the cache line of data if the CTD succeeds.

As shown in FIG. 20H, the ITD command operates substantially similarly to the CTD. However, the ITD never fails. An ACK is always returned to the processor 320, and Invalidates are sent to other nodes in the system storing a copy of the cache line of data.

Local and Global Write Victims

Figure 20I:
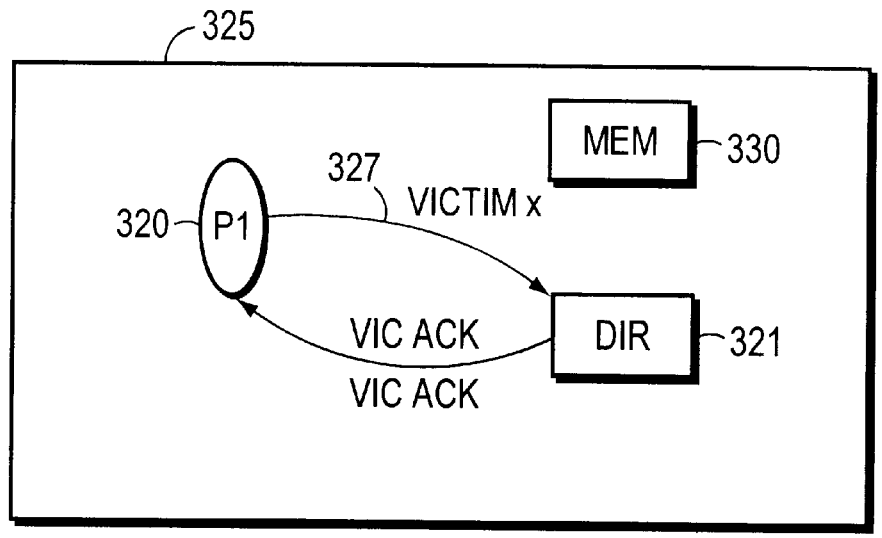
Figure 20J:
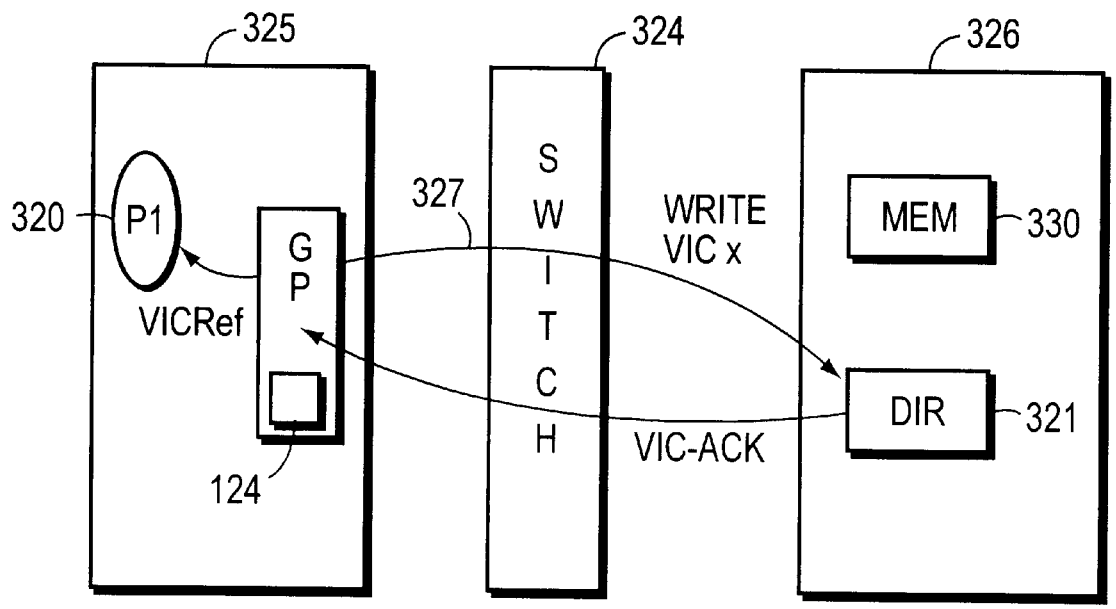

As described above, the Write Victim command forwards dirty data from the processor's cache back to the appropriate home memory. Referring now to FIGS. 20I and 20J, it can be seen that the flow for Write Victims differs slightly depending upon whether or not the 'home' memory is at the same node as the processor issuing the Write Victim. As shown in FIG. 20I, if the 'home' node is the processor's node, then the processor 320 issues the Write Victim, and data is forwarded directly to the memory of the same node.

As shown in FIG. 20J, however, if the victim data is at a different home than the processor, the data is transferred in two stages. First, the victim cache line is forwarded out of the cache (or victim buffer) of processor 320, and stored in the Victim cache (FIG. 6, element 124) at the global port of the processor's node. The Victim cache responds to the processor with a Victim Release signal, indicating that it is okay for the processor to re-use that victim buffer entry. Then, when there is available bandwidth on the switch, the victim data is forwarded from the victim cache to the memory of the home processor via a Write Victim command.

It should be noted that victim data sent to home memory by source processor P may be stale by the time it gets to memory. In such a case, the victim is said to "fail" and home memory is not updated. This scenario occurs when another processor acquires ownership of the cache line in the interval between P acquiring ownership of the line and P's victim reaching the home directory. In such a case, an Invalidate or FrdMod probe for the cache line must have been sent to the processor P before P's victim reached the home Arb.

In order to determine whether victim data should be written to memory we look up the directory entry for the requested address when a Write Victim command appears at the home Arb bus. If the directory indicates that the source processor is still the owner of the cache line, then the victim succeeds and updates memory. Otherwise, it should fail and not update memory. Either way, once the decision has been made for a victim at the directory 321, a Victim Ack command is returned to the global port of node 325 to allow the victim cache to clear the associated entry.

In one embodiment of the design, the DTAG is used to decide the success or failure of a Write Victim command in the case where the Write Victim command is local. In this particular instance (that of a local Write Victim request), the DTAG and DIR are both able to provide the information needed to determine success or failure of the Write Victim request. The DTAG is used instead of the DIR simply because the DTAG-based mechanisms is already provided for in the small SMP node hardware.

In the above description of the cache coherence protocol we have described the most common operations and command types. The mechanisms are described in greater detail in following sections.

As noted above, in one embodiment of the invention two or more related message packets can be combined into one for efficiency. The combined packet is then split into its components at the HS or on the Arb bus at a node. For instance, an FrdMod message to the HS splits into an FrdMod message to the node with the owner processor into Invalidate messages to nodes with copies of the cache line and FillMarkerMod message to the source node. The FrdMod to the owner processor's node further splits at the node's Arb bus into an FrdMod to the owner processor and zero or more Invalidate messages to other processors on the node.

Delayed Write Buffering for Maintaining Vicitim Coherency:

As described above with regard to FIGS. 20I and 20J, victim data sent to home memory may be stale by the time it arrives as a result of an intervening Invalidate or FrdMod probe for the cache line received before the Write Victim reached the home Arb. One method of determining whether victim data should be written to memory is to look up the directory entry for each write victim command. If the directory indicates that the processor issuing the victim write command is the dirty-owner, then the victim should be allowed to proceed. Otherwise, it should fail. This methodology is desirable because it obviates the need for complex comparison logic structures to match victim write commands between the processor and the serialization point with probe commands between the serialization point and the processor.

While this approach simplifies maintenance of data coherency, it can cause performance drawbacks in the form of reduced memory bandwidth. According to this scheme, each time the system executes a victim write command, it must first access directory status, then evaluate the status and finally, based on the status, execute a DRAM write of the victim data. Since the memory and directory are accessed atomically, if the system were designed according to prior art design methodologies, the total victim write cycle would be equal to the sum of the directory lookup time, the status evaluation time and the DRAM write time. Such a system would suffer a severe performance penalty with respect to systems whose total victim cycle consists of just a DRAM write.

One embodiment of the invention overcomes this memory bank utilization degradation problem by providing a delayed write buffer at each bank of memory. Each time a victim write is issued to the memory system, the memory system responds by executing the following functions in parallel: storing the victim write data in a delayed write buffer at the target memory bank and marking the block as "unwritable" or "invalid", accessing the directory status associated with the victim write, and executing, in place of the current victim write, a DRAM write of a previously buffered victim write that is marked as "writable" or "valid". If, when the directory access is complete, the directory status associated with the victim write indicates that victim write should succeed, the delayed write buffer in which the victim resides is transitioned to the "writeable" or "valid" state. The "writable" or "valid" state of a data block in a delayed write buffer indicates that the data in the buffer is a more up to data version of the cache line than the version stored in the memory DRAMs. If the buffer is marked as "writeable" or "valid", its data will be written into DRAM as a result of the subsequent issue of a victim write to the memory system.

By executing the directory lookup in parallel with the DRAM write of a previously issued victim write, this embodiment reduces its total victim cycle time to that of a single DRAM write time. Since this embodiment holds "writable" or "valid" data blocks in delayed write buffers for many cycles, in which subsequent references to the buffered block can be issued to the memory, the delayed write buffer includes an associative address register. The address of the victim write block is stored into the associative address register at the same time its associated data is stored in the delayed write buffer. When subsequent references are issued to the memory system, the memory system identifies those that address blocks in the delayed write buffers by means of an address match against the address register. By this means the memory system will service all references to blocks in the delayed write buffers with the more up to data from the buffers instead of the stale data in the memory DRAMs.

The above technique of providing delayed write buffering of victim data may be also be used in snoopy-bus based systems which do not include a directly but do use DTAG status to determine the validity of a data block.

Figures 21, 22:
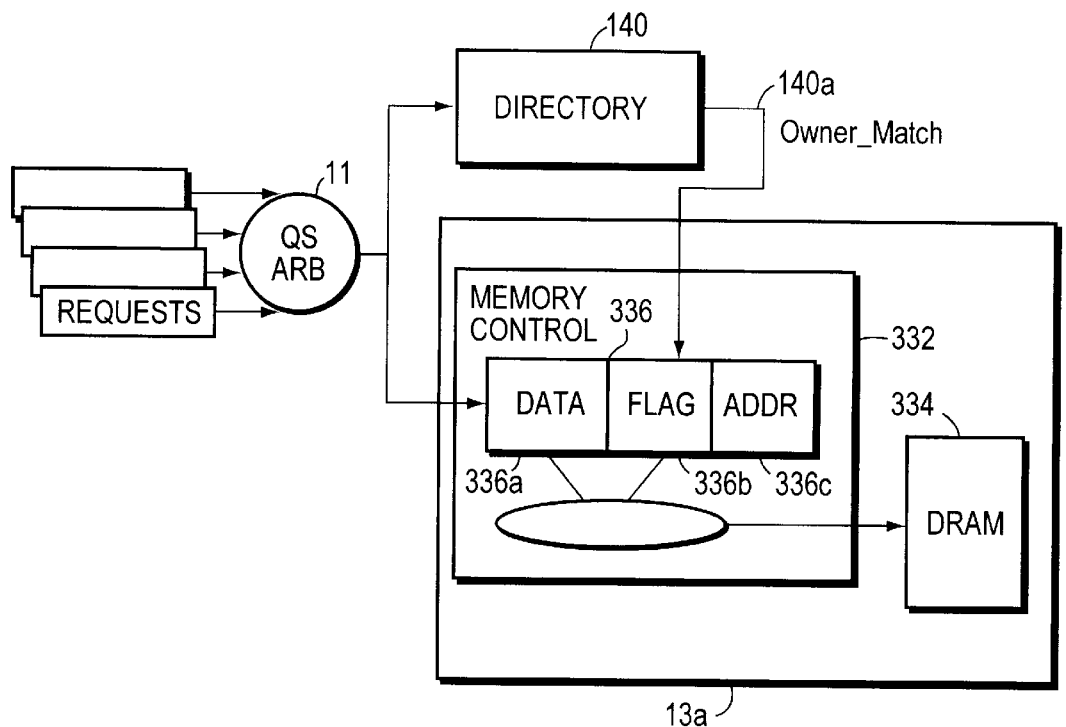
FIG. 21 is a block diagram illustrating the layout of a memory module for use in the multi-processor system of FIGS. 2 or 6.
FIG. 22 is a timing diagram illustrating the control logic used by the memory module of FIG. 21 for delayed write operations.

Referring now to FIG. 21, one embodiment of a memory control system for providing delayed write operations is shown to include a memory controller 332, coupled to receive an Owner_Match signal on line 140a from directory 140. In addition, the memory controller 332 receives input from the QS Arb 11 (which also feeds directory 140), for tracking the commands that are input to the directory.

The memory controller 332 includes a delayed write buffer 336. Each entry in the delayed write buffer 336 includes a data portion 336a, a flag portion 336b, and an address portion 336c. In one embodiment of the invention, in order to minimize design complexity, the delayed write buffer holds only one address, data and flag entry, although the invention is not restricted to such an arrangement.

The delayed write buffer operates as follows. During operation, as a command, address and data are received on Arb_bus 130, they are forwarded to the directory 140 and also to the memory controller 332. The memory controller 332 stores the command, address and data in the write buffer 336 for one transaction period (here 18 clock cycles). During the transaction period, the directory 140 is accessed, and the results of the access are asserted on the Owner_Match line 140a. The Owner_Match line is asserted if the director entry indicates that the processor ID of the processor seeking to update memory is in fact the owner of the cache line of data. The Owner_Match signal is used to set the flag 336b of the delayed write buffer entry 336. In the next succeeding transaction period, if the memory bus is available and if the flag 336b is asserted, memory 334 is written with the stored data. In one embodiment of the invention, only write operations are buffered; an incoming Read operation is allowed to access the memory bus without being delayed. Subsequent read operations to victim data stored in the delayed write buffer are serviced from the delayed write buffer.

Referring now to FIG. 22, a timing diagram of the operation of a delayed write operation is shown. At time T0 a Read0 operation is received on the Arb bus. This Read operation is propagated immediately to the memory for accessing the DRAM 334. At time T1, a Write1 operation is received on Arb_bus. During this T1 cycle, the directory 140 is accessed and, at the completion of the T1 cycle, the Owner_Match signal is asserted indicating a match of the WRITE1 address. As a result, the flag 336b of the delayed write buffer entry is set. At time T2 a Read operation is received and is forwarded to the memory ahead of the WRITE1 operation. During time T3, if the flag corresponding to the WRITE1 operation is asserted, when the next WRITE3 operation is received at the delayed write buffer, the WRITE1 operation is forwarded to the memory for handling by the DRAM 334.

It should be noted that, for reads of local memory, the DTAGs may alternatively be used for setting the flag bit in the delayed write buffer. One of the cache lines from local memory may be stored in one of the caches of the processors at the local node. When one of the processors victimizes a cache line and the cache line is written to the delayed write buffer, the DTAG entries for that cache line may be examined to determine whether or not the cache line was resident in one of the processors. If the cache line was resident in one of the processors, the validity bit of the DTAG entry is examined to ensure that the copy that the processor is victimizing was valid. If there is a hit in the DTAG and the cache line was valid, the DTAG may set the flag in the delayed write buffer to cause the cache line to be written to local memory. This allows simple, snoopy-bus based (i.e. no directory) systems to apply this same simplifying, algorithm.

The memory control logic of FIG. 21 thus allows READ operations to be executed immediately in a READ cycle, and a WRITE operation to be executed for each WRITE cycle (even though it is a delayed write). As a result, a steady stream of data is forwarded to the DRAMS without delays being incurred as a result of directory accesses, and performance is increased while coherency is maintained. Although the delayed write buffering technique has been described herein with regard to victim write operations, it may be used in any system where coherency state is centralized and stationary to improve memory performance.

Virtual Channels:

Accordingly it can be seen that many memory references are transmitted between processors, directories, memories, and DTAGs to implement the cache coherence protocol. In addition, each memory reference may include a number of transactions, or hops, between nodes, where messages for the memory reference are transferred before the entire reference is complete. If dependencies between the messages cause a reference to be blocked indefinitely, the multiprocessor system deadlocks.

As described briefly above, one embodiment of the invention manages the traffic between nodes and maintains data coherence without deadlock through the use of virtual channel flow control. Virtual channels were first introduced for providing deadlock free routing in interconnection networks. According to one embodiment of the invention, virtual channels may additionally be used to prevent resource deadlocks in a cache coherence protocol for a shared memory computer system.

In prior art concerning cache coherence protocols, two types of solutions have been used. For systems having a small number of processors and a small number of concurrently outstanding requests, queues and buffers were provided that were large enough to contain the largest possible number of responses that could be present at any point during execution. Providing sufficient queue and buffer space guaranteed that messages were never dependent on another message for making progress.

In larger systems or systems with a large number of outstanding requests, it is not practical to provide buffers and queues large enough to contain the maximum possible number of responses. Accordingly, the problem has been solved using a two-channel interconnect coupled with a deadlock-detection and resolution mechanism. First, the inter-connect (logical paths used to move messages between system components such as processors and memory) uses two channels: a requests channel (or lower order channel) and a response channel (or higher order channel). The channels are typically physical; that is, they use distinct buffers and queues. Second, a heuristic is typically implemented to detect a potential deadlock. For instance, a controller may signal a potential deadlock when a queue is full and no message has been dequeued from the queue for some time. Third, a deadlock resolution mechanism is implemented wherein selected messages are negatively acknowledged so as to free up resources, thus allowing other messages to make progress. Negatively acknowledge messages cause the corresponding command to be retried.

The large system solution above has two principal problems including a fairness/starvation problem and a performance penalty problem. Because some messages may be negatively acknowledged, it is possible that some commands may not complete for long time (potentially indefinitely). If a command are not guaranteed to complete within a given period of time, the resource issuing the command is not obtaining fair access to the system data. In addition, because the resource is not obtaining fair access to the system data, it may become starved for data, potentially deadlocking the system. In addition, since some messages may be negatively acknowledged and thus fail to reach their destinations, protocol messages such as invalidate messages must generate an acknowledgment to indicate that they successfully reach their destination. Further, a controller must wait until all acknowledgments have been received before it can consider the corresponding command complete. This non-determinism results in a messaging overhead as well as extraneous latency which reduces the overall performance of the cache coherence protocol.

According to one embodiment of the invention, a cache coherence protocol is used that adopts a systematic and deterministic approach to deadlock-avoidance. Rather than detect potential deadlock and then take corrective action, deadlock is eliminated by design. Consequently, there is no need for deadlock-detection and resolution mechanisms. Second, since messages are never negatively acknowledge for deadlock avoidance, acknowledgments are not required for protocol messages such as Invalidates, and therefore bandwidth and latency are improved.

For the purposes of explaining the use of virtual channels, some useful terminology will first be provided.

Dependency: A message M1 is defined to "depend" on message M2 if M1 cannot make progress unless M2 makes progress. Further, dependence is defined to be transitive. For implementing the cache coherence protocol of the present invention, there are at least two classes of dependencies; resource dependencies and flow dependencies. M1 is defined to be "resource dependent" on M2 if M1 cannot make progress until M2 frees up a resource, such as a queue slot. M1 is defined to be "flow dependent" on M2 if the cache coherence protocol requires that M1 not make progress until M2 does. For instance, the cache coherence protocol may require that M1 block until the directory reaches a certain state, and it is M2 that sets the directory state to the desired value. M1 is then defined to be dependent on M2 if there exists a chain of either resource or flow dependencies from M1 to M2.

Dependence cycle: A "dependence cycle" is defined to exist among a set of messages M1, MK ($\geq 2$) when the progress of M1 depends on the progress of M2; that of M2 depends on that of M3; that of Mk−1 depends on that of Mk; and finally, that of Mk depends on that of M1. A system of messages deadlocks when some subset of the messages form a dependence cycle. Since M1 depends on Mk, which in turn depends on M1, none of the messages in the cycle can make progress.

The method and apparatus disclosed herein uses virtual channels to deterministically avoid deadlock in cache coherence protocols. We describe both the hardware mechanism needed and the set of rules to be followed in the design of the cache coherence protocol.

Figure 23:
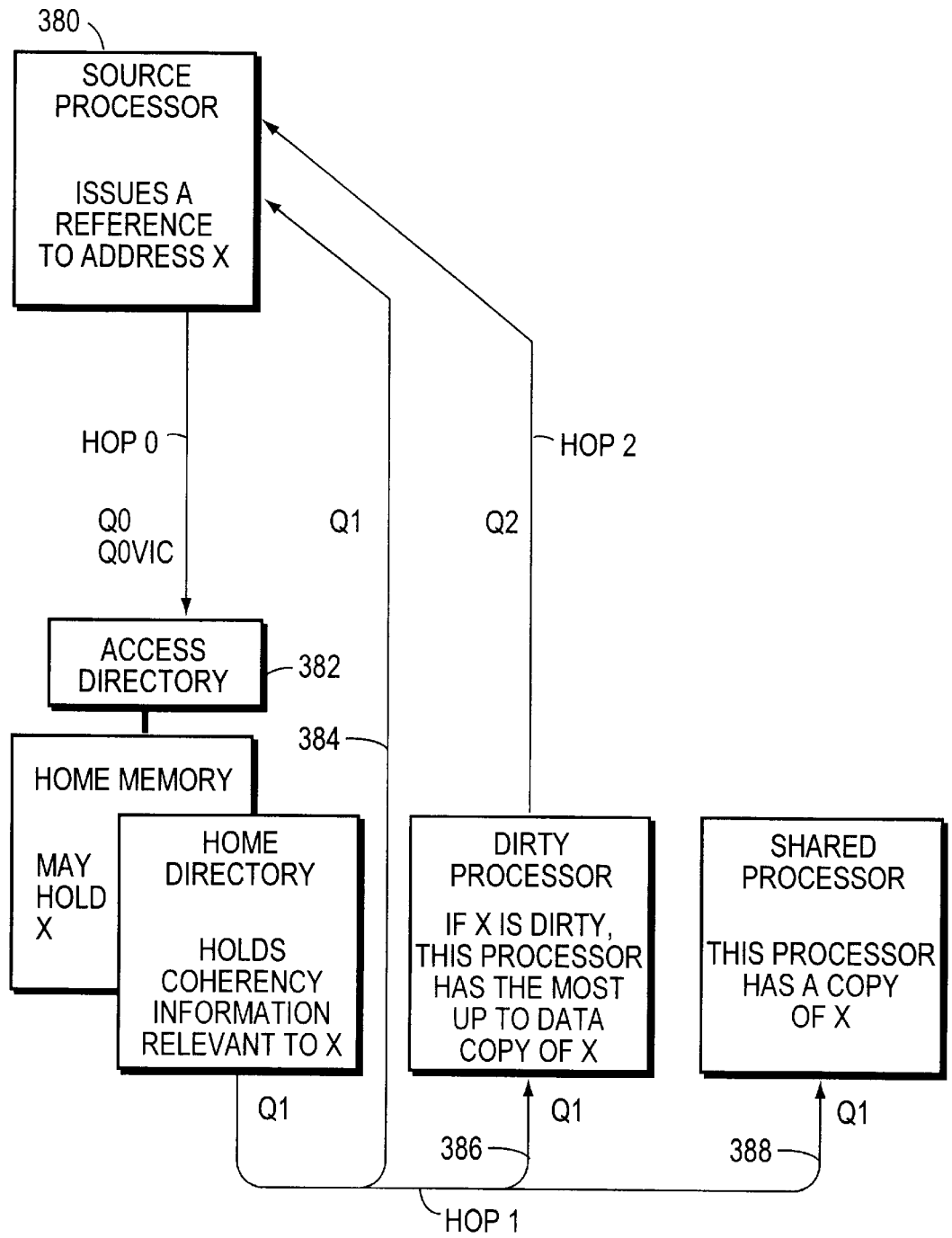
FIG. 23 is a flow diagram illustrating the use of discrete transactions that are mapped to channels for maintaining cache coherency in one embodiment of the invention.

In one embodiment, the cache coherence protocol defines that all memory operations complete in at most three stages. At each stage, one or more messages are transferred between components of the system. Therefore, each stage is also referred to as a "hop". Hops are numbered, 0, 1, and 2. In Hop-0, a requests from a Processor or IO-Processors is routed to the home directory. In HOP-1, messages generated by the home directory are routed to one or more Processors or IO-Processes. In Hop-2, messages travel from an owner processor to the source processor. The hops are illustrated in FIG. 23.

It is a deliberate property of the cache coherence protocol of that all operations complete in a pre-determined number of hops. In the embodiment described herein, the predeterined number is three, although the invention is not limited any particular number of hops, so long as the number selected is relatively low and consistent. This property is key to guaranteeing that all messages can be routed to their destinations without any mechanism for detecting deadlock and failing and retrying messages to resolve deadlock.

As mentioned above, in the current embodiment, the maximum number of hops is three. The system thus provides three channels, which are labeled Q0, Q1 and Q2 respectively. The channels are logically independent data paths through the system interconnect. The channels may be physical or virtual (or partly physical and partly virtual). When physical, each channel has distinct queue and buffer resources throughout the system. When virtual, the channels share queue and buffer resources subject to constraints and rules states below.

The three channels constitute a hierarchy: Q0 is lowest order, Q1, is next and Q2 is the highest order channel. The cardinal rule for a deadlock avoidance in the system is: A message in channel Qi may never depend on a message in a channel lower than Qi.

Additionally, in one embodiment of the invention, a QIO channel is added to eliminate flow dependence cycles between response messages from the IO system and memory space commands from the IO system.

Finally, in one embodiment of the invention, a Q0Vic channel is employed for Victim messages and subsequent dependent messages issued while victim messages issued while victim messages are outstanding.

As described above in connection with FIGS. 20a–20h, a given command packet that is issued to the switch may generate a series number of discrete transactions. In one embodiment of the invention, each discrete transaction for a given command packet is allocated to a channel. The channels, in essence, provide an ordered structure for defining the completion stage and dependencies of a given command packet.

For example, referring now to FIG. 23, a flow diagram illustrating the assignment of channels to the discrete transitions of the operations described in FIGS. 20A–20J is shown. The discrete transactions are identified by the following nomenclature; the first transaction in a series of transactions resulting from a reference is referred to as a Q0 or Q0Vic transaction, the second transaction in the series of transactions is a Q1 transaction, and the third transaction in the series of transactions is a Q2 transaction.

A Q0 or Q0Vic channel carries initial commands from processors and IOPs that have not yet visited a directory. Thus, the destination of a Q0/Q0Vic packet is always a directory. The Q0Vic channel is specifically reserved for Write Victim commands, while the Q0 channel carries all other types of commands initiated by the processor or IOP.

A command issued at step 380 may seek to obtain data or update status. The status is always available at the home directory corresponding the address of the data. At step 382 the home directory is accessed, and it is determined whether the available cache line is owned by home memory (relative to the directory) or by another processor. In either case, a response is issued over the Q1 channel. If at step 382 it is determined that the status or data is available at the second node, then at step 384 the response on the Q1 channel is directed back to the first node. Q1 type transactions include ShortFill, Short Fill Mod, VicAck, CTD-ACK/NACK, etc.

If at step 382 it is determined that the home node does not own the data, but that the data is dirty and owned by another processor, then a Q1 type transaction of either a Forwarded Read or a Forwarded Read Modify is issued on the Q1 channel to a remote node at step 386.

If, in response to a status check at the home node indicating that other nodes share data that has had its status changed to Dirty, or in response to a Read Modify, at step 388 an Invalidate Q1 type transaction is forwarded to other concerned nodes in the system.

Thus, the Q1 channel is for carrying packets that are on their second 'hop', the first hop being to the directory. The destination of the second 'hop' is always a processor, the processor being either at the node initiating the original command, or at another remote node in the system.

A Q2 channel carries either a Long Fill or a Long Fill Mod transaction. The Q2 channel carries data from the third node by a third 'hop' back to the node initiating the original command.

The allocation of commands into Q0/Q0Vic, Q1 and Q2 type commands may be used in a SMP system to ensure deadlock-free messaging in the following manner. Although the flow diagram of FIG. 23 illustrates the interaction between four virtual channels, in one embodiment of the invention, five virtual channels may be used for the purpose of maintaining cache coherency. The Additional channel includes a QIO channel. In general the QIO channel carries all reads and writes to IO address space including control status register (CSR) accesses.

Referring now to Table II below, a list of example command mappings into channel paths is provided:

TABLE II

| QIO | All IO-space requests to CPU | RdByteIO, RdWordIO, WrByteIO, WrWordIO |
|---|---|---|

TABLE II-continued

| Q0 | All memory-space requests from CPU or IOP | Rd, RdMod, Fetch, CTD, ITD, Vic, RdVic, RdModVic |
|---|---|---|
| Q0Vic | All memory-space requests from CPU or IOP that transfer data | WrVic, Full Cache line Write, QV_Rd, QV_RdMod, QV_Fetch |
| Q1 | All Forwarded Commands | FRd, FRdMod, Ffetch |
| | All Shadow Commands | SFRd, SFRdMod, SFEtch, Sinval, Ssnap |
| | Short Fills | SFill, SfilMod |
| | All Flavors of Fill Markers | FM, FMMod, Pseudo-FM, PSeudo-DMMod, FRdMod with FM |
| | Others | CTD-ACK, CTD-NACK, ITD-ACK, Vic-ACK, VicRel |
| | IO-Space Responses | IOFillMarker, IOWriteAck |
| | Consig related | Invl-Ack, LoopComSig |
| Q2 | Long Fills | Fill, FillMod |
| | IO-Space Fills | IOFill |

One implementation of virtual channels in a switch-based system involves the use of physically distinct queues, buffers or paths for each channel. Alternatively, the queues, buffers or data paths may be shared between the channels, and are thus truly 'virtual'. In one embodiment of the invention, a combination of these techniques is used to make optimum use of the hardware.

Figure 24:
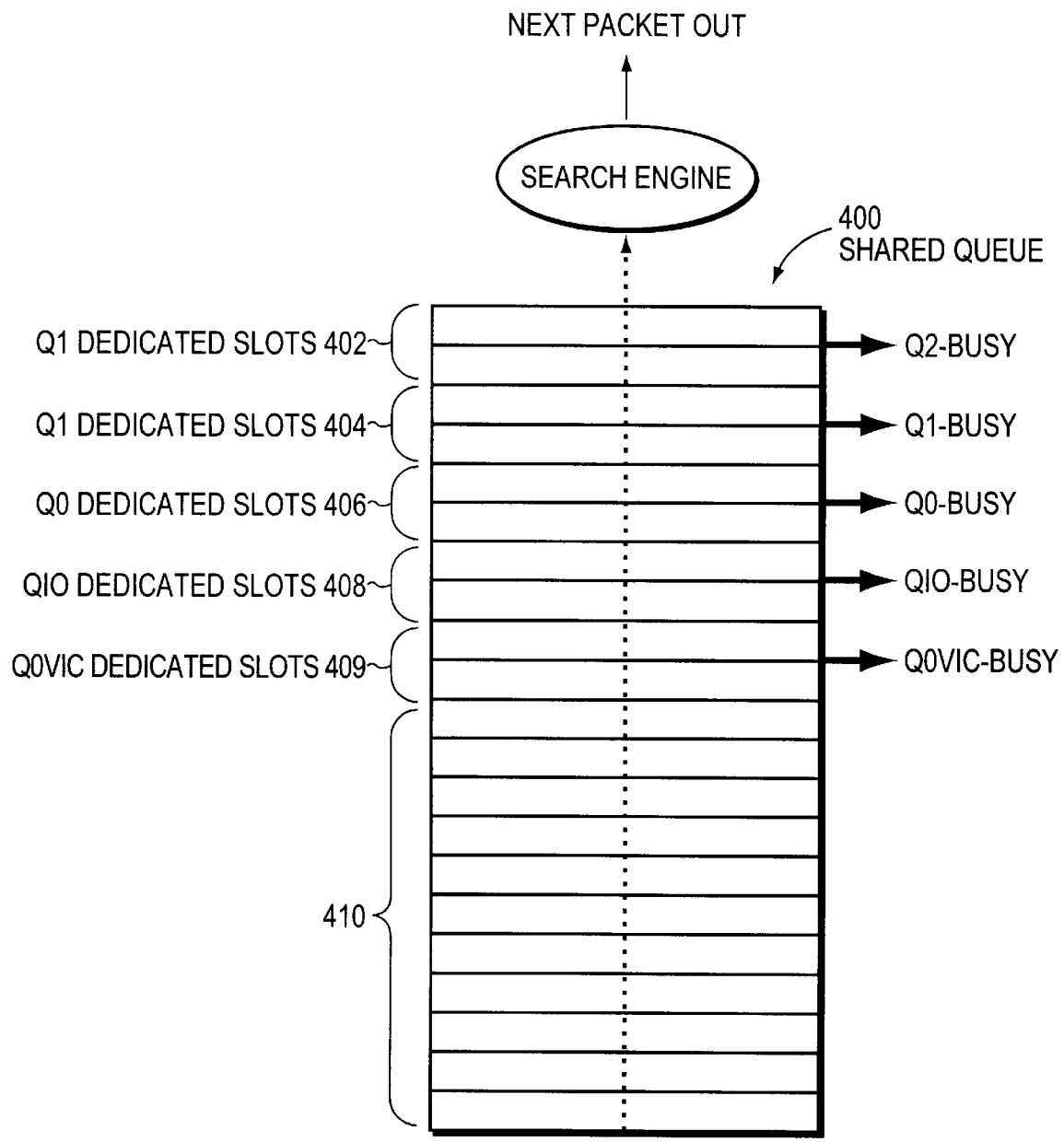
FIG. 24 is a block diagram illustrating one implementation of a shared queue structure for handling virtual channels in the SMP of FIGS. 7A or 7B.

Referring now to FIG. 24, an example of how a single buffer may be shared between more than one virtual channel is shown. Buffer 400 is shown to include a number of 'slots'. Each of the slots is dedicated for use by only one of the channels. For example, slot 402 comprises a number of buffer entries that are dedicated to Q2 type commands. slot 404 comprises a number of buffer entries that are dedicated to Q1 type commands. etc.

The remaining slots 410 may be used by messages for any of the channels, are therefore referred to as 'shared' or 'generic' slots. A Busy signal is provided for each channel. The Busy signal indicates that a buffer is not capable of storing any more messages, and that therefore nothing should be transmitted to that buffer.

There is a latency period between the time when the Busy signal at a given resource for a given channel is asserted, and the time when the devices issuing commands to that resource stop issuing in response to the Busy signal. During this latency, it is possible that one or more command packets could be issued to the resource, and therefore the resource should be designed such that no commands will be dropped.

Therefore, after the receiver asserts the Busy flow control signal, it still should be able to accept M messages, where M is defined in Equation III below:

$$M = \text{(flow-control latency in frame clocks)/(packet length in frame clocks)} \quad \text{Equation III}$$

The value of 'M' here defines the number of dedicated slots available per channel.

Figure 25:
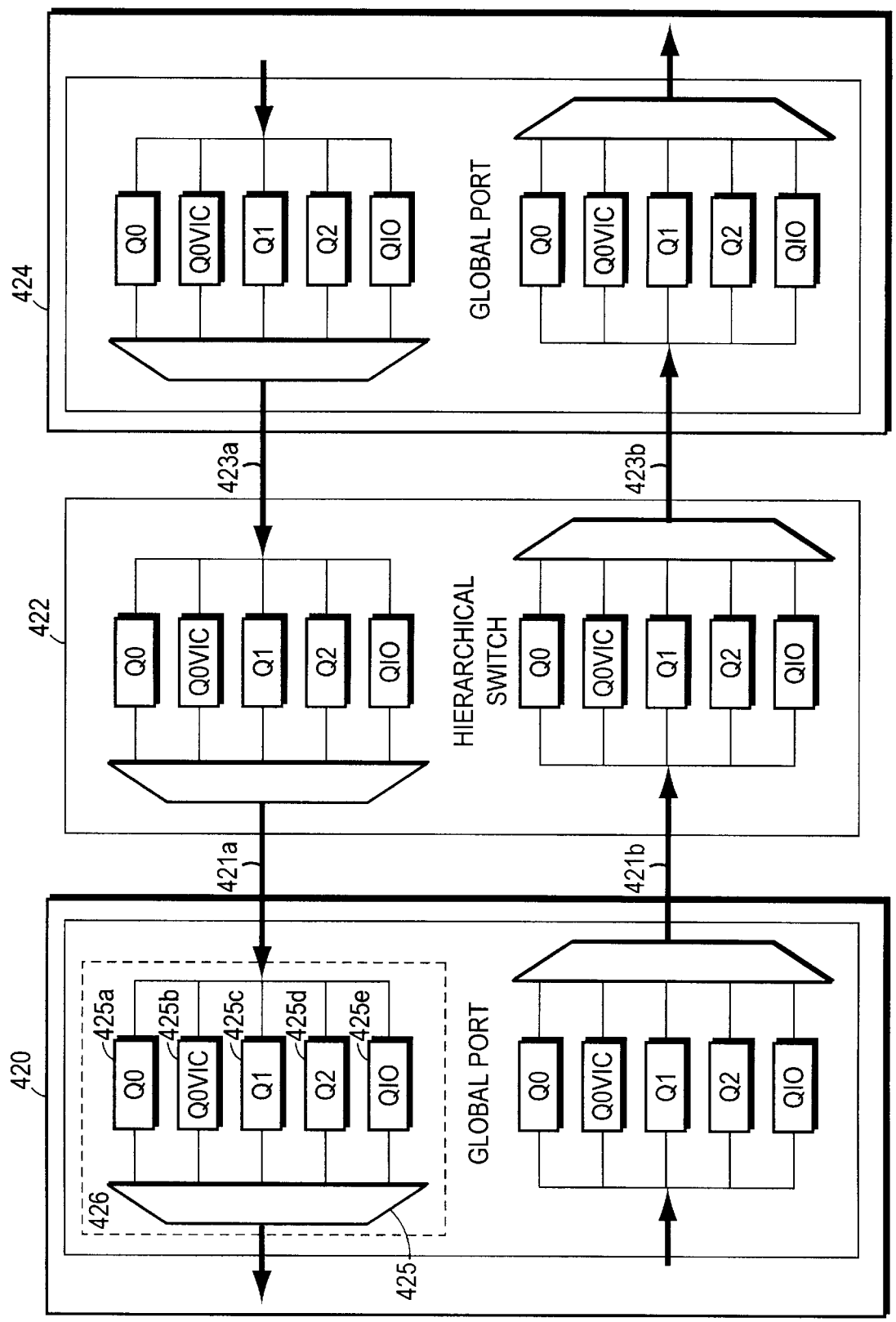
FIG. 25 is a block diagram illustrating an implementation of individual channel buffering in the nodes and hierarchical switches of the SMP of FIGS. 7A or 7B.

Referring now to FIG. 25, an example embodiment is provided where virtual channels are implemented using separate resources for each channel. Portions of two nodes 420 and 424 are shown coupled together via a hierarchical switch (HS) 422.

Global port 420 is coupled to receive input data from the switch 422 on bus 421a and to transmit data to the switch 422 on bus 421b. Similarly, Global port 424 is coupled to transmit data on bus 423*a* to the switch 422 and to receive data from the switch 422 on bus 423*b*.

Data busses 421*a*, 421*b*, 423*a*, and 423*b* each transmit or receive all types of channel commands. A queuing mechanism, such as queuing mechanism 425 is provided at each input and output terminal of each resource. The queuing mechanism comprises a number individually controlled buffers 425*a*–425*e*, each of the buffers being dedicated to storing only one type of channel command. Buffer 425*a* stores only Q0 channel commands, buffer 425*b* stores only Q0Vic channel commands, etc.

As the commands packets are received at each resource interface, the type of the command is parsed, and the packet is forwarded to the appropriate buffer. When the command packets are ready to be forwarded to the appropriate processors or IOP of the node, they are selected from the appropriate buffer and forwarded via the Arb bus and the QSA (FIG. 6). There are 5 search engines, one for each channel, which locate the next message for the respective channel.

In the above scheme, each channel is flow-controlled independently and a slot is reserved for each but the lowest channel in the hierarchy, throughout the system. This guarantees that a channel may never be blocked by a lower channel due to resource dependencies. The movement of higher channel messages will not be blocked due to occupation of resources by lower channel messages will not be blocked due to occupation of resources by lower channel messages.

The above scheme for sharing a physical buffer among virtual channels is a simple one. A more sophisticated scheme has been described earlier in the context of the hierarchical switch.

Virtual Channels: Rules for Arbitration and Coherence Protocol Design

The hardware mechanism alone is not adequate for guaranteeing deadlock-free messaging in the coherence protocol, for it addresses only the resource dependence part of the problem A number of additional arbitration and coherence protocol design rules are imposed to eliminate all resource and flow-dependence cycles.

First, the progress of a message should not depend on progress of a lower channel message, where Q2 is a higher order channel, and Q0 is a lower order channel. Arbiters should maintain flow control of each channel independently of the others. For instance, if a Busy flow-control signal is asserted for Q1, but not for Q2, arbiters should let Q2 messages make progress. All search engines that are used to search a resource for outstanding command packets should support the same property.

Second, any resource that is shared between two or more channels should incorporate some dedicated slots for each of the higher channels to allow higher channels to make progress if lower channels are blocked.

Third, all channels commands should operate consistently. The endpoint of a Q0 command is always a Directory. The endpoint of a Q1 command and a Q2 command is always a processor. At an endpoint, for transactions to continue, they should move to a higher channel. For example, when a Q0 message reaches a directory, it cannot generate any Q0 messages, it should generate Q1 or Q2 messages. A message cannot, therefore, fork or convert to a lower channel message.

For transactions that fork at other points, only messages of the same or higher channel can be spawned. For example, when a Forwarded Read Modify (a Q1 message) spawns a Forwarded Read Modify, an Invalidate, and a Fill Modify Marker at the hierarchical switch, all of these messages are Q1 messages.

Thus, an apparatus and a method for providing virtual channels in either a bus-based system or a switch based system is provided. By using virtual channels and the above ordering constraints, it may be guaranteed that references, once they are serviced by the directory complete. As a result, the complex protocols of the prior art that require NACKS (where one processor indicates to another that a process did not complete) and Retries are eliminated.

Although embodiments with up to five independent channels have been shown, it should be understood that one embodiment of the invention is not limited to a given number of channels, or limited to a symmetric multi-processing system. Rather, the number of channels selected should be the number necessary for supporting coherent communication, given the control and hardware overhead inherent in each channel. The virtual channel control method and apparatus thus allows for high performance, deadlock free communication in any multi-processor system.

Operation of the Directories in Maintaining Coherency

Thus far a basic communication fabric has been set forth, and a basic control structure for allowing communication to flow freely between nodes in the SMP has been provided. The key to coherency, however, is ensuring that the free-flowing commands are 'handled' in the correct order by each of the processors in the system. The mechanism that provides a serialization point for all commands in the SMP system is the directory at each node.

As described above, all Q0 type commands first access the home directory of the related memory address. Ensuring that the home directory is first accessed for any command allows each command to be viewed in order from a common source.

In one embodiment of the invention, serialization order is the order in which Q0commands for X appear on the arb bus after winning arbitration from the directory for address X. A Load type command is ordered when the corresponding Read command accesses the home directory. A Store type command is ordered when either the corresponding Read Modify command accesses the directory, or when the corresponding Clean-to-Dirty command accesses the directory and appears on the arb For example, assume the below sequence of ten commands is issued by various processors (P#) to a common home directory, where $X_i$ is portion of the cache Table IV:

1. P1: Store $X_1$ (1)
2. P2: Load $X_1$
3. P3: Load $X_1$
4. P5: Load $X_1$
5. P1: Store $X_2$ (2)
6. P2: Store $X_1$ (3)
7. P4: Load $X_1$
8. P5: Load $X_2$
9. P6: Load $X_1$
10. P2: Store $X_1$ (4)

The version of the cache line is updated as a result of each store operation. Thus command one creates version one, command five creates version two, command six creates version three and command ten creates version four.

Serialization order ensures that each sequence of events that reaches the directory obtains the correct version of the cache line X. For example, commands two through four should obtain version one. When Processor P1's command five performs the store, it should send invalidates to all version one cache lines (at processors P2, P3 and P5).

Similarly, when processor P2's command six updates X with version three data, it should invalidate processor P1's version two data. Processors P4, P6, and P7 obtain version three data, which is later invalidated by processor P8's store of version four of the data.

Suffice it to say that a number of load and store operations for a common address cache line X may be in progress at any given time in a system. The system handles these commands in such a way that loads and stores are processed by the directory in serialized order.

A number of techniques are used to help the system maintain serialization order and concomitantly maintain data coherence. These techniques include strict ordering of Q1 channel commands, CTD disambiguation, Shadow Commands, Fill Markers and Delayed Victim Write Buffering. Each technique is described in detail below.

Q1 Channel Ordering:

The first method that is used to maintain coherency is to ensure that all messages that travel on the Q1 channel, i.e. those sent from the directory, travel in First-In, First-Out order. That is, the Q1-type messages that are forwarded from the directory to another processor or IOP are forwarded according to the order in which the commands were serialized at the directory.

Figure 26:
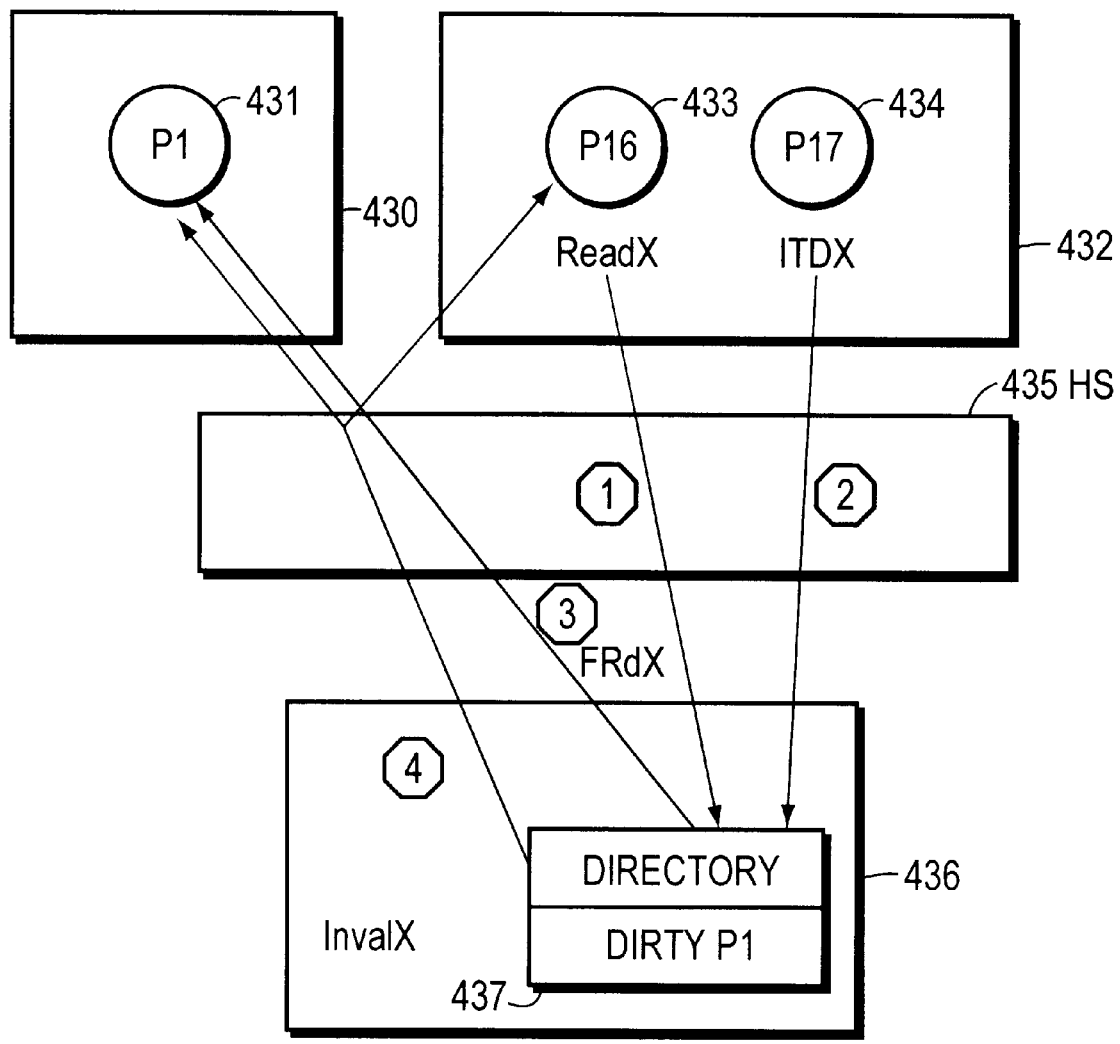
FIG. 26 is a block diagram for illustrating the problems that may arise if some amount of ordering between virtual channels in not maintained.

For example, in the example subsystem of FIG. 26 assume that first processor P1 (431) at node 430 stores a cache line X in its cache Dirty. Processor P16 (433) at node 432 issues a Read X on the Q0 channel, which is forwarded to the home directory 437 of X at node 436. Also, processor P17, at node 432, issues an Inval-to-Dirty command on the Q0 channel, which is also forwarded to the home directory 437 of X at node 436. In response to receiving the ReadX, in accordance with the directory entry, a Forwarded Read X is sent to processor P1 (431) on the Q1 channel. In response to receiving the ITD, in accordance with the status of the directory entry, an Invalidate is sent to the Hierarchical Switch 435, which forwards invalidates on the Q1 channel to processor P1 and processor P16. Thus, at the same point in time, an Inval X and a Forwarded Read X are being forwarded to P1 as Q1 channel commands.

If the commands on the Q1 channel were allowed to execute out of order, it is possible that the Invalidate may occur before the Read. As a consequence, the fill data for the Read would not be sent to processor P16, and the results of any further operations would be unpredictable.

However, by keeping the commands on channel Q1 in order, the Read is handled by P1 prior to the receipt of the Inval, and coherency is maintained.

In one embodiment of the invention, FIFO-order is only maintained for channel Q1, where FIFO order means that all messages corresponding to the same memory address stay in FIFO order. However, the present invention is not limited to merely maintaining order for the Q1 channel, but may be expanded to include maintenance of order for any combinations of channels.

One method of implementing the above ordering procedure is performed by the QS Arb 11 in the QSA chip (FIG. 6). The QS Arb serializes all Q0 transactions to the node's home memory space. As a result, a serial stream of Q1 packets is generated that is directed at both the local processors at the node and processors that are remote to the node via the global port and hierarchical switch.

The first ordering rule is stated as follows: All Q1 packets that are generated by any given QS Arb are generated in serial order. All processors that are targeted by some or all of the Q1 packets from a given QS Arb see these Q1 packets in the order that they were generated by the QS Arb.

To support this rule, the QSA chip maintains order on all Q1 packets transferred to and from the coupled processors in the node. Logic in the global port maintains FIFO order on all packets transferred between the hierarchical switch and the QSA chip. In addition, the hierarchical switch maintains order on all Q1 packets from any given input to any given output.

Note that this rule does not dictate any specific ordering between Q1 packets from one QS Arb and Q1 packets from another node's QS Arb. The Q1 packets received from other nodes are serialized with the Q1 packets generated by the home node via the hierarchical switch as follows. All Q1 packets targeted at processors in remote nodes are processed by the QS Arb of the remote nodes. These Q1 packets are serialized with Q1 packets generated by the remote node by the hierarchical switch. All recipients of Q1 packets from a given QS Arb should see the Q1 packets in the same order as they were serialized at the QS Arb.

Figure 27A:
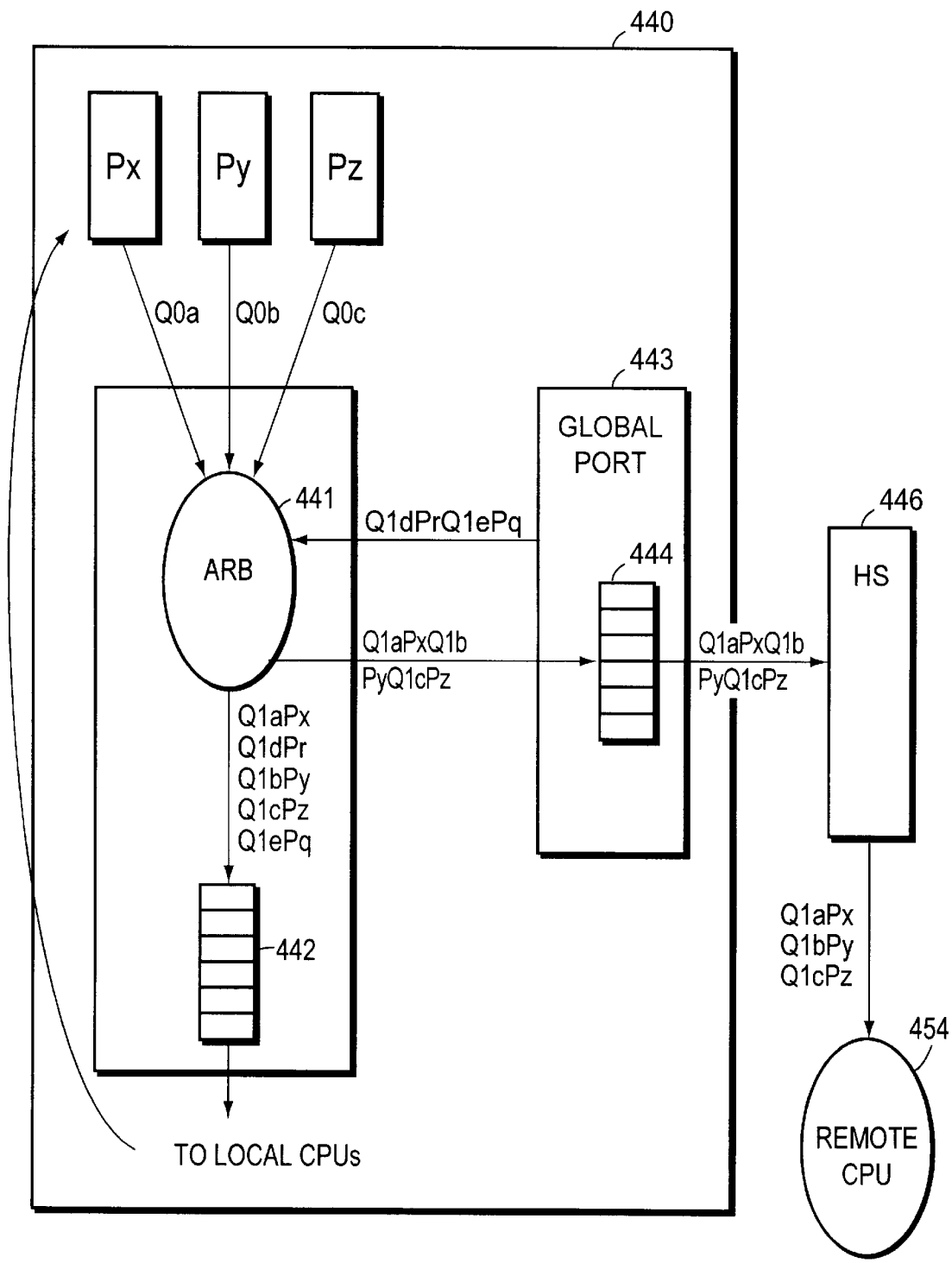
FIGS. 27A–27C are block diagrams illustrating the flow and ordering constraints on the Q1 channel for providing coherent communication in the SMP of FIGS. 7A or 7B.

Referring now to FIG. 27A, a block diagram is shown for illustrating the ordering of a number of Q0 and Q1 commands being processed through the SMP according to the above ordering guidelines. Assume that processor Px at node 440 issues command Q0a, processor Py issues command Q0b, and processor Pz issues command Q0c. During the same time, QS Arb 441 receives from global port 443 Q1 messages from processors Pr and Pq.

These messages are ordered as follows. The QS Arb 441 processes the Q0a, Q0b, and Q0c to generate Q1a, Q1b and Q1c responses. These generated Q1 commands are combined with the incoming Q1 commands, to provide an ordered stream of commands to FIFO 442 for forwarding to the local processors. The order of the FIFO commands reflects the order of the commands processed by the QS Arb.

The Q1a, Q1b, and Q1c commands are forwarded to the global port 443 for transmission to a remote node. The output buffer 444 of the global port stores these commands in the same order in which they were processed by the QS Arb. This order is maintained by hierarchical switch 446 as the messages are forwarded to remote CPU 454 using the methods described above with regard to FIGS. 14–19.

FIG. 27A also illustrates another ordering guideline that is followed at the hierarchical switch. As mentioned, the hierarchical switch maintains order by ensuring that multiple packets that appear at a given input port of the hierarchical switch, and that are targeted at a common output port of the hierarchical switch appear in the same order at the output port as they appeared at the input port.

Figure 27B:
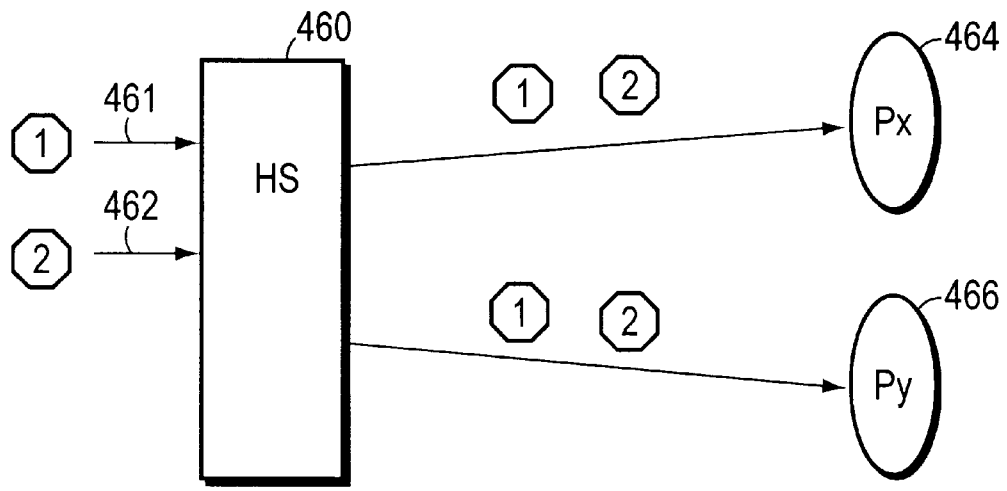

Referring now to FIG. 27B, as described above the hierarchical switch is also responsible for multi-casting input messages; i.e. sending one received Q1 packet to more than one destination node. One example of a packet that is multi-cast by the switch is the invalidate packet. When multiple packets that are input from different hierarchical switch ports are multi-cast to common output ports, the Q1 packets should appear in the same order at all of the output ports. For example, if packet one and packet two are both received at hierarchical switch 460, then one permissible method of multi-casting the two messages to processors 464 and 466 is as illustrated, with message two reaching both processors before message one. Another permissible method would be to have both message one packets reach both processors before message two packets. However, the two processors should not receive the two packets in a different order.

Another ordering rule that should be followed by the hierarchical switch is to ensure that when ordered lists of Q1 packets from multiple input ports are targeted to common output ports, the Q1 packets appear at the output ports in a manner consistent with a single common ordering of all incoming Q1 packets.

Figure 27C:
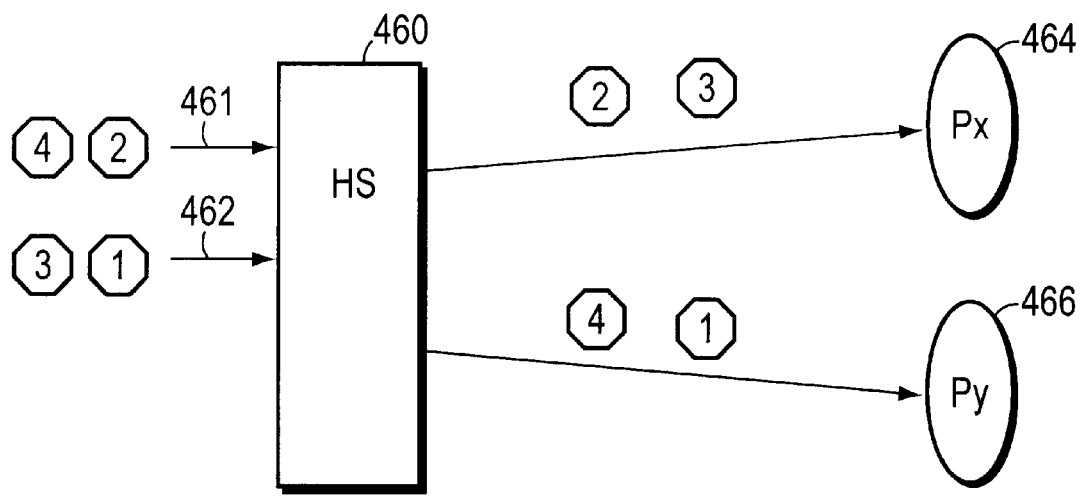

For example, in FIG. 27C at input port 461, packet two is received before packet four. Similarly, at input port 462, packet one is received before packet three. The total order of these instructions should be preserved to prevent deadlock. One permissible order to provide the output packets is to have packet three transmitted first to node 464, and packet one transmitted first to node 466. This transmission is illustrated in FIG. 27C. Another permissible output would be to have packets two and four received first by the recipient processors. However, if one processor receives packet three first, and another receives packet four first, then deadlock could occur as the processors stall awaiting receipt of the other packet of their original sequence.

Rules are therefore provided to ensure that order is maintained in the Q1 channel. In one embodiment of the invention, for performance reasons, it is desirable to allow Q0 and Q2 channel packets to be processed out of order. To ensure data consistency, several coherency mechanisms are provided as described below.

Change to Dirty Disambiguation:

As mentioned above, only Q1 type commands are maintained in a serialization order defined at the directory. In one embodiment of the invention, Q0 and Q2 commands are not ordered. As such, precautions are taken to ensure that coherency problems do not arise at the directory as a result of the relative timing of received Q0 and Q2 commands.

One coherency problem that arises results from the structure of the directory entries. As shown in FIG. 9, each directory entry includes an ownership field and one presence bit for each node. The presence bit is a coarse vector, representing the presence of data in one of the four processors of the associated node. Operations by any of the four processors may result in the presence bit being set. Thus, there is a certain ambiguity as to which processor in the node set the presence bit. This ambiguity can result in coherence problems in certain instances.

Figures 28A, 28B:
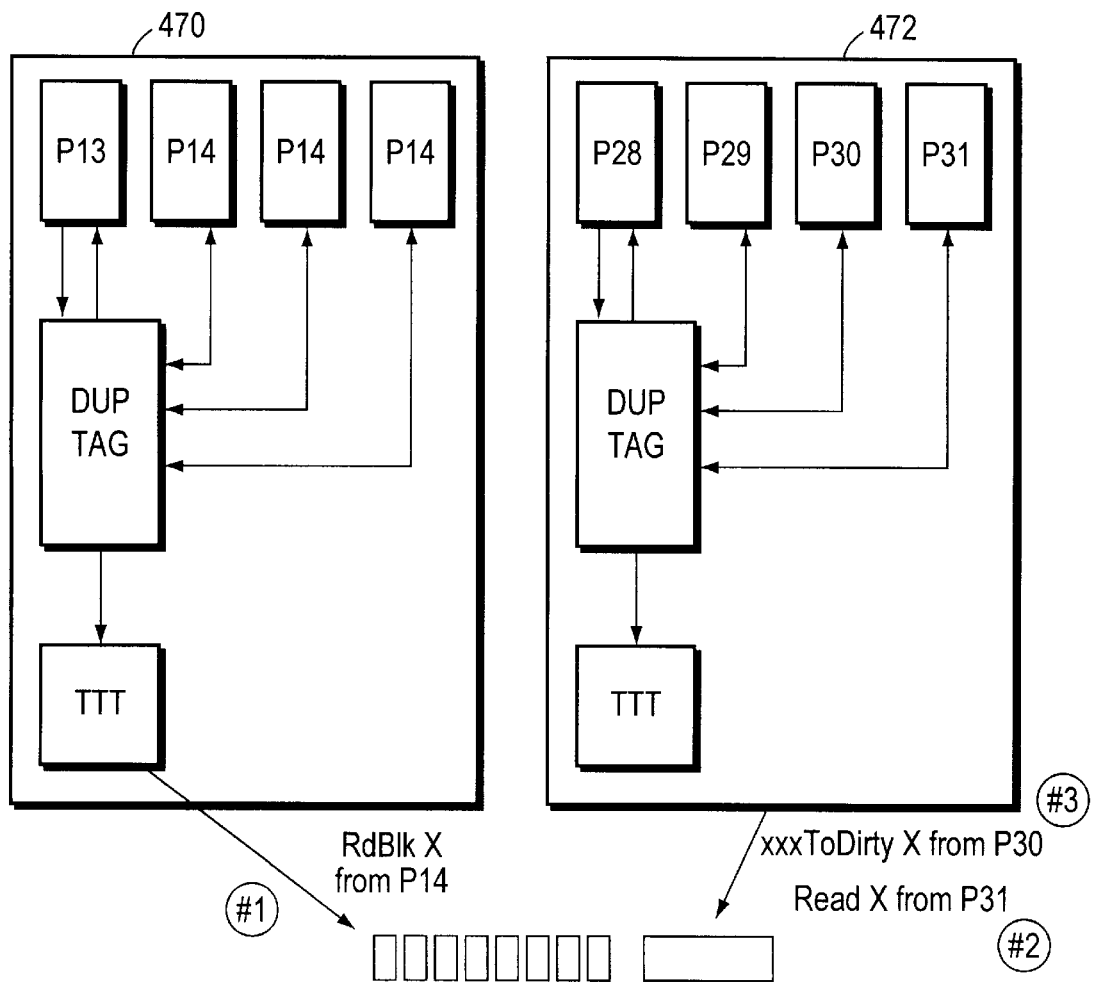
FIGS. 28A and 28B are a block diagram illustrating the ambiguity problems that arise because of the coarse vector presence bits of the directory entries of the SMP of FIGS. 7A and 7B.

For example, referring now to FIGS. 28A and 28B, a block diagram of two nodes 470 and 472 is shown. Node 470 [node ID three of the global system] includes processors P12, P13 P14 and P15, while node 472 [node ID seven of the global system] includes nodes P28, P29, P30 and P31.

The state of the directory entry for a given cache line X at various sequential periods of time T0–T3 is indicated in Directory State Table 455 in FIG. 28B. In this example, the home node of cache line X is a node other than node 470 or 472.

At time T0, the owner of cache line X is memory as indicated by the owner ID 80. In addition, at time T0, processor 30 at node ID seven stores a clean copy of cache line X. At time T1, processor 14 transmits a Store command that is translated to a Read Block Modify X and is forwarded to the home directory of cache line X. Because memory is the owner, processor P14 can obtain data from memory and becomes owner of the cache line. An invalidate is transmitted to node seven to invalidate the older version of cache line X, and node seven's presence bit is cleared. In addition, processor P14 sets its node presence bit 456 (bit three). Cache line X is sent from home memory to processor P14 for modification and storage.

At time T2, another processor, such as processor 31, issues a Read of cache line X. The Read obtains data via a Fill from processor P14. Thus, at time T2 the directory indicates that both node ID three (Processor P14) and node ID seven (processor P31) store a copy of cache line X, as indicated by node presence bits 458 and 456.

If at time T3 a CTD is issued by a processor 30, the state of cache line X as viewed by different processors in the system may become incoherent for the following reason. When the CTD reaches the directory, it reads the directory entry for X and determines that the presence bit 458 for its node, node ID seven, is already on. As a result, processor 30 then assumes that it has succeeded in the CTD request. Processor 30 invalidates processor 14's copy of cache line X, and updates the owner field of the directory. This action may cause unpredictable results, since processor P14 is storing a more up-to-date version of data than processor P30.

One problem is that processor 30 is still storing an out-of-date version of the cache line created by processor 14, and processor 14 was told to invalidate the most recent version of the data. Such a situation could cause serious coherence problems with the SMP system.

There are a few methods that may be used to correct the above problem. One method is to expand the presence field of the directory entry to provide one bit for each processor in the system. Thus, the resolution is changed from a node level to a processor level. This solution, however, would undesirably increase the size of the directory.

One embodiment of the invention provides a more straightforward method of preventing the above ambiguity problem by slowing down the CTD commands when an outstanding reference to the same address is in transit for that node. If there is an outstanding request to the same address, the CTD is held back until that previous request is retired. The transaction tracking table (TTT) (FIG. 10) of a given node is used to monitor outstanding global references for that node. In addition, requests received after the CTD is received at the TTT are failed.

As described with reference to FIG. 10, the TTT is a fully associative, multi-functional control structure. The TTT performs two general tasks. It stores the addresses of all remote references issued by its associated node. Thus the TTT stores one entry of information for each remote access issued by a node until that transaction is considered complete. In addition, the TTT provides coherency information, with regard to transient coherency states, in response to requests to local addresses. Thus, the TTT is a table for tracking the status of accesses while they are in transit.

Other processing systems allow one reference to any given cache line to be in transit at any instance in time. Subsequent references to a cache line in transit are blocked until the reference in transit is completed.

In contrast, because of the serialization of commands at the directory and the channel ordering rules, the SMP of the present invention allows multiple references to the same cache line to be in flight at any given instant in time. As a result, the overall performance of the SMP is improved.

The TTT 522 is used by logic in the QSA chip 535 to determine the state of transactions that have been issued over the global port. Before issuing the response to the global port, the QSA first accesses the TTT to determine what references to the same cache line are outstanding. A reference is outstanding if it has not been retired from the TTT in response to the last received transaction.

How a reference is retired from the TTT is dependent upon the type of reference indicated in the command field 584. For example, Read X reference that made it to the global port for storage in the TTT requires both the Fill Here 588a and Fill Marker Here 588b status bits to be received. (Fill Markers are described in more detail below). For status type references, such as CTD or ITD, setting the ACK/NACK bit 588c in the TTT is sufficient to retire that entry.

Figure 29:
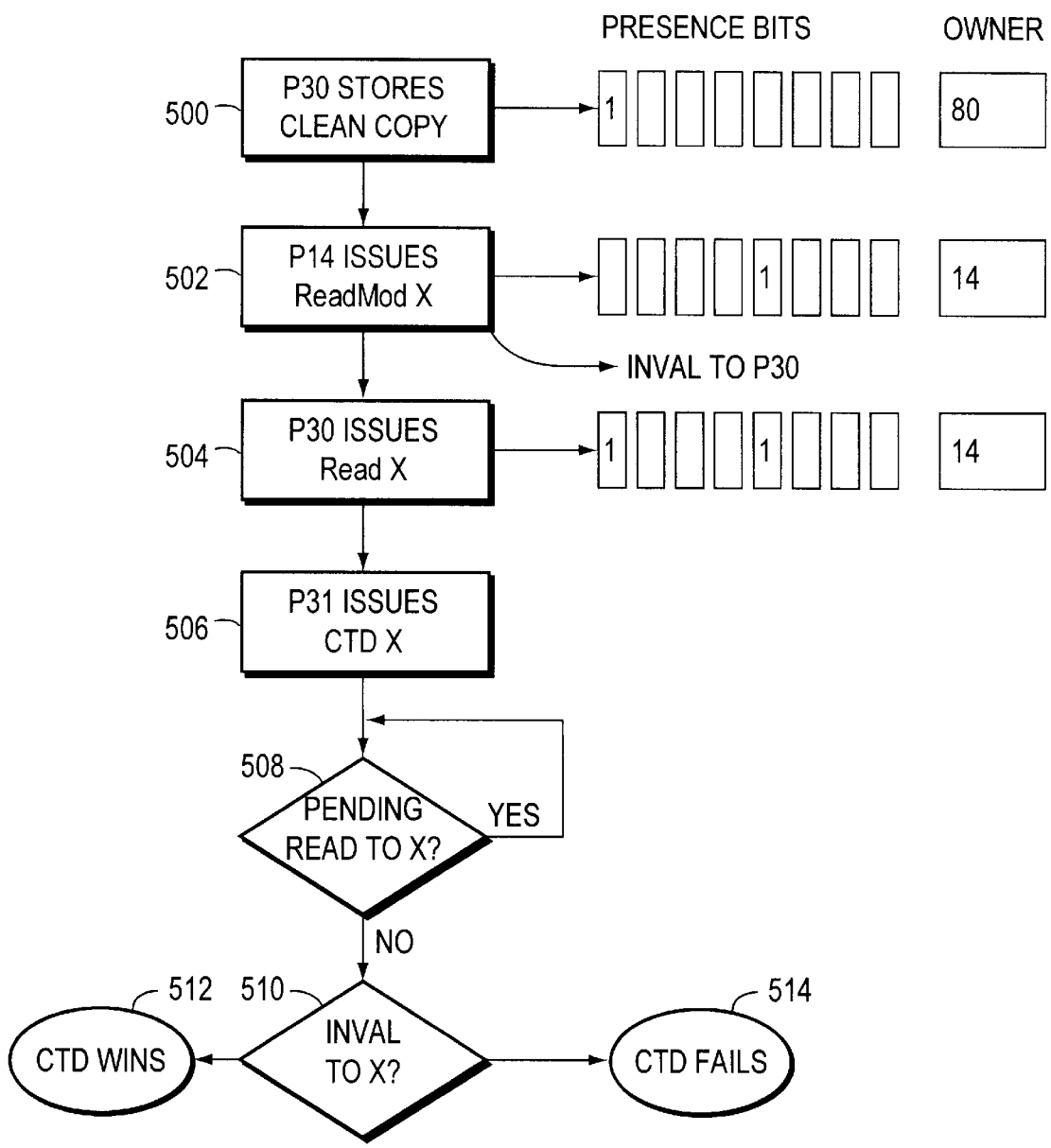
FIG. 29 is a block diagram illustrating the method used to prevent data ambiguity from arising as a result of the problem described in FIG. 28.

Referring now to FIG. 29, a flow diagram illustrating the use of the TTT for eliminating ambiguous directory entries is provided. At step 500, cache line X is stored in memory at its home node and processor 30 of node seven stores a copy of the data. At step 502, a ReadMod X is issued by processor P14. As a result, invalidate is forwarded toward node seven. At step 504, processor P31 issues a Read X which creates an entry in the TTT at node seven with the following state:

| Address | Command ID | Status |       |        |          |
|---------|------------|--------|-------|--------|----------|
|         |            | Fill   | Fmark | Shadow | ACK/NACK |
| X       | Read    31 |        |       |        |          |

At step 506, processor P30 issues a CTD X. The QSA chip examines the address of the CTD instruction, determines that it is a remote CTD, and forwards it to the global port over the GP Link to the TTT. The contents of the TTT are then as shown below:

| Address | Command ID | Status |       |        |          |
|---------|------------|--------|-------|--------|----------|
|         |            | Fill   | Fmark | Shadow | ACK/NACK |
| X       | Read    31 |        |       |        |          |
| X       | Read    30 |        |       |        |          |

As mentioned with regard to FIG. 6, the global port uses information from the TTT to determine which commands are permitted to be sent out of the hierarchical switch. In one embodiment of the invention, If the TTT determines that a pending Read is in transit, it precludes the global port from forwarding the CTD to the switch until the Read results have been returned.

In the example described in the flow diagram of FIG. 29, an outstanding read request to the address X is identified by the TTT. As a result, at step 508, the CTD is held off until a Read is no longer outstanding.

The Read is outstanding until both a Fill and Fill Marker are returned to node seven. During this period of time, the invalidate issued by the ReadMod at step 502 reaches node seven and updates the DTAGS of the respective node. When the invalidate for X reaches the TTT, the TTT marks any CTD that is held in the TTT as a failure and it is released immediately. If at step 510 the CTD is still in the TTT, it is transmitted over the global port.

Accordingly, by using the TTT to appropriately hold off or fail CTD commands, coherency problems caused by the ambiguity of the presence bits in the directory can be eliminated.

Fill Markers:

Most responses to a processor are in the Q1 channel, and thus, according to the rule set forth above, are maintained in order. However, messages that are received on the Q2 channel are not subject to this ordering constraint. Q2 type messages include Fills and Fill Modifies.

Because the arrival of Q2 type messages does not reflect the serialization order as seen at the directory, there is a potential ambiguity in the return data. For example, because an Invalidate travels on Q1, and a FillMod travels on Q2, there should be some way of determining which of the operations is to occur first in order for coherency to be maintained.

Figure 30:
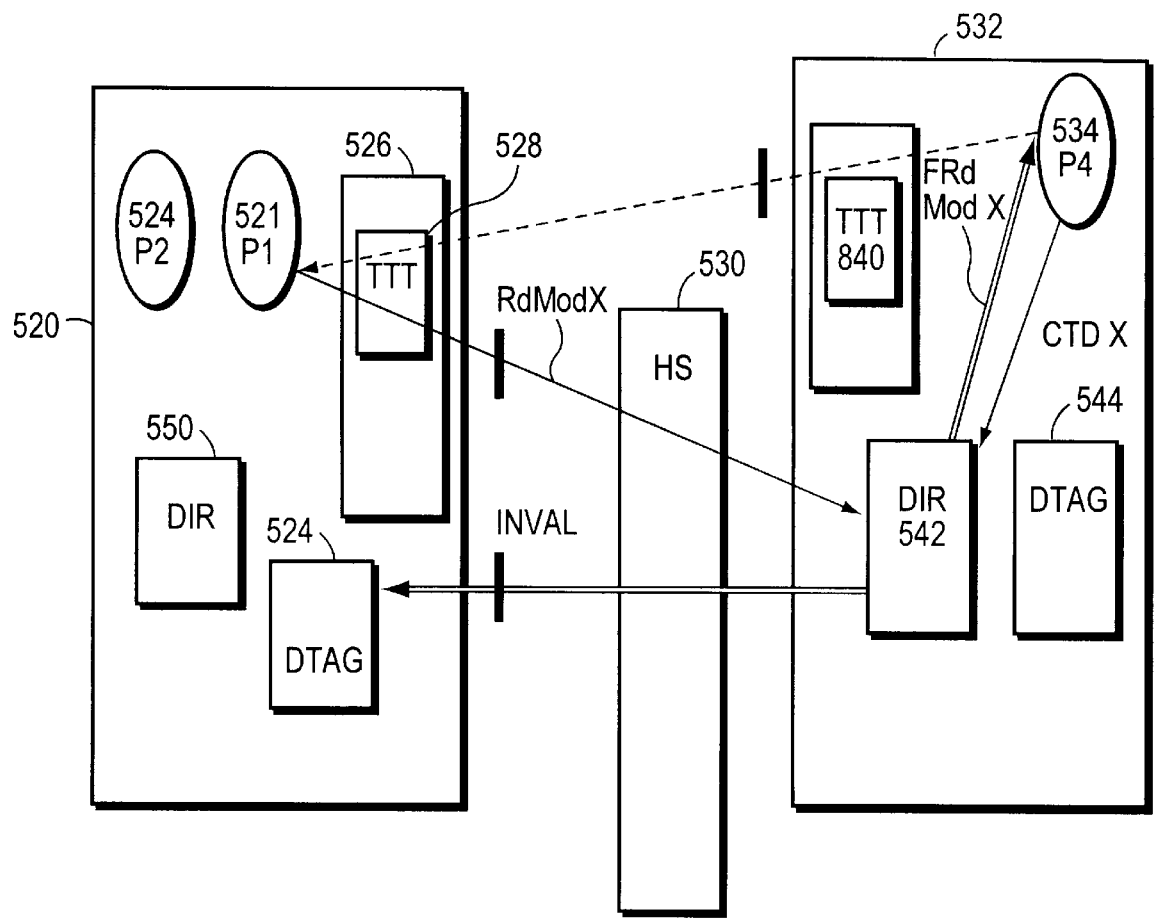
FIG. 30 is a block diagram for illustrating a coherency issue that arises from packets on different channels being received out of sequence.

For example, referring now to FIG. 30, two nodes 520 and 532 are shown. Only the portions of the nodes that are needed for explanation purposes are shown. Assume processor P2 (524) and processor P4 (534) store a copy of cache line X. The home node of cache line X is node 532.

In the following description, the channels used by the following packets are indicated using different lines. Q0 commands are indicated by single line arrows, Q1 commands are indicated by double line arrows, and Q2 commands are indicated by dashed line arrows.

Assume processor P4 issues a CTD X to gain exclusive ownership of cache line X. In response, according to the directory presence bits and the DTAG (not shown), directory 542 issues an invalidate to node 520. This invalidate will update the DTAGS at node 520 on the Q1 channel and send an invalidate probe to all processors (here processor P2) that have a copy.

Processor P1 then issues a ReadMod X to X's home directory 542. As mentioned above, X is currently owned by processor P4, and therefore according to the coherence protocol, a Forwarded Read Mod X is forwarded to processor P4. Processor P4, in response, issues a FillMod to processor P1 on the Q2 channel.

Because communication on the Q2 channel is not serialized with the Q1 communication, a possibility exists that the Q2 FillMod may reach processor P1 before the Inval from the CTD X reaches node 520. The effect would be that valid data would be written to the cache of P1, but that soon thereafter the DTAGS would be set to invalidate any copies of X at the node and an Inval would be sent to P2 and P1. However the Inval only corresponds to the version in P2, not the later one in P1. The system would now be in an incoherent state. The directory 544 records P1 as the owner, yet P1 has been invalidated.

One embodiment of the invention overcomes this problem through the use of Fill Markers and the Transaction Tracking Table (FIG. 10) in the global port of each node.

A Fill Marker or a Fill Marker Mod is a packet that is generated in response to a Read or Read Mod request for data that is not currently stored in memory at the home node. That is, the Fill Marker or Fill Marker Mod is generated at the same time as the Forwarded Read or Forwarded Read Mod. Thus, Fill Marker and Fill Marker Mods are Q1 channel commands. While the Forwarded Read or Forwarded Read Mod commands are sent to the processor storing a cache line, the destination of the Fill Marker or Fill Marker Mod is the processor that sourced the original Read or Read Mod.

Figure 31:
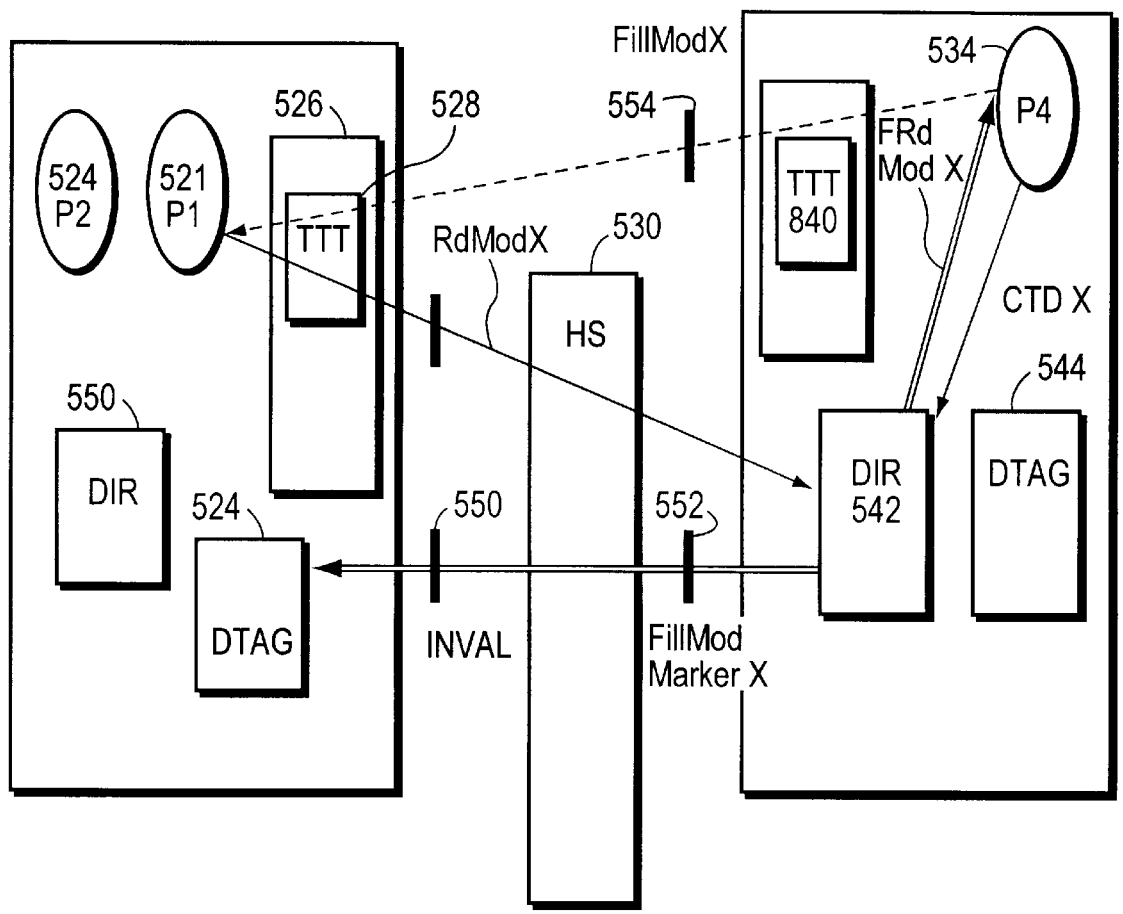
FIG. 31 is a block diagram illustrating the use of Fill Markers for preventing the coherency problem described in FIG. 29.

The Fill Markers allow the originating processor to determine the serialization order that occurred at the directory. Referring now to FIG. 31, the application of Fill Markers remedies the above problem as follows. As before, assume processor 53A issues a CTD of X, to the home directory of X, resulting in an Inval 550 being sent on Q1 channel to node 520.

When the processor P1 (522) issues the Read Mod X to the remote directory, a TTT entry is generated for that request. An example TTT table entry for this request is shown in FIG. 32. Note that the TTT table entry includes Fill Here and Fill Marker Here status bits. Each of these bits are set in response to the representative packet being received at the global port of node 520. The TTT entry is not cleared until both the Fill and Fill Marker are returned.

Referring back to FIG. 31, as described above, the Read Mod X from processor 522 will result in a FRdModX to processor 53A. At the same time, on channel Q1, a Fill Marker Mod X 552 is forwarded back to processor P1. Both the Inval and the Fill Mod Marker are on the same Q1 channel.

Assume the Fill Mod 554 on channel Q2 reaches node 520 before the Inval. Duplicate Tag status on global references are updated in response to the return of either the Fill Mod or Fill Mod Marker. Thus the Fill Mod causes the DTAG status for X to be updated to reflect ownership of X as processor P1.

Assume that the Inval 550 is the next instruction that reaches node 520. The TTT is accessed to determine the status of the Forwarded Read instruction. At this point, the TTT entry has the Fill Here bit set, but the Fill Marker Here bit is not set. Thus the TTT provides an indication as to the relative timing of the Invalidate and the remote read operation. Because of the serialization of Q1 commands, it can be inferred that the invalidate was generated earlier in time at the directory 542 than the RdMod X from processor 522, and hence the Fill Mod is a newer version and the invalidate does not apply to processor 522's copy of the data. As a result, the DTAG entry for processor P1 is not invalidated.

Although the above embodiment shows the TTT as existing in the global port, according to an alternative embodiment, each of the processors of each of the nodes could track the status of remote requests to common addresses by monitoring the requests to the directory. As such, the Fill Markers would be forwarded to the associated processor by the directory, rather than being forwarded merely to the TTT.

Thus, it can be seen that the TTT may serve two purposes. By monitoring the types of commands that are sent out of the multi-processor node, the TTT can inhibit the forwarding of certain commands (such as the CTD) until other commands to the same address are complete. In addition, by providing a marking mechanism that indicates to the TTT when a request has transitioned to the Q2 channel (such as the Fill Marker), the TTT can be used to provide a relative timing indication between commands returned on different channels (i.e. Q2 fill and Q1 commands), and accordingly can preclude commands that could corrupt memory from being forwarded to a processor.

Shadow Commands:

As is apparent from the above description, local accesses typically are much faster than remote accesses. Thus, in the interest of performance, both local and remote accesses are permitted to occur simultaneously in the SMP system.

Figure 33A:
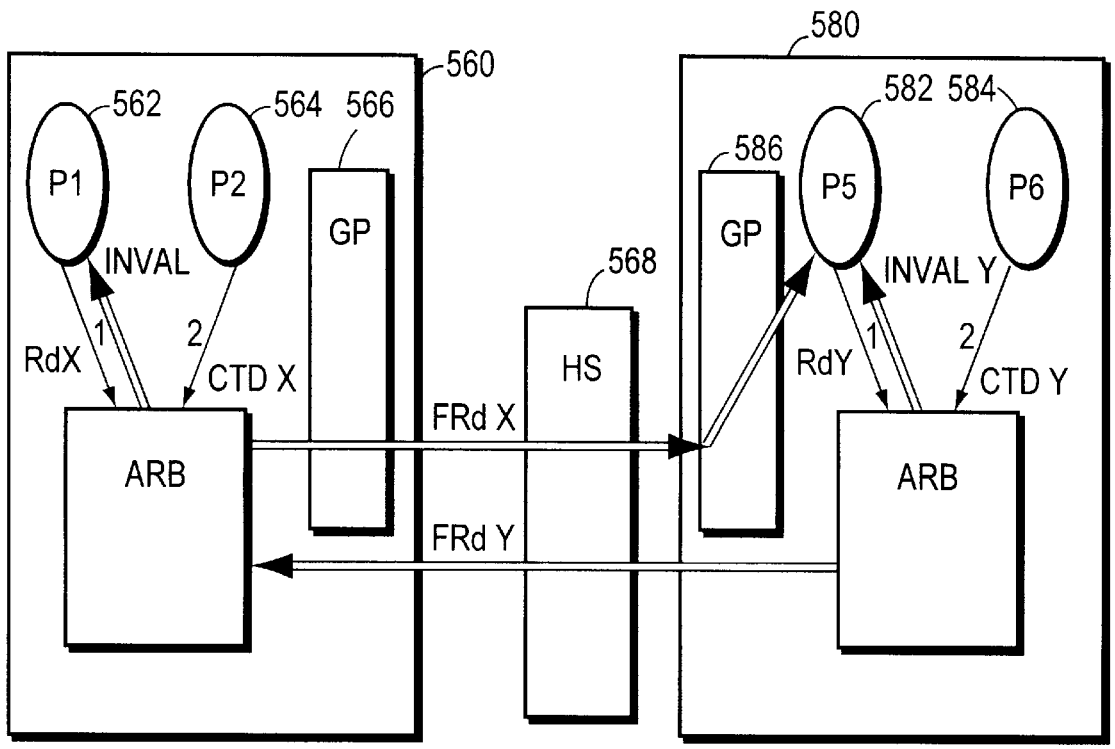
FIGS. 33A–33B are block diagrams illustrating the operation of Change to Dirty commands in the SMP system.

However, there are some instances where the occurrence of a local access can cause deadlock problems for a remote access. For example, referring now to FIG. 33A, assume that one processor 562 issues a Rd X to a cache line X. Cache line X's home node is node 560. The directory at node 560 indicates that processor 582 currently owns the cache line. Thus, a Forwarded Read X is sent to 582.

Thereafter, assume that processor 564, at node 560, issues a CTD X. As mentioned above, cache line X is local to node 560, and when the CTD succeeds, it forwards an Inval to processor P1 (and also to processor P5, is shown).

Figure 33B:
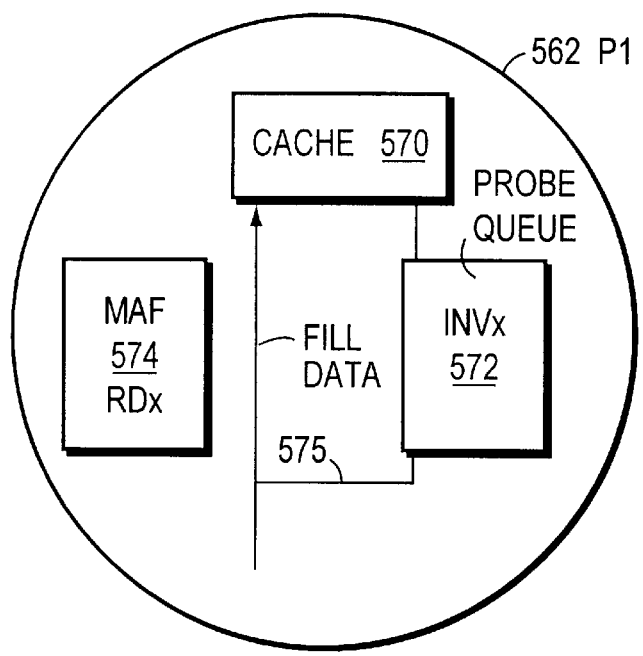

Referring briefly to FIG. 33B, as described in detail in co-pending application entitled "Distributed Data Dependency Stall Mechanism", attorney docket number PD96-0149, by VanDoren et al, filed on even date herewith and incorporated by reference herein, each of the processors, such as processor P1, includes logic for stalling probes to a cache if there is an outstanding read for the same cache location. Given the above example, the effect of the Read X would be to store address X in Miss Address File (MAF) 574. The contents of the MAF are compared against incoming probes, and when there is a match between the address of an incoming probe and the MAF the probe queue is stalled.

The probe queue is released when the Fill data is returned from processor 582. However, if the same type of transactions (i.e., P5 performing a remote Rd Y and then P6 issuing a CTD Y) are occurring at node 580, the probe queue of processor P5 may be stalled pending satisfaction of the Read Y request.

If the P5 probe queue is stalled with the Forwarded Read X from processor P1 behind the Inval generated by P6 at the same time that the P1 probe queue is stalled with the Forwarded Read Y from P5 behind the Inval generated by P2, deadlock can occur.

A number of strategies exist for preventing this deadlock problem. First, all references can be made remote; i.e., all of the references (even those from the home node) can be forwarded to the switch before they are forwarded to the home node. If all references are made remote, then, according to the central ordering rules outlined above, the deadlock situation would not arise. A second solution is to stall all references to a given cache line once any reference to that cache line is sent remotely. These solutions, however, drastically impact the performance of previously local operations, and are therefore not preferred.

One embodiment of the invention overcomes the deadlock potential posed by the commingling of local and remote references through the use of command shadowing. Once a local reference to a cache line X is forwarded to a remote processor, then all subsequent references to that cache line are forwarded remotely to the hierarchical switch to be centrally ordered until the local reference and all subsequent references that cache line have been completed. Thus, any prior reference to a cache line that is still being shadowed causes the present reference to the cache line also to be shadowed.

Figures 34, 35:
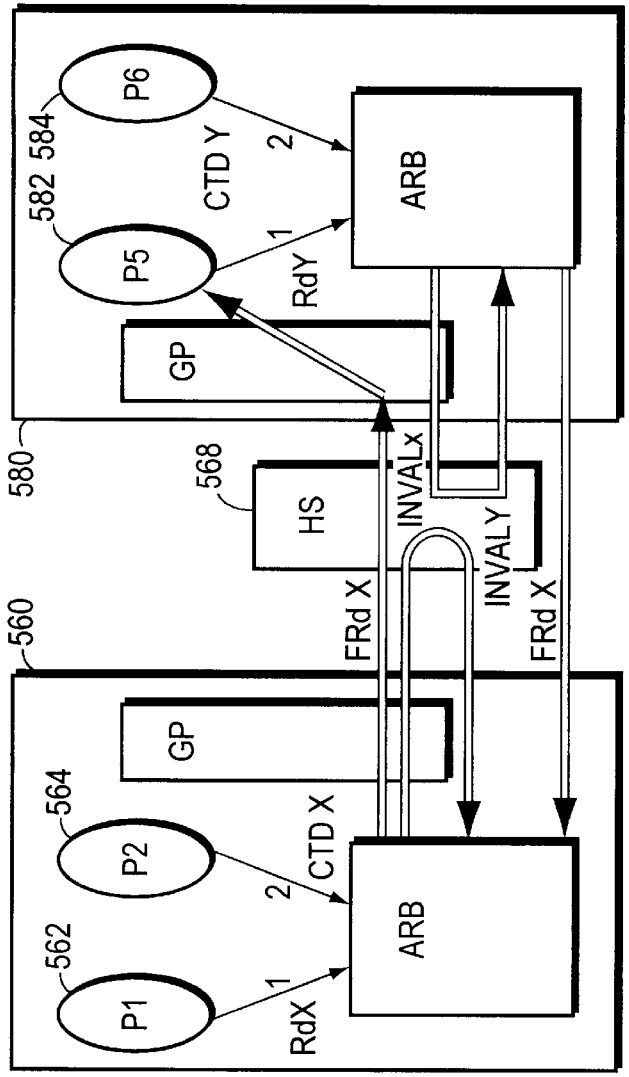
FIG. 34 is a block diagram illustrating the use of Shadow commands for remedying the problem described with regard to FIG. 33.
FIG. 35 is an entry in the TTT reflecting the status of an instruction during the flow described with regard to FIG. 34.

Referring now to FIGS. 34 and 35, the above example is described with the use of Shadow commands. FIG. 35 illustrates the contents of the TTT for this example. First processor P1 issues a RdX to the Arbiter. As before, this results in a FRdX to processor P5, which is recorded in the TTT. Subsequently processor P2 issues a CTD X to the Arb. The Arb examines the TTT, determines that there is an outstanding local read forwarded to a remote processor, and forwards the Inval X out of the global port and to processor P5. An entry is also created in the TTT reflecting this operation, with its shadow bit set.

At the same time, at node 580 a similar series of transactions is occurring. Processor P5 issues a RdY, that is forwarded to node 560 and is logged in the TTT, by including the P5 address in the entry. Processor P6 subsequently issues a CTD Y. The Arbiter at node 580 matches the CTD address against an outstanding read in the TTT, and 'shadows' the CTD Y over the global port. An entry is created in the TTT for that CTD Y, with that entry having its shadow bit set in the TTT, indicating that the CTD Y was a local reference that was forwarded remote in order to ensure proper ordering of requests to Y.

Figure 36:
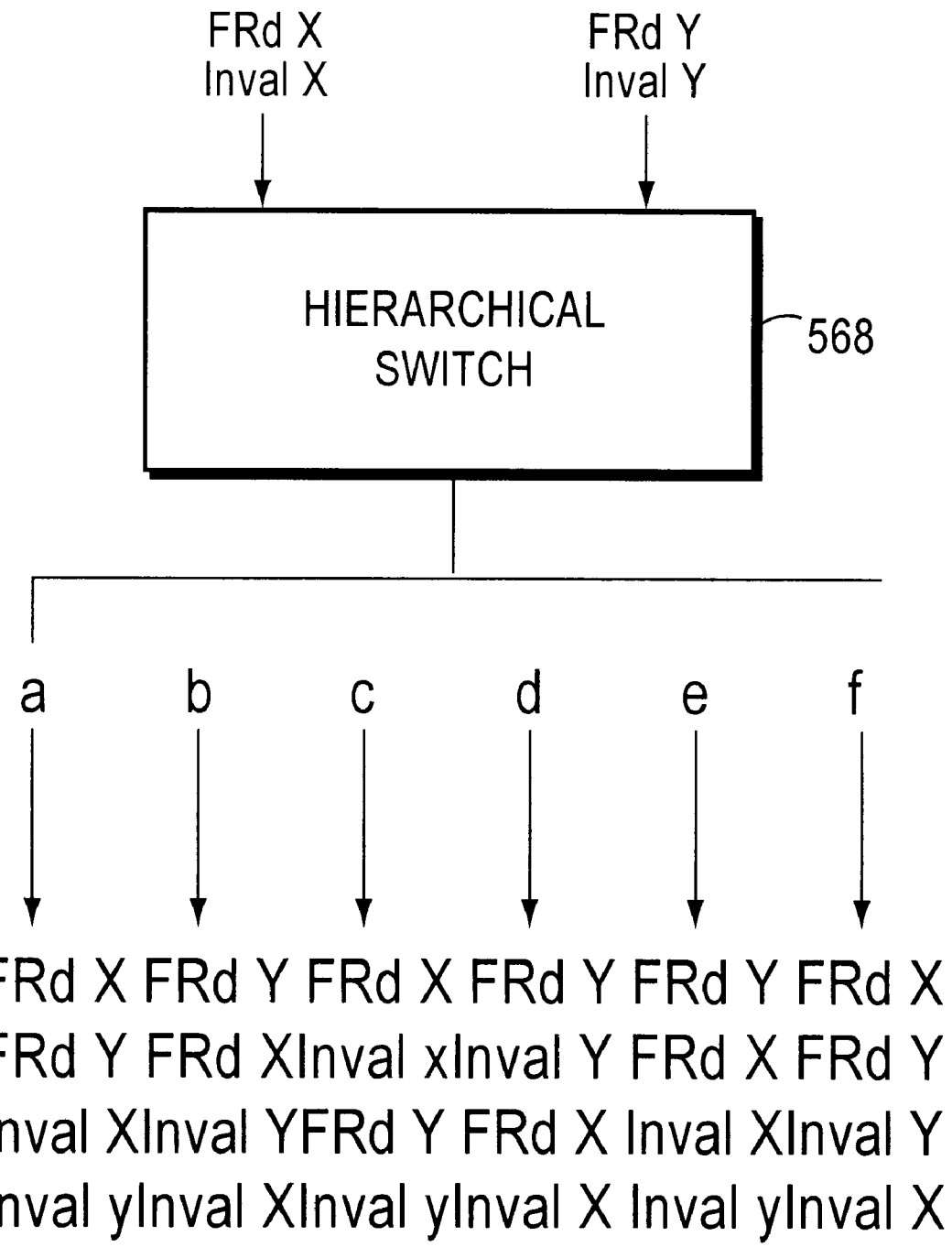
FIG. 36 is a flow diagram illustrating permissible sequential ordering of instructions in the example described in FIG. 35.

As described above, a problem exists when, at both nodes, the FRd is behind the Inval in the probe queue. Because the Invals are now centrally ordered, it cannot occur that both invalidates cannot be forwarded to their probe queues before both Forwarded Reads, because they are serialized at a common point, i.e., the hierarchical switch. Thus, referring now to FIG. 36, the input sequence of commands is shown being input to hierarchical switch 568. The permissible output serialization orders are identified as orders a–f. Note that, according to the Q1 channel ordering rules described above, the serialization order of packets input to the hierarchical switch is maintained at the switch output. Therefore, in the above case, the FRds precedes the associated Invalidates as they are transmitted to a destination node.

One of the nodes may still receive an Inval in the probe queue followed by the Forwarded Read. For example, using serialization order, processor P5's probe queue may be stalled by the Inval Y, and the Frd X may be stalled pending the fill. However, note that in this example, the Frd Y is not behind the Inval X, and therefore is able to provide Fill data to unblock the P5 probe queue.

When data is returned for a remote reference, the TTT entry corresponding to the reference is dropped. There may be other references in the TTT that shadowed the original reference. As those commands are received from the hierarchical switch, the TTT entries for each of the shadowed commands are also dropped. Eventually, when the remote access and shadowed accesses are all complete, and the TTT no longer contains any entries that map to the cache line, any subsequent local references to that cache line need not be shadowed.

Accordingly, through the use of Shadow commands, resource dependent deadlocks resulting from the co-existence of local and remote commands can be eliminated without a large increase in hardware complexity. It should be noted that although the above example involves the use of Forwarded Reads and CTDs, the Shadow command method is equally applicable to other types of instructions. multi-processor/In general, whenever there is a reference to a local address X, and a prior message to the local address X has been forwarded to a remote processor (as indicated by the TTT) or any prior reference to X is still being shadowed, the present reference to X is also shadowed.

In addition, the method may be used in other types of architectures that include even more levels of hierarchy than simply the multi-processor/switch hierarchy described above. For example, the above method may be used for computer systems that include multiple levels of hierarchy, with the commands being forwarded to the appropriate level in the hierarchy, depending upon the hierarchical level of a previous, outstanding reference to the cache line.

Accordingly an architecture and coherency protocol for use in a large SMP computer system has been described. The architecture of the SMP system includes a hierarchical switch structure which allows for a number of multi-processor nodes to be coupled to the switch to operate at an optimum performance. Within each multi-processor node, a simultaneous buffering system is provided that allows all of the processors of the multi-processor node to operate at peak performance. A memory is shared among the nodes, with a portion of the memory resident at each of the multi-processor nodes.

Each of the multi-processor nodes includes a number of elements for maintaining memory coherency, including a victim cache, a directory and a transaction tracking table. The victim cache allows for selective updates of victim data destined for memory stored at a remote multi-processing node, thereby improving the overall performance of memory. Memory performance is additionally improved by including, at each memory, a delayed write buffer which is used in conjunction with the directory to identify victims that are to be written to memory.

An arb bus coupled to the output of the directory of each node provides a central ordering point for all messages that are transferred through the SMP. According to one embodiment of the invention, the messages comprise a number of transactions, and each transaction is assigned to a number of different virtual channels, depending upon the processing stage of the message. The use of virtual channels thus helps to maintain data coherency by providing a straightforward method for maintaining system order. Using the virtual channels and the directory structure, cache coherency problems that would previously result in deadlock may be avoided.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What we claim is:

1. A computer system having a plurality of coupled multi-processor nodes, and a shared memory, each node having at least one processor and a portion of the shared memory, wherein at least one processor issues a plurality of references, the computer system having a plurality of channels that provides logically independent paths through the computer system for the references, the computer system comprising:

a serialization point that provides an order of references to the portion of the shared memory at a corresponding node;

a first channel that carries the ordered references to the corresponding node;

a second channel that carries other references to the corresponding node; and a tracking mechanism associated with each node, that identifies a serial position of a remote related reference to the portion of the shared memory in a second channel relative to the ordered references in the first channel.

2. the computer system according to claim 1 wherein the tracking mechanism identifies an order of references on the at least one ordered channel, such that the order may be reconstructed for transactions on other channels.

3. The computer system according to claim 2, further comprising, for each remote reference to the portion of the shared memory, means for indicating to the tracking mechanism of the multi-processing node associated with the shared portion of memory corresponding to the ordered references that the ordered references has a related remote reference.

4. The computer system according to claim 3, wherein the means for indicating further comprises a command issued on the at least one ordered channel to the tracking mechanism.

5. The computer system according to claim 4, wherein the tracking mechanism further comprises a plurality of entries, each of the entries for storing an address of a reference that addresses a memory location on another one of the multi-processing nodes, each of the entries further including a plurality of status bits for indicating a status of the associated request.

6. The computer system according to claim 5, wherein the tracking mechanism comprises:

a first status bit set for indicating whether the command on the ordered channel has been returned to the multi-processing node.

7. The computer system according to claim 6, wherein the tracking mechanism further comprises:

a second status bit set for indicating whether the remote reference has returned to the multi-processing node;

means for removing an entry from the transaction table having both the first bit and second bit of the status bits set.

8. The computer system according to claim 7, further comprising:

means for ignoring a request issued to an address stored in the tracking mechanism that is received before the first bit in the tracking mechanism corresponding to the address is set to indicate receipt of the command on the ordered channel.

9. The computer system according to claim 8, wherein the ignored request is an invalidate request.

10. The computer system according to claim 8, wherein the means for ignoring the request issued to the address only ignores the request if the processor that issued the request corresponds to the processor that caused the address to be entered in the tracking mechanism.

11. The computer system according to claim 7, further comprising:

means for delaying a reference issued to an address stored in the tracking mechanism until the command on the ordered channel is received, where the reference is received before the first bit in the tracking mechanism corresponding to the address is set.

12. The computer system according to claim 11, wherein the reference is further delayed until a desired version of data associated with the address is returned to the multi-processor node.

13. The computer system according to claim 11, wherein the reference is further delayed until a desired version of data associated with the address is returned to the one of the plurality of processors that caused the address to be entered in the tracking mechanism.

14. A method for maintaining order between a plurality of requests issued to a common address in a multi-processor computer system, the multi-processor computer system comprising a plurality of multi-processor nodes coupled via a switch, each of the multi-processor nodes comprising at least one processor and a portion of a shared memory, the method comprising the step of:

maintaining a list of addresses of requests that are forwarded from each of the multi-processor nodes to the switch in order to identify a relative order of requests to the respective addresses in a portion of shared memory of a remote multi-processor node; and tracking of a remote request associated with the relative order of requests as to identify a serial position of the remote request with respect to the relative order of requests.

15. The method according to claim 14 wherein the list of addresses of requests identifies an order of references on at least one ordered channel, such that the order may be reconstructed for transactions on other channels.

16. The method according the claim 15, further comprising the step of, for each remote reference to the portion of the shared memory, indicating to the list of addresses in the multi-processing node associated with the shared portion of memory corresponding to the ordered references that the ordered references has a corresponding remote reference.

17. The method according to claim 16, wherein the step of indicating further comprises the step of issuing a command on the at least one ordered channel to the list of addresses.

18. The method according to claim 17, wherein the list of addresses comprises a plurality of entries, each of the entries for storing an address of a reference that addresses a memory location on another one of the multi-processing nodes and including a plurality of status bits for indicating a status of the associated request.

19. The method according to claim 18, wherein the status bits further comprise:

a first bit set for indicating whether the command on the ordered channel has been returned to the multi-processing node.

20. The method according to claim 19, wherein the status bits further comprise a second bit set for indicating whether the remote reference has returned to the multi-processing node, and wherein the method includes the step of removing an entry from the transaction table having both the first bit and second bit of the status bits set.

21. The method according to claim 20, further comprising the steps of:

ignoring a request issued to an address stored in the list of addresses that is received before the first bit in the list of addresses corresponding to the address is set to indicate receipt of the command on the ordered channel.

22. The method according to claim 21, wherein the ignored request is an invalidate request.

23. The method according to claim 22, wherein the step of ignoring the request issued to the address only ignores the request if the processor that issued the request corresponds to the processor that caused the address to be entered in the list of addresses.

24. The method according to claim 23, further comprising the step of:

delaying a reference issued to an address stored in the list of addresses, the reference received before the first bit in the list of addresses corresponding to the address is set, until the command on the ordered channel is received.

25. The method according to claim 24, wherein the reference is further delayed until a desired version of data associated with the address is returned to the multi-processor node.

26. The method according to claim 25, wherein the reference is further delayed until a desired version of data associated with the address is returned to the one of the plurality of processors that caused the address to be entered in the list of addresses.

* * * * *